(12) United States Patent
Beall et al.

(10) Patent No.: US 11,458,464 B2
(45) Date of Patent: Oct. 4, 2022

(54) HONEYCOMB BODY AND PARTICULATE FILTER COMPRISING A HONEYCOMB

(71) Applicant: CORNING INCORPORATED, Corning, NY (US)

(72) Inventors: Douglas Munroe Beall, Painted Post, NY (US); Thorsten Rolf Boger, Bad Camberg (DE); Dana Craig Bookbinder, Corning, NY (US); Thomas Jean Glasson, Avon (FR); Dale Robert Powers, Painted Post, NY (US); Pushkar Tandon, Painted Post, NY (US); Jianguo Wang, Cape Coral, FL (US); Huiqing Wu, Shanghai (CN); Xinfeng Xing, Shanghai (CN)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/468,088

(22) Filed: Sep. 7, 2021

(65) Prior Publication Data

US 2021/0394168 A1 Dec. 23, 2021

Related U.S. Application Data

(63) Continuation of application No. 16/760,248, filed as application No. PCT/US2018/058525 on Oct. 31, 2018, now Pat. No. 11,117,124.
(Continued)

(51) Int. Cl.
*B01J 35/04* (2006.01)
*B01D 53/88* (2006.01)
(Continued)

(52) U.S. Cl.
CPC .......... *B01J 35/04* (2013.01); *B01D 46/2429* (2013.01); *B01D 46/2474* (2013.01);
(Continued)

(58) Field of Classification Search
CPC .. B01J 35/04; B01D 46/2429; B01D 46/2474; B01D 46/24491; B01D 46/24492; F01N 11/00; F01N 2550/00
(Continued)

(56) References Cited

U.S. PATENT DOCUMENTS 5,258,164 A   11/1993  Bloom et al.
5,298,046 A *  3/1994  Peisert .................. F01N 3/0222
                                                 55/528
(Continued)

FOREIGN PATENT DOCUMENTS

CN    1671458 A      9/2005
CN    101080261 A   11/2007
(Continued)

OTHER PUBLICATIONS

Andersen et al. "The formation of porous membranes by filtration of aerosol nanoparticles," Journal of Nanoparticle Research 4 (2002), pp. 405-416.
(Continued)

*Primary Examiner* — Tom P Duong
(74) *Attorney, Agent, or Firm* — Joseph M. Homa

(57) ABSTRACT

A particulate filter having a porous ceramic honeycomb structure with a first end, a second end, and a plurality of walls having wall surfaces defining a plurality of inner channels. Filtration material deposits are disposed on one or more of the wall surfaces of the honeycomb body. The highly porous deposits provide durable high clean filtration efficiency with small impact on pressure drop through the filter.

19 Claims, 27 Drawing Sheets

Related U.S. Application Data

(60) Provisional application No. 62/725,978, filed on Aug. 31, 2018, provisional application No. 62/579,601, filed on Oct. 31, 2017.

(51) Int. Cl.
    *C04B 38/00*      (2006.01)
    *B01D 46/24*      (2006.01)
    *C04B 111/00*     (2006.01)
    *G01N 15/08*      (2006.01)
    *F01N 11/00*      (2006.01)

(52) U.S. Cl.
    CPC ........ B01D 53/885 (2013.01); C04B 38/0009 (2013.01); *B01D 46/24491* (2021.08); *B01D 46/24492* (2021.08); *B01D 2255/92* (2013.01); *B01D 2273/18* (2013.01); *C04B 2111/00793* (2013.01); *F01N 11/00* (2013.01); *F01N 2550/00* (2013.01); *F01N 2560/05* (2013.01); *G01N 2015/084* (2013.01)

(58) Field of Classification Search
    USPC .......................................................... 55/523
    See application file for complete search history.

(56) References Cited

U.S. PATENT DOCUMENTS

| | | | |
|---|---|---|---|
| 5,415,775 A | | 5/1995 | Castillon et al. |
| 7,981,375 B2 | * | 7/2011 | Ramberg ............... F02D 41/027 |
| | | | 264/630 |
| 9,943,785 B2 | | 4/2018 | Jeong |
| 10,155,674 B1 | | 12/2018 | Stewart et al. |
| 2001/0013220 A1 | | 8/2001 | Schonauer |
| 2001/0051108 A1 | | 12/2001 | Schonauer |
| 2005/0207946 A1 | | 9/2005 | Asano et al. |
| 2006/0188416 A1 | * | 8/2006 | Alward ............... B01D 39/2086 |
| | | | 422/180 |
| 2007/0187029 A1 | | 8/2007 | Axtell et al. |
| 2008/0299349 A1 | | 12/2008 | Gu et al. |
| 2008/0299377 A1 | | 12/2008 | Gu et al. |
| 2009/0025610 A1 | | 1/2009 | Kimura et al. |
| 2010/0043408 A1 | | 2/2010 | Girot et al. |
| 2010/0056369 A1 | | 3/2010 | Gu |
| 2010/0221557 A1 | | 9/2010 | Higuchi et al. |
| 2010/0266461 A1 | | 10/2010 | Sappok et al. |
| 2011/0156727 A1 | | 6/2011 | Achhammer et al. |
| 2012/0132584 A1 | * | 5/2012 | Fekety ............... B01D 67/0046 |
| | | | 210/500.25 |
| 2013/0133313 A1 | | 5/2013 | Harris |
| 2013/0149458 A1 | * | 6/2013 | Cai ..................... C04B 38/0038 |
| | | | 427/140 |
| 2014/0342898 A1 | * | 11/2014 | Backhaus-Ricoult ....................... |
| | | | C04B 35/478 |
| | | | 501/153 |
| 2015/0235721 A1 | | 8/2015 | Grandjean et al. |
| 2015/0343387 A1 | | 12/2015 | Kim et al. |
| 2016/0045874 A1 | | 2/2016 | Deng et al. |
| 2017/0335730 A1 | | 11/2017 | Keppeler et al. |
| 2018/0052091 A1 | | 2/2018 | Zhang |
| 2018/0243717 A1 | | 8/2018 | Macedo et al. |
| 2018/0311621 A1 | | 11/2018 | Chen et al. |
| 2018/0318795 A1 | | 11/2018 | Yu |
| 2019/0126186 A1 | | 5/2019 | Beall et al. |
| 2019/0374896 A1 | | 12/2019 | Beall et al. |
| 2020/0123958 A1 | | 4/2020 | Schwarzmann et al. |
| 2020/0131972 A1 | | 4/2020 | Herberger |

FOREIGN PATENT DOCUMENTS

| | | |
|---|---|---|
| CN | 101128655 A | 2/2008 |
| CN | 103080046 A | 5/2013 |
| CN | 103339088 A | 10/2013 |
| CN | 104755149 A | 7/2015 |
| EP | 1408207 A1 | 4/2004 |
| JP | 2005-296935 A | 10/2005 |
| JP | 2010-095399 A | 4/2010 |
| JP | 2010-156206 A | 7/2010 |
| JP | 2010-527747 A | 8/2010 |
| WO | 2006/034717 A1 | 4/2006 |
| WO | 2017/075328 A1 | 5/2017 |
| WO | 2020/101913 A1 | 5/2020 |

OTHER PUBLICATIONS

Chinese Patent Application No. 201880084303.2, Office Action dated May 25, 2021, 15 pages (10 pages of English Translation and 5 pages of Original Document), Chinese Patent Office.

International Preliminary Report on Patentability of the International Searching Authority; PCT/US2018/058525; dated May 14, 2020; 12 Pages; European Patent Office.

International Search Report and Written Opinion of the International Searching Authority; PCT/US2018/058525; dated Jan. 30, 2019; 14 Pages; European Patent Office.

Tandon et al., "Measurement and prediction of fillralion efficiency evolution of soot loaded diesel particulate fillers," 65 Chemical Engineering Science 4751-60 (2010).

* cited by examiner

HONEYCOMB BODY AND PARTICULATE FILTER COMPRISING A HONEYCOMB

This application is a Continuation of U.S. application Ser. No. 16/760,248 filed on Oct. 31, 2018 which is a national stage application under 35 U.S.C § 371 of International Application No. PCT/US2018/058525, filed Oct. 31, 2018, which claims the benefit of priority to U.S. Provisional Application Ser. Nos. 62/579,601 filed on Oct. 31, 2017 and 62/725,978 filed on Aug. 31, 2018, the contents of which are relied upon and incorporated herein by reference in their entireties.

BACKGROUND

Field

The present specification relates honeycomb bodies, particulate filters comprising honeycomb bodies, and methods for making such honeycomb bodies and particulate filters.

Technical Background

Ceramic wall flow filters are employed to remove particulates from fluid exhaust streams, such as from combustion engine exhaust. Examples include ceramic soot filters used to remove particulates from diesel engine exhaust gases; and gasoline particulate filters (GPF) used to remove particulates from gasoline engine exhaust gases. For wall flow filters, exhaust gas to be filtered enters inlet cells and passes through the cell walls to exit the filter via outlet channels, with the particulates being trapped on or within the inlet cell walls as the gas traverses and then exits the filter. The particulates may be comprised of soot and/or ash. Accumulations of ash and/or soot typically can occur inside the filter after extended exposure to engine exhaust gases.

SUMMARY

Aspects of the disclosure pertain to ceramic articles such as honeycomb bodies and particulate filters and methods for their manufacture and use. In some embodiments, the particulate filters comprise honeycomb bodies comprised of a porous ceramic honeycomb structure of porous walls comprising wall surfaces comprising filtration material deposits, the surfaces defining a plurality of inner channels (channels). The porous walls are comprised of porous base walls and filtration material deposits disposed on one or more of the base walls, wherein the porous walls form the channels. The filtration material deposits are comprised of one or more inorganic materials, such as one or more ceramic or refractory materials. The filtration material deposits are disposed on the walls to provide enhanced filtration efficiency by the honeycomb body. In some embodiments, filtration efficiency is enhanced at least in the use of the honeycomb body from a clean state, or from a regenerated state, for example when the honeycomb body has no, or substantially no, accumulation of ash or soot present inside the honeycomb body, such as when the honeycomb body is new or has undergone regeneration to remove all or substantially all ash and/or soot. Substantial accumulations of ash and/or soot typically can then occur inside the channels of the honeycomb body after extended exposure to engine exhaust gases, e.g. after extended use of the honeycomb body as a filter. In one or more embodiments, the filtration material deposits are durable, for example, possessing a durability such as resistance to a high gas or air flow through the particulate filter with little to no degradation in the filtration performance.

In one or more embodiments, the filtration material deposits are present substantially or even entirely at the surface of one or more of the walls of the honeycomb structure. Thus, in some embodiments, the outer surface of the walls, which face and therefore define the channels, comprise the deposits. In some embodiments, some portions of the surfaces of some of the walls are free of the deposits; thus some of the walls may comprise deposit-free surface portions. In some embodiments, a portion of the filtration material deposits are disposed within the porous base wall portion, for example in the form of fingers or roots that extend partially into the base wall portions. In some embodiments the filtration material deposits are also present in the pores of the porous base wall, but do not penetrate the entire thickness of the base wall; thus, at least some interior portion of the base wall is devoid of any deposits. In some embodiments the deposits are present as an integrated membrane or layer at the surface of the walls, and in some embodiments an integrated continuous layer, such that at least some of the surfaces of the walls of the honeycomb structure are comprised of the membrane or layer; in some of these embodiments, the deposits are present across all of the surfaces of all of the walls defining one or more of the channels, for example those base walls are completely or substantially completely covered by the filtration material deposits; in others of these embodiments, the filtration material deposits are present on only a portion of the surfaces of the base walls of the walls defining one or more of the channels. The layer or membrane is porous, preferably highly porous, to allow gas flow through the layer, and the base wall is also porous, such that gas may flow through the porous wall. In some embodiments, the layer or membrane is present as a continuous coating over at least part of the, or over the entire, surface of the one or more walls. In some preferred embodiments, only a fraction of the cell walls of the honeycomb body of the particulate filter are provided with filtration material deposits, such as only cells corresponding to inlet flow channels of a plugged honeycomb body.

In one aspect, the filtration material deposits are comprised of flame-deposited filtration material. In some embodiments, the porous walls of the honeycomb structure comprise deposits present as an integrated layer or membrane which constitute at least a portion of the surface of the walls of one or more channels, and in some of these embodiments at least part of, or the entire, surface of one or more walls is comprised of the continuous layer.

In some embodiments, the surface of one or more of the walls of the honeycomb structure are comprised of a plurality of discrete regions of filtration material deposits In some embodiments, the filtration material deposits partially block a portion of some of the pores of the porous base walls, while still allowing gas flow through the wall.

In one set of embodiments disclosed herein, the honeycomb body comprises a honeycomb structure comprising a first end, a second end, and a plurality of walls extending from the first end to the second end. The plurality of walls comprises a plurality of porous walls. The porous walls comprise porous base walls. Surfaces of at least some of the porous walls further comprise filtration material deposits. The plurality of walls defines a plurality of channels extending from the first end to the second end. Some of the channels are plugged at or near the first end, while some of the remaining channels are plugged at or near the second end, thereby providing a wall-flow filter flow path that constitutes gas flowing from the first end into an inlet channel through a portion of the porous walls, and out through an outlet channel and out the second end. In some embodiments, the filtration material deposits are present on walls defining one or more of the inlet channel; in some of these embodiments, the filtration material deposits are not present on walls defining the outlet channels.

In some embodiments, the filtration material deposits are present in the form of a thin highly porous layer. In some embodiments, the porous walls comprise an porous inorganic layer having a porosity greater than 90%, and an average thickness of greater than or equal to 0.5 μm and less than or equal to 10 μm.

In another aspect, a method of making a honeycomb body, comprises: depositing filtration material onto the base walls of a ceramic honeycomb body by flowing the filtration material with gaseous carrier fluid to the ceramic honeycomb body; and binding the filtration material to the porous base walls of the ceramic honeycomb body. In specific embodiments, the filtration material deposits are bound by thermal sintering or fusing to the base wall portion or previously laid down filtration material. For example, deposits form a porous inorganic layer having a porosity of greater than 90%, and an average thickness of greater than or equal to 0.5 μm to less than or equal to 10 μm.

Additional features and advantages will be set forth in the detailed description, which follows, and in part will be readily apparent to those skilled in the art from that description or recognized by practicing the embodiments described herein, comprising the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
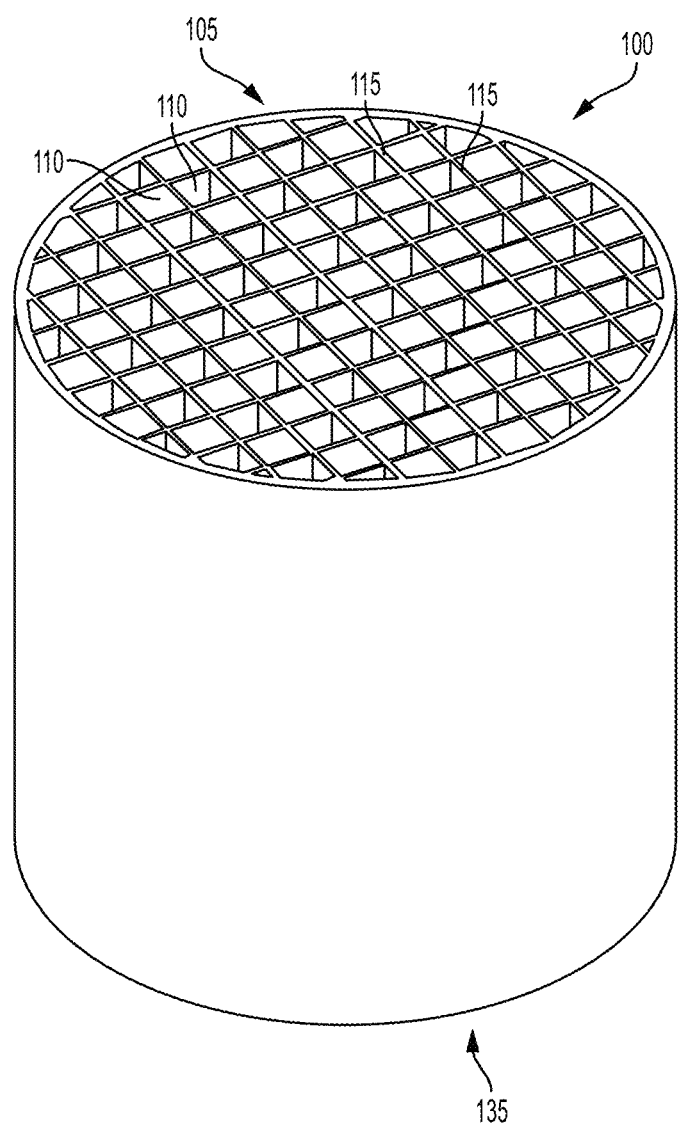
FIG. 1 schematically depicts a honeycomb body according to embodiments disclosed and described herein.

Reference will now be made in detail to embodiments of honeycomb bodies comprising a porous honeycomb body with a high porosity layer thereon, embodiments of which are illustrated in the accompanying drawings. Whenever possible, the same reference numerals will be used throughout the drawings to refer to the same or like parts. In embodiments, a honeycomb body comprises a porous ceramic honeycomb body comprising a first end, a second end, and a plurality of walls having wall surfaces defining a plurality of inner channels. A porous inorganic layer is disposed on one or more of the wall surfaces of the honeycomb body. The inorganic layer has a porosity greater than 90%, and the inorganic layer has an average thickness of greater than or equal to 0.5 µm and less than or equal to 10 µm. Various embodiments of honeycomb bodies and methods of making such honeycomb bodies will be described herein with specific reference to the appended drawings. In some embodiments, a particulate filter is provided, the particulate filter comprising a honeycomb body comprising a plugged porous ceramic honeycomb structure comprising a plurality of intersecting porous walls comprising porous wall surfaces that define a plurality of channels extending from an inlet end to an outlet end of the structure, the plurality of channels comprising inlet channels sealed at or near the outlet end and having a surface area, and outlet channels sealed at or near the inlet end and having a surface area, the inlet channels and the outlet channels defining filtration area, wherein one or more of the porous wall surfaces defining the inlet channels comprise a base wall portion and filtration material deposits disposed on the base wall portion, wherein the filtration material deposits are disposed on the base wall portions, and wherein the particulate filter exhibits a change in filtration efficiency of less than 5% after being exposed to a high flow condition of 850 Nm³/h of air for one minute at room temperature, and wherein the change in filtration efficiency is determined by measuring a difference between a number of soot particles that are introduced into the particulate filter and a number of soot particles that exit the particulate filter before and after exposure to the high flow condition, wherein the soot particles have a median particle size of 300 nm a soot particle concentration of 500,000 particles/cm³ in a stream of air flowed through the particulate filter at a flow rate of 51 Nm³/h, at room temperature, and at a velocity of 1.7 m/s as measured by a particle counter (for example, by using a Lighthouse Handheld 3016 0.1 CFM particle counter, available from Lighthouse Worldwide Solutions, for 30 seconds upstream from the particulate filter and 30 seconds downstream from the particulate filter). In some embodiments, the particulate filter exhibits a change in filtration efficiency of less than 20%, 15%, 10%, 9%, 8%, 7%, 6%, 5%, 4%, 3%, 2%, or even less than 1% after exposure to the high flow condition of 850 Nm³/h of air for one minute at room temperature.

In some embodiments, the filtration material deposits are preferably mechanically stable, such as being resistant to dislodgement or rearrangement such as due to high gas flow through the plugged honeycomb structure of the particulate filter, and/or such as due to mechanical vibration. In one or more embodiments, the filtration material deposits are stable when exposed to water such that the deposits maintain their location or position on the cell walls. In other words, according to some embodiments, the filtration material deposits are bound to the porous ceramic base walls. In some embodiments, the deposits are chemically bound, not just bound by physical bonding. For example, in some embodiments, the flame pyrolysis filtration material deposits are fused or sintered to the porous ceramic base wall. In addition, in some embodiments, the flame pyrolysis filtration material deposits are fused or sintered to each other to form a layer of porous inorganic material.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to".

A honeycomb body, as referred to herein, is a shaped ceramic honeycomb structure of intersecting walls to form cells the define channels. The ceramic honeycomb structure may be formed, extruded, or molded, and may be of any shape or size. For example, a ceramic honeycomb structure may be formed from cordierite or other suitable ceramic material.

A honeycomb body, as referred to herein, may also be defined as a shaped ceramic honeycomb structure having at least one layer applied to wall surfaces of the honeycomb structure, configured to filter particulate matter from a gas stream. There may be more than one layer applied to the same location of the honeycomb structure. The layer may be inorganic or organic or both. For example, a honeycomb body may, in one or more embodiments, be formed from cordierite or other ceramic material and have a high porosity layer applied to surfaces of the cordierite honeycomb structure. The layer may be "filtration material" which is to provide enhanced filtration efficiency, both locally through and at the wall and globally through the honeycomb body. Filtration material is not considered to be catalytically active in that it does not react with components of a gaseous mixture of an exhaust stream.

As used herein, "green" or "green ceramic" are used interchangeably and refer to an unsintered material, unless otherwise specified.

A honeycomb body of one or more embodiments may comprise a honeycomb structure and a layer disposed on one or more walls of the honeycomb structure. In some embodiments, the layer is applied to surfaces of walls present within honeycomb structure, where the walls have surfaces that define a plurality of inner channels. The inner channels, when present, may have various cross-sectional shapes, such as circles, ovals, triangles, squares, pentagons, hexagons, or tessellated combinations or any of these, for example, and may be arranged in any suitable geometric configuration. The inner channels, when present, may be discrete or intersecting and may extend through the honeycomb body from a first end thereof to a second end thereof, which is opposite the first end.

With reference now to FIG. 1, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105 and second end 135 of the honeycomb body.

In one or more embodiments, the honeycomb body may be formed from cordierite, aluminum titanate, enstatite, mullite, forsterite, corundum (SiC), spinel, sapphirine, and periclase. In general, cordierite is a solid solution having a composition according to the formula $(Mg,Fe)_2Al_3(Si_5AlO_{18})$. In some embodiments, the pore size of the ceramic material may be controlled, the porosity of the ceramic material may be controlled, and the pore size distribution of the ceramic material may be controlled, for example by varying the particle sizes of the ceramic raw materials. In addition, pore formers may be included in ceramic batches used to form the honeycomb body.

In some embodiments, walls of the honeycomb body may have an average thickness from greater than or equal to 25 μm to less than or equal to 250 μm, such as from greater than or equal to 45 μm to less than or equal to 230 μm, greater than or equal to 65 μm to less than or equal to 210 μm, greater than or equal to 65 μm to less than or equal to 190 μm, or greater than or equal to 85 μm to less than or equal to 170 μm. The walls of the honeycomb body can be described to have a base wall portion comprised of a bulk portion (also referred to herein as the bulk), and surface portions (also referred to herein as the surface). The surface portion of the walls extends from a surface of a wall of the honeycomb body into the wall toward the bulk portion of the honeycomb body. The surface portion may extend from 0 (zero) to a depth of about 10 μm into the base wall portion of the wall of the honeycomb body. In some embodiments, the surface portion may extend about 5 μm, about 7 μm, or about 9 μm (i.e., a depth of 0 (zero)) into the base wall portion of the wall. The bulk portion of the honeycomb body constitutes the thickness of wall minus the surface portions. Thus, the bulk portion of the honeycomb body may be determined by the following equation:

$$t_{total} - 2t_{surface}$$

where $t_{total}$ is the total thickness of the wall and $t_{surface}$ is the thickness of the wall surface.

In one or more embodiments, the bulk of the honeycomb body has a bulk mean pore size from greater than or equal to 7 μm to less than or equal to 25 μm, such as from greater than or equal to 12 μm to less than or equal to 22 μm, or from greater than or equal to 12 μm to less than or equal to 18 μm. For example, in some embodiments, the bulk of the honeycomb body may have bulk mean pore sizes of about 10 μm, about 11 μm, about 12 μm, about 13 μm, about 14 μm, about 15 μm, about 16 μm, about 17 μm, about 18 μm, about 19 μm, or about 20 μm. Generally, pore sizes of any given material exist in a statistical distribution. Thus, the term "median pore size" or "$D_{50}$" refers to which pore sizes of 50% of the pores lie and below and which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In some embodiments, the bulk of the honeycomb body may have bulk porosities, not counting a coating, of from greater than or equal to 50% to less than or equal to 70% as measured by mercury intrusion porosimetry. A method for measuring surface porosity includes scanning electron microscopy (SEM), this method in particular is valuable for measuring surface porosity and bulk porosity independent from one another. In one or more embodiments, the bulk porosity of the honeycomb body may be less than 70%, less than 65%, 60%, less than 58%, less than 56%, less than 54%, or less than 52%, for example.

In one or more embodiments, the surface portion of the honeycomb body has a surface median pore size from greater than or equal to 7 μm to less than or equal to 20 μm, such as from greater than or equal to 8 μm to less than or equal to 15 μm, or from greater than or equal to 10 μm to less than or equal to 14 μm. For example, in some embodiments, the surface of the honeycomb body may have surface median pore sizes of about 8 μm, about 9 μm, about 10 μm, about 11 μm, about 12 μm, about 13 μm, about 14 μm, or about 15 μm.

In some embodiments, the surface of the honeycomb body may have surface porosities, prior to application of a layer, of from greater than or equal to 35% to less than or equal to 50% as measured SEM. In one or more embodiments, the surface porosity of the honeycomb body may be less than 65%, such as less than 60%, less than 55%, less than 50%, less than 48%, less than 46%, less than 44%, less than 42%, less than 40%, less than 48%, or less than 36% for example.

Figure 17:
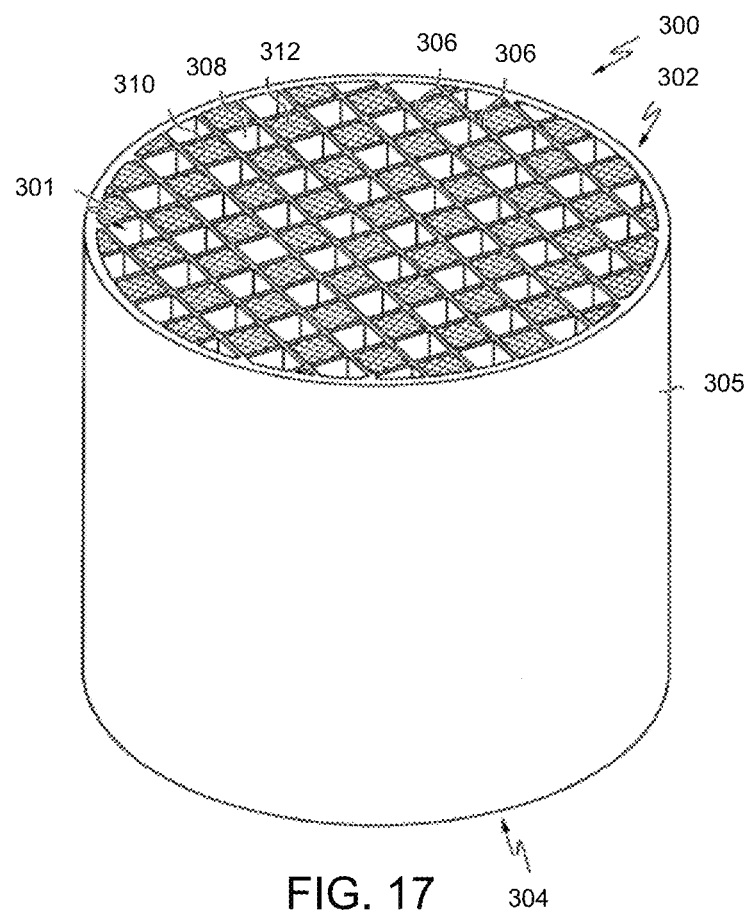
FIG. 17 schematically depicts a particulate filter according to embodiments disclosed and described herein.
Figure 18:
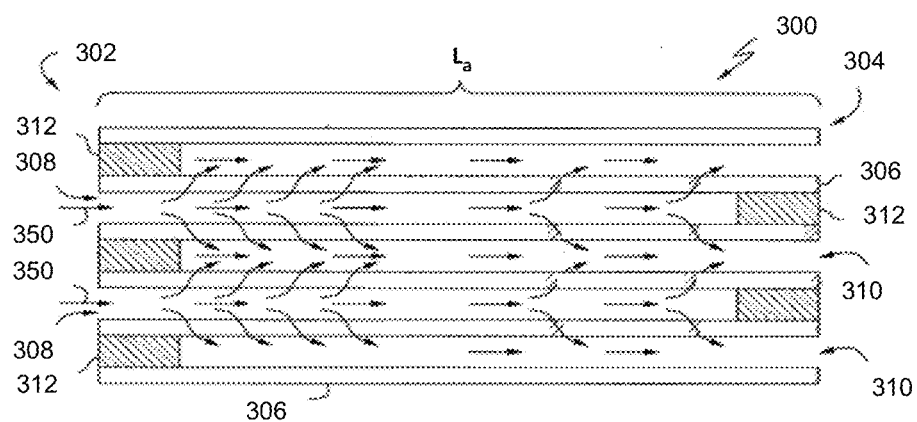
FIG. 18 is a cross-sectional view of the particulate filter shown in FIG. 17.

Referring now to FIGS. 17 and 18, a honeycomb body in the form of a particulate filter 300 is schematically depicted. The particulate filter 300 may be used as a wall-flow filter to filter particulate matter from an exhaust gas stream 350, such as an exhaust gas stream emitted from a gasoline engine, in which case the particulate filter 300 is a gasoline particulate filter. The particulate filter 300 generally comprises a honeycomb body having a plurality of channels 301 or cells which extend between an inlet end 302 and an outlet end 404, defining an overall length $L_a$. The channels 301 of the particulate filter 300 are formed by, and at least partially defined by a plurality of intersecting channel walls 306 that extend from the inlet end 302 to the outlet end 304. The particulate filter 300 may also include a skin layer 305 surrounding the plurality of channels 301. This skin layer 305 may be extruded during the formation of the channel walls 306 or formed in later processing as an after-applied skin layer, such as by applying a skinning cement to the outer peripheral portion of the channels.

An axial cross section of the particulate filter 300 of FIG. 17 is shown in FIG. 18. In some embodiments, certain channels are designated as inlet channels 308 and certain other channels are designated as outlet channels 310. In some embodiments of the particulate filter 300, at least a first set of channels may be plugged with plugs 312. Generally, the plugs 312 are arranged proximate the ends (i.e., the inlet end or the outlet end) of the channels 301. The plugs are generally arranged in a pre-defined pattern, such as in the checkerboard pattern shown in FIG. 17, with every other channel being plugged at an end. The inlet channels 308 may be plugged at or near the outlet end 304, and the outlet channels 310 may be plugged at or near the inlet end 302 on channels not corresponding to the inlet channels, as depicted in FIG. 3. Accordingly, each cell may be plugged at or near one end of the particulate filter only.

While FIG. 17 generally depicts a checkerboard plugging pattern, it should be understood that alternative plugging patterns may be used in the porous ceramic honeycomb article. In the embodiments described herein, the particulate filter 300 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 306 of the particulate filter 300 may have a thickness of greater than about 4 mils (101.6 microns). For example, in some embodiments, the thickness of the channel walls 306 may be in a range from about 4 mils up to about 30 mils (762 microns). In some other embodiments, the thickness of the channel walls 306 may be in a range from about 7 mils (177.8 microns) to about 20 mils (508 microns).

Figure 2:
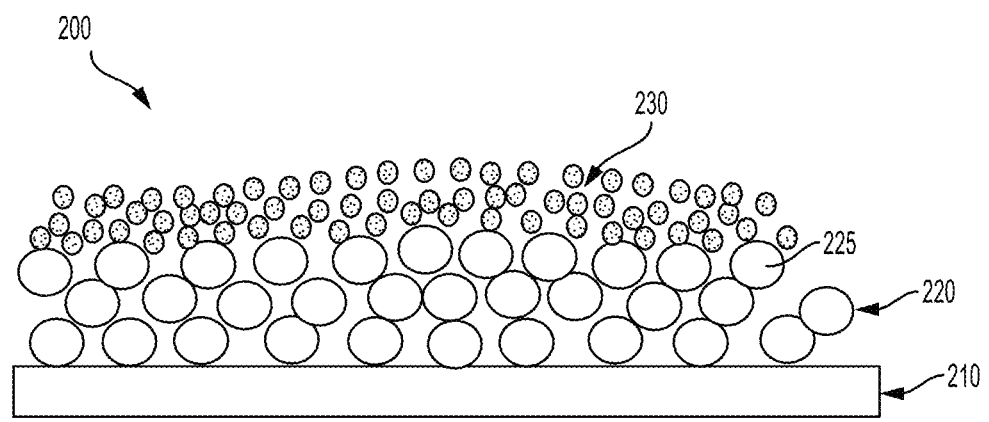
FIG. 2 schematically depicts a honeycomb body with soot loading according to embodiments disclosed and described herein.

In various embodiments the honeycomb body is configured to filter particulate matter from a gas stream. Accordingly, the median pore size, porosity, geometry and other design aspects of both the bulk and the surface of the honeycomb body are selected taking into account these filtration requirements of the honeycomb body. As an example, and as shown in the embodiment of FIG. 2, a wall 210 of the honeycomb body 200 has layer 220 disposed thereon, preferably sintered or otherwise bonded by heat treatment. The layer 220 may comprise particles 225 that are deposited on the wall 210 of the honeycomb body 200 and help prevent particulate matter from exiting the honeycomb body along with the gas stream 230, such as, for example, soot and ash, and to help prevent the particulate matter from clogging the base wall portion of the walls 210 of the honeycomb body 200. In this way, and according to embodiments, the layer 220 can serve as the primary filtration component while the base wall portion of the honeycomb body can be configured to otherwise minimize pressure drop for example as compared to conventional honeycomb bodies without such layer. Pressure drop, as used herein, is measured using a differential pressure sensor to measure the drop in pressure across the axial length of the filter. Because pore size of the layer 220 is smaller than that of the base wall portion, the layer will filter most of the smaller-sized particulate matter, but it is expected that the base wall portion of the walls of the honeycomb body filter is effective to filter some of the larger-sized particulate matter. As will be described in further detail herein, the honeycomb body may be formed by a suitable method—such as, for example, a flame deposition method—that allows for a thin, highly porous layer to be formed on at least some surfaces of the walls of the honeycomb body.

In one or more embodiments, the porosity of the layer disposed on the walls of the honeycomb body, as measured by SEM, is greater than or equal to 80%, such as greater than 90%. In other embodiments, the porosity of the layer disposed on the walls of the honeycomb body is greater than or equal to 92%, such as greater than or equal to 93%, or greater than or equal to 94%. In still other embodiments, the porosity of the layer disposed on the walls of the honeycomb body is greater than or equal to 95%, such as greater than or equal to 96%, or greater than or equal to 97%. In various embodiments, the porosity of the layer disposed on the walls of the honeycomb body is less than or equal to 99%, such as less than or equal to 97%, less than or equal to 95%, less than or equal to 94%, or less than or equal to 93%. The high porosity of the layer on the walls of the honeycomb body allows for the layer to be applied to a honeycomb body without significantly affecting the pressure drop of the honeycomb body compared to the pressure drop of an identical honeycomb body that does not comprise a layer thereon. SEM and X-ray tomography are useful for measuring surface and bulk porosity independently of one another. Obtaining porosity by density calculation includes: measuring weight of the inorganic layer and its thickness to obtain a layer density and calculating porosity of the layer according to the equation: layer porosity=1−layer density/ inorganic material density. As an example, for a layer comprising mullite, the "inorganic material density" is the density of mullite.

As mentioned above, the layer on walls of the honeycomb body is very thin compared to thickness of the base wall portion of the walls of the honeycomb body, and the layer also has very high porosity and permeability. As will be discussed in further detail below, the layer on the honeycomb body can be formed by methods that permit the layer to be applied to surfaces of walls of the honeycomb body in very thin layers. In embodiments, the average thickness of the layer on the base wall portion of the walls of the honeycomb body is from greater than or equal to 0.5 μm to less than or equal to 30 μm, such as from greater than or equal to 0.5 μm to less than or equal to 20 μm, greater than or equal to 0.5 μm to less than or equal to 10 μm, such as from greater than or equal to 0.5 μm to less than or equal to 5 μm, from greater than or equal to 1 μm to less than or equal to 4.5 μm, from greater than or equal to 1.5 μm to less than or equal to 4 μm, or from greater than or equal to 2 μm to less than or equal to 3.5 μm.

As discussed above, the layer can be applied to the walls of the honeycomb body by methods that permit the inorganic layer to have a small median pore size. This small median pore size allows the layer to filter a high percentage of particulate and prevents particulate from penetrating honeycomb and settling into the pores of the honeycomb, as described above with reference to FIG. 2. The small median pore size of layer according to embodiments increases the filtration efficiency of the honeycomb body. In one or more embodiments, the layer on the walls of the honeycomb body has a median pore size from greater than or equal to 0.1 μm to less than or equal to 5 μm, such as from greater than or equal to 0.5 μm to less than or equal to 4 μm, or from greater than or equal to 0.6 μm to less than or equal to 3 μm. For example, in some embodiments, the layer on the walls of the honeycomb body may have median pore sizes of about 0.5 μm, about 0.6 μm, about 0.7 μm, about 0.8 μm, about 0.9 μm, about 1 μm, about 2 μm, about 3 μm, or about 4 μm.

Although the layer on the walls of the honeycomb body may, in embodiments, cover substantially 100% of the wall surfaces defining inner channels of the honeycomb body, in other embodiments, the layer on the walls of the honeycomb body covers less than substantially 100% of the wall surfaces defining inner channels of the honeycomb body. For instance, in one or more embodiments, the layer on the walls of the honeycomb body covers at least 70% of the wall surfaces defining inner channels of the honeycomb body, covers at least 75% of the wall surfaces defining inner channels of the honeycomb body, covers at least 80% of the wall surfaces defining inner channels of the honeycomb body, covers at least 85% of the wall surfaces defining inner channels of the honeycomb body, covers at least 90% of the wall surfaces defining inner channels of the honeycomb body, or covers at least 85% of the wall surfaces defining inner channels of the honeycomb body.

As described above with reference to FIG. 1, the honeycomb body can have a first end and second end. The first end and the second end are separated by an axial length. In some embodiments, the layer on the walls of the honeycomb body may extend the entire axial length of the honeycomb body (i.e., extends along 100% of the axial length). However, in other embodiments, the layer on the walls of the honeycomb body extends along at least 60% of the axial length, such as extends along at least 65% of the axial length, extends along at least 70% of the axial length, extends along at least 75% of the axial length, extends along at least 80% of the axial length, extends along at least 85% of the axial length, extends along at least 90% of the axial length, or extends along at least 95% of the axial length.

In embodiments, the layer on the walls of the honeycomb body extends from the first end of the honeycomb body to the second end of the honeycomb body. In some embodiments, the layer on the walls of the honeycomb body extends the entire distance from the first surface of the honeycomb body to the second surface of the honeycomb body (i.e., extends along 100% of a distance from the first surface of the honeycomb body to the second surface of the honeycomb body). However, in one or more embodiments, the layer on the walls of the honeycomb body extends along 60% of a distance between the first surface of the honeycomb body and the second surface of the honeycomb body, such as extends along 65% of a distance between the first surface of the honeycomb body and the second surface of the honeycomb body, extends along 70% of a distance between the first surface of the honeycomb body and the second surface of the honeycomb body, extends along 75% of a distance between the first surface of the honeycomb body and the second surface of the honeycomb body, extends along 80% of a distance between the first surface of the honeycomb body and the second surface of the honeycomb body, extends along 85% of a distance between the first surface of the honeycomb body and the second surface of the honeycomb body, extends along 90% of a distance between the first surface of the honeycomb body and the second surface of the honeycomb body, or extends along 95% of a distance between the first surface of the honeycomb body and the second surface of the honeycomb body.

In one or more embodiments, the layer on the walls of the honeycomb body is disposed on the wall surfaces as a continuous coating. As used herein a "continuous coating" is an area where no portion of the area is essentially bare, or free of the layer material. In one or more embodiments, at least 50% of the layer is disposed on the wall surfaces of the honeycomb body as a continuous layer, such as at least 60% of the layer is disposed on the wall surfaces of the honeycomb body as a continuous layer, at least 70% of the layer is disposed on the wall surfaces of the honeycomb body as a continuous layer, at least 80% of the layer is disposed on the wall surfaces of the honeycomb body as a continuous layer, at least 90% of the layer is disposed on the wall surfaces of the honeycomb body as a continuous layer, at least 92% of the layer is disposed on the wall surfaces of the honeycomb body as a continuous layer, at least 94% of the layer is disposed on the wall surfaces of the honeycomb body as a continuous layer, at least 96% of the layer is disposed on the wall surfaces of the honeycomb body as a continuous layer, or at least 98% of the layer is disposed on the wall surfaces of the honeycomb body as a continuous layer. In other embodiments 100% of the layer is disposed on the wall surfaces of the honeycomb body as a continuous layer.

As stated above, and without being bound by any particular theory, it is believed that a low pressure drop is achieved by honeycomb bodies of embodiments because the layer on the honeycomb body is a primary filtration component of the honeycomb body, which allows for more flexibility in designing a honeycomb body. The selection of a honeycomb body having a low pressure drop in combination with the low thickness and high porosity of the layer on the honeycomb body according to embodiments allows a honeycomb body of embodiments to have a low pressure drop when compared to conventional honeycomb bodies. In embodiments, the layer is in the range of from 0.1 to 30 g/L on the honeycomb body. In embodiments, the layer may be present in the range of: from 0.2 to 20 g/L, from 0.3 to 25 g/L, from 0.4 to 20 g/L, from 1 to 10 g/L. In some embodiments, the pressure drop (i.e., a clean pressure drop without soot or ash) across the honeycomb body as compared to a honeycomb without a thin high porosity inorganic layer is less than or equal to 10%, such as less than or equal to 9%, or less than or equal to 8%. In other embodiments, the pressure drop across the honeycomb body is less than or equal to 7%, such as less than or equal to 6%. In still other embodiments, the pressure drop across the honeycomb body is less than or equal to 5%, such as less than or equal to 4%, or less than or equal to 3%.

As stated above, and without being bound to any particular theory, small pore sizes in the layer on the walls of the honeycomb body allow the honeycomb body to have good filtration efficiency even before ash or soot build-up occurs in the honeycomb body. The filtration efficiency of honeycomb bodies is measured herein using the protocol outlined in Tandon et al., 65 Chemical engineering Science 4751-60 (2010). As used herein, the initial filtration efficiency of a honeycomb body refers to a honeycomb body in a clean state, such as new or regenerated honeycomb body, that does not comprise any measurable soot or ash loading. In embodiments, the initial filtration efficiency (i.e., clean filtration efficiency) of the honeycomb body is greater than or equal to 70%, such as greater than or equal to 80%, or greater than or equal to 85%. In yet other embodiments, the initial filtration efficiency of the honeycomb body is greater than 90%, such as greater than or equal to 93%, or greater than or equal to 95%, or greater than or equal to 98%.

The layer on the walls of the honeycomb body according to embodiments is thin and has a high porosity, and in some embodiments the layer on walls of the honeycomb body also has good chemical durability and physical stability. Particularly if solidified, sintered, or otherwise bonded to the surface of the honeycomb body after the layer material is applied to the walls of the honeycomb body, as will be discussed in more detail below. The chemical durability and physical stability of the layer on the honeycomb body can be determined, in embodiments, by subjecting the honeycomb body to test cycles comprising burn out cycles and an aging test and measuring the initial filtration efficiency before and after the test cycles. For instance, one exemplary method for measuring the chemical durability and the physical stability of the honeycomb body comprises measuring the initial filtration efficiency of a honeycomb body; loading soot onto the honeycomb body under simulated operating conditions; burning out the built up soot at about 650° C.; subjecting the honeycomb body to an aging test at 1050° C. and 10% humidity for 12 hours; and measuring the filtration efficiency of the honeycomb body. Multiple soot build up and burnout cycles may be conducted. A small change in filtration efficiency (ΔFE) from before the test cycles to after the test cycles indicates better chemical durability and physical stability of the layer on the honeycomb body. In some embodiments, the ΔFE is less than or equal to 5%, such as less than or equal to 4%, or less than or equal to 3%. In other embodiments, the ΔFE is less than or equal to 2%, or less than or equal to 1%.

In some embodiments, the layer on the walls of the honeycomb body may be comprised of one or a mixture of ceramic components, such as, for example, ceramic components selected from the group consisting of $SiO_2$, $Al_2O_3$, MgO, $ZrO_2$, CaO, $TiO_2$, $CeO_2$, $Na_2O$, Pt, Pd, Ag, Cu, Fe, Ni, and mixtures thereof. Thus, the layer on the walls of the honeycomb body may comprise an oxide ceramic or an aluminum silicate. As discussed in more detail below, the method of making the layer on the honeycomb body according to embodiments can allow for customization of the layer composition for a given application. This may be beneficial because the ceramic components may be combined to match, for example, the physical properties—such as, for example coefficient of thermal expansion (CTE) and Young's modulus, etc.—of the honeycomb body, which can improve the physical stability of the honeycomb body. In some embodiments, the layer on the walls of the honeycomb body may comprise cordierite, aluminum titanate, enstatite, mullite, forsterite, corundum (SiC), spinel, sapphirine, and periclase. In some embodiments, the cordierite, aluminum titanate, enstatite, mullite, forsterite, corundum (SiC), spinel, sapphirine, and/or periclase is synthetic. In one or more embodiments, the inorganic layer comprises a synthetic mullite. Mullite is a rare aluminium silicate mineral and can form two stoichiometric forms $3Al_2O_3.2SiO_2$ or $2Al_2O_3.SiO_2$, in accordance with the general structure $xAl_2O_3 \cdot ySiO_2$. Preparation of synthetic mullite includes process controls to target $1.5 \leq x/y \leq 2$ or to target Al/Si mass ratio in the range of 2.9 to 3.8.

In some embodiments, the composition of the layer on the walls of the honeycomb body is the same as the composition of the honeycomb body. However, in other embodiments, the composition of the layer is different from the composition of the honeycomb body.

The layer, according to one or more embodiments, has a permeability of $\geq 10^{-15}$ $m^2$. In some embodiments the layer has a permeability of $\geq 10^{-14}$ $m^2$, such as $\geq 10^{-13}$ $m^2$, or $\geq 10^{-12}$ $m^2$.

In some embodiments, the layer is comprised of mullite and has an average particle size from greater than or equal to 5 nm to less than or equal to 3 μm. In such embodiments, the thickness and porosity of the layer may be a thickness depending on the desired properties of the honeycomb body.

In some embodiments, the layer is comprised of alumina and has an average particle size from greater than or equal to 10 nm to less than or equal to 3 μm. In some embodiments the average particle size is from greater than or equal to 100 nm to less than or equal to 3 μm, such as greater than or equal to 500 nm to less than or equal to 3 μm, or greater than or equal to 500 nm to less than or equal to 2 μm. In such embodiments, the thickness and porosity of the layer on the honeycomb body may be a thickness depending on the desired properties of the honeycomb body.

The properties of the layer and, in turn, the honeycomb body overall are attributable to the ability of applying a thin, high porosity layer having small median pore sizes to a honeycomb body.

Methods of making a honeycomb body according to some embodiments disclosed and described herein comprise: atomizing, vaporizing, or misting a layer precursor so that the layer precursor may be carried by a gaseous carrier fluid; depositing the atomized, vaporized, or misted layer precursor on a ceramic honeycomb structure; and binding the atomized, vaporized, or misted layer precursor to the ceramic honeycomb structure to form a layer on the ceramic honeycomb structure. In embodiments, the gaseous carrier fluid can be, for example, air, oxygen, or nitrogen. In some embodiments, the layer precursor may be combined with a solvent—such as a solvent selected from the group consisting of methoxyethanol, ethanol, water and mixtures thereof—before the layer precursor is atomized, vaporized, or misted. The layer precursor is, in one or more embodiments, blown into inner channels of the ceramic honeycomb structure. The layer precursor particles may be bound to the ceramic honeycomb structure by a suitable method including applying moisture—such as, for example, steam or humidity—heat, or radiation—such as, for example, microwaves—to the layer precursor after the layer precursor has been deposited on the ceramic honeycomb structure.

Methods of making a honeycomb body according to some embodiments disclosed and described herein comprise flame pyrolysis deposition of a layer to a ceramic honeycomb structure, which provides for deposition of a very thin layer having a high porosity and small median pore size. In embodiments, methods of making a honeycomb body comprise: vaporizing a layer precursor to form a vaporized layer precursor by contacting the layer precursor with a vaporizing gas (the layer precursor may comprise a precursor material and a solvent); decomposing the vaporized layer precursor by contacting the vaporized layer precursor with a flame; depositing the vaporized layer precursor on a ceramic honeycomb structure; and sintering the vaporized layer precursor to form the honeycomb body, wherein the honeycomb body comprises a layer that coats at least a portion of walls of the ceramic honeycomb structure. In one or more embodiments, the layer precursor is selected from the group consisting of CaO, $Ca(OH)_2$, $CaCO_3$, MgO, $Mg(OH)_2$, $MgCO_3$, $SiO_2$. $Al_2O_3$, $Al(OH)_3$, calcium aluminates, magnesium aluminates, and mixtures thereof.

In some embodiments, the method of forming a honeycomb body comprises forming or obtaining a layer precursor that comprises a ceramic precursor material and a solvent. The ceramic precursor material of the layer precursor comprises conventional raw ceramic materials that serve as a source of, for example, $SiO_2$, $Al_2O_3$, $TiO_2$, MgO, $ZrO_2$, CaO, $CeO_2$, $Na_2O$, Pt, Pd, Ag, Cu, Fe, Ni, and the like. For example, in some embodiments, the ceramic precursor material is selected from the group consisting of tetraethyl orthosilicate, magnesium ethoxide and aluminum(III) tri-sec-butoxide, trimethylaluminum, $AlCl_3$, $SiCl_4$, $Al(NO_3)_3$, aluminum isopropoxide, octamethyl cyclotetrasiloxane, and mixtures thereof. The solvent used in the layer precursor is not particularly limited as long as it is capable of maintaining a suspension of the ceramic precursor material within the solvent, and the solvent is capable of being vaporized at temperatures less than 200° C. In embodiments, the solvent is selected from the group consisting of methoxyethanol, ethanol, water, xylene, methanol, ethylacetate, benzene, and mixtures thereof.

In some embodiments, the layer precursor is vaporized to form a vaporized layer precursor by contacting the layer precursor with a vaporizing fluid. In one or more embodiments, the vaporizing fluid is selected from the group consisting of oxygen ($O_2$), water (steam, $H_2O$), nitrogen ($N_2$), and mixtures thereof. The vaporizing fluid is flowed at a high flow rate relative to the flow rate of the layer precursor so that when the vaporizing fluid contacts the layer precursor, the layer precursor is vaporized to a molecular level by the vaporizing fluid. For example, in embodiments, the vaporizing fluid is a gas that is flowed at a flow rate from greater than or equal to 3 L/min to less than or equal to 100 L/min mL/min, such as from greater than or equal to 4 L/min to less than or equal to 6.5 L/min, or from greater than or equal to 25 L/min to less than or equal to 35 L/min. In other embodiments, the vaporizing gas is flowed at a flow rate from greater than or equal to 60 L/min to less than or equal to 70 L/min.

The flow rate of the gaseous vaporizing fluid is, in embodiments, greater than the flow rate of the layer precursor. Accordingly, in one or more embodiments, the layer precursor is flowed at a flow rate from greater than or equal to 1.0 mL/min to less than or equal to 50 mL/min, such as from greater than or equal to 3 mL/min to less than or equal to 5 mL/min, or from greater than or equal to 25 mL/min to less than or equal to 35 mL/min. The flow rate of the vaporizing fluid and the flow rate of the layer precursor can be controlled so that the layer precursor is vaporized when it is contacted with the vaporizing fluid.

According to some embodiments, once the layer precursor has been contacted with the vaporizing fluid to form the vaporized layer precursor, the vaporized layer precursor is decomposed by contacting the vaporized layer precursor with a flame. The flame may be formed by combusting a suitable combustion gas, such as, for example, oxygen, methane, ethane, propane, butane, natural gas, or mixtures thereof. Once the vaporized layer precursor contacts the flame, the energy from the flame causes the vaporized layer precursor to decompose to atomic-level components, and the solvent is combusted into gases, such as, for example, hydrogen ($H_2$), carbon dioxide ($CO_2$), and carbon monoxide (CO). This combustion provides elemental components of the ceramic precursor materials well dispersed in a gas. In one or more embodiments, the flame temperature is from greater than or equal to 800 K to less than or equal to 2500 K. This allows the vaporized layer precursor to be easily directed to and deposited on a honeycomb body. It should be understood that in embodiments one flame may be used to decompose the layer precursor; however, in other embodiments two or more flames may be used to decompose the layer precursor. In yet other embodiments, the vaporized layer precursor is not decomposed by a flame.

In one or more embodiments, the vaporized layer precursor, which is well-dispersed in a fluid, is directed to a honeycomb body, such as by using a wind tunnel or differential pressure to guide the vaporized layer precursor to the honeycomb body. Thereby, the vaporized layer precursor is deposited on the honeycomb body. In some embodiments, the honeycomb body may have one or more of the channels plugged on one end, such as, for example, the first end 105 of the honeycomb body during the deposition of the vaporized layer precursor to the honeycomb body. The plugged channels may, in some embodiments, be removed after deposition of the layer precursor. But, in other embodiments, the channels may remain plugged even after deposition of the layer precursor. The pattern of plugging channels of the honeycomb body is not limited, and in some embodiments all the channels of the honeycomb body may be plugged at one end. In other embodiments, only a portion of the channels of the honeycomb body may be plugged at one end. In such embodiments, the pattern of plugged and unplugged channels at one end of the honeycomb body is not limited and may be, for example, a checkerboard pattern where alternating channels of one end of the honeycomb body are plugged. By plugging all or a portion of the channels at one end of the honeycomb body during deposition of the vaporized layer precursor, the vaporized layer precursor may be evenly distributed within the channels 110 of the honeycomb body 100.

Figure 3A:
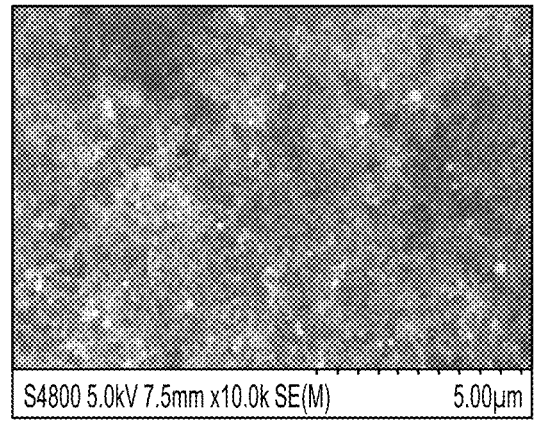
FIGS. 3A, 3B, 3C, and 3D are scanning electron microscope (SEM) images of amorphous phase decomposed vaporized layer precursors deposited on a honeycomb body according to embodiments disclosed and described herein.
Figure 3B:
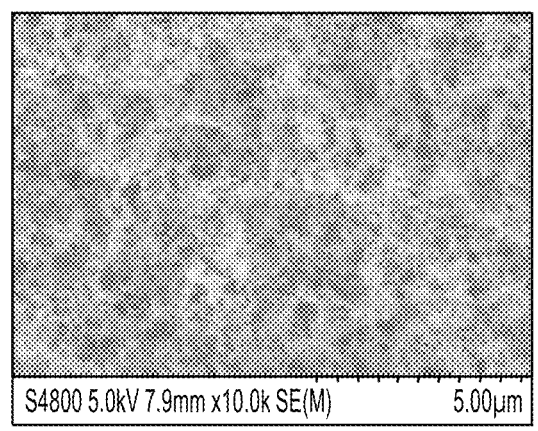
Figure 3C:
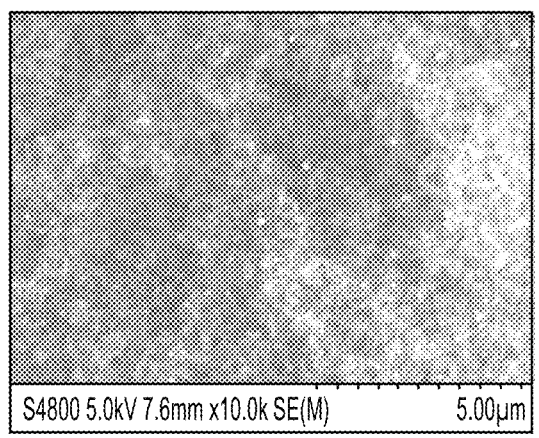
Figure 3D:
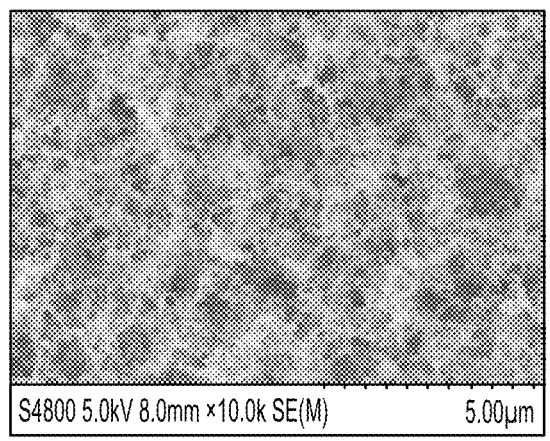

The vaporized layer precursor is, in some embodiments, deposited on the honeycomb body as an amorphous phase. For example, as discussed above, the ceramic precursor materials can be broken down to an elemental level in the decomposed layer precursor. The elemental components can be mixed together at an elemental level when deposited to the honeycomb body. For example, FIG. 3A is a scanning electron microscope (SEM) image of an amorphous phase of $5SiO_2 \cdot 2Al_2O_3 \cdot 2MgO$ decomposed layer precursor deposited on the surface of a honeycomb body; FIG. 3B is an SEM image of an amorphous phase of $2SiO_2 \cdot 3Al_2O_3$ decomposed layer precursor deposited on the surface of a honeycomb body; FIG. 3C is an SEM image of an amorphous phase of $2SiO_2 \cdot 5Al_2O_3 \cdot 4MgO$ decomposed layer precursor deposited on the surface of honeycomb body; and FIG. 3D is an SEM image of an amorphous phase of $Al_2O_3 \cdot MgO$ decomposed layer precursor deposited on the surface of a honeycomb body. As can be seen in each of FIGS. 3A-3D, particles at an elemental level are dispersed in an amorphous phase upon the honeycomb body. In this amorphous phase, the decomposed layer precursor, which has been deposited on the honeycomb body, has a porosity, as calculated, for example, according to the density of the layer versus the density of the inorganic material of the layer—of greater than or equal to 95%, such as greater than or equal to 96%, or greater than or equal to 97%. In other embodiments, the amorphous phase decomposed layer precursor has a porosity of greater than or equal to 98%, or greater than or equal to 99%.

Figure 4A:
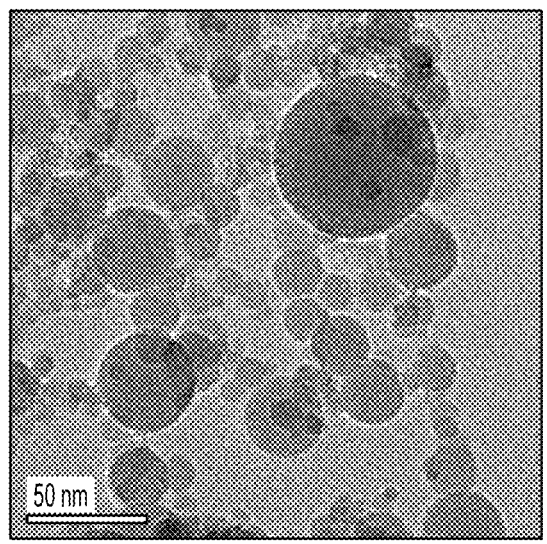
FIGS. 4A, 4B, 4C, and 4D are transmission electron microscopy (TEM) images of amorphous phase decomposed vaporized layer precursors deposited on a honeycomb body at varying layer precursor flow rates according to embodiments disclosed and described herein.
Figure 4B:
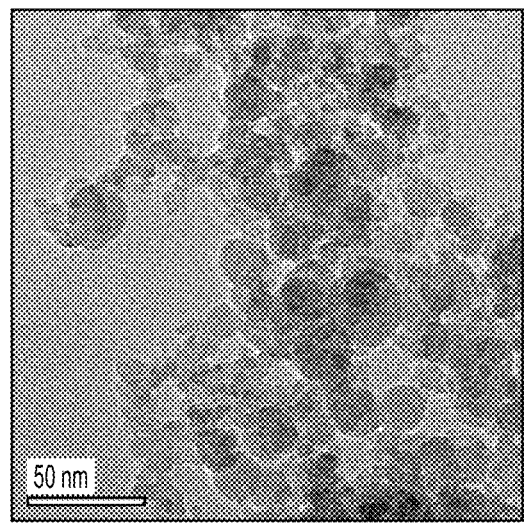
Figure 4C:
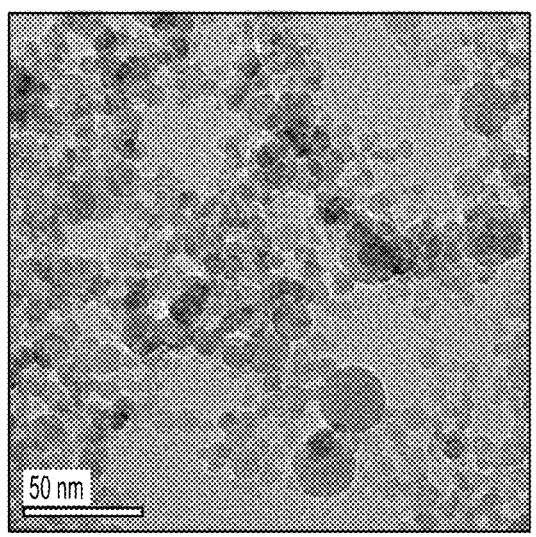
Figure 4D:
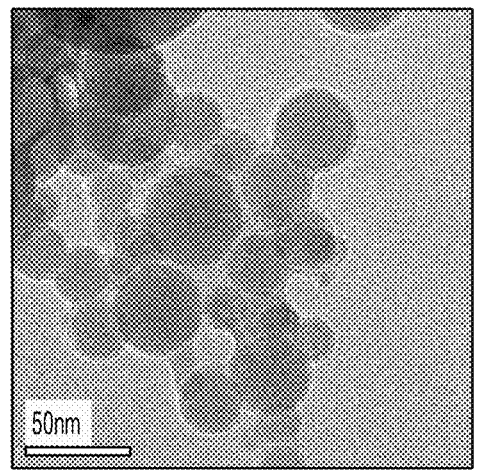

The porosity and pore size of the amorphous vaporized layer precursor and ultimately, the layer on the honeycomb body may, in some embodiments, be modified by the mean particle size of vaporized layer. The mean particle size of the vaporized layer may be controlled by the flow rate of layer precursor. For instance, as shown in FIGS. 4A-4D, the mean particle size of the vaporized layer precursor increases as the flow rate of the layer precursor increases. FIG. 4A a transmission electron microscopy (TEM) image of an amorphous $5SiO_2 \cdot 2Al_2O_3 \cdot 2MgO$ decomposed layer precursor deposited at layer precursor a flow rate of 3 mL/min; FIG. 4B is a TEM image of an amorphous $5SiO_2 \cdot 2Al_2O_3 \cdot 2MgO$ decomposed layer precursor deposited at a layer precursor flow rate of 1 mL/min; FIG. 4C is a TEM image of an amorphous $2SiO_2 \cdot 3Al_2O_3$ decomposed layer precursor deposited at a layer precursor flow rate of 1 mL/min; and FIG. 4D is a TEM image of an amorphous $5SiO_2 \cdot 2Al_2O_3 \cdot 2MgO$ decomposed layer precursor and an amorphous $2SiO_2 \cdot 3Al_2O_3$ decomposed layer precursor deposited using a dual flame processes with both flames having a layer precursor flow rate of 1 mL/min. As shown in FIGS. 4A-4D, the elements of the decomposed layer precursor were mixed at atomic level, forming a homogeneous phase having varying particle sizes depending on the flow rate of the layer precursor. However, in embodiments, the mean particle size of the vaporized layer precursor is from greater than or equal to 5 nm to less than or equal to 3 μm, such as from greater than or equal to 100 nm to less than or equal to 3 μm, or from greater than or equal to 200 nm to less than or equal to 1 μm. In other embodiments, the mean particle size of the vaporized layer precursor is from greater than or equal to 15 nm to less than or equal to 500 nm, such as from greater than or equal to 20 nm to less than or equal to 200 nm, or from greater than or equal to 25 nm to less than or equal to 100 nm.

Figure 5A:
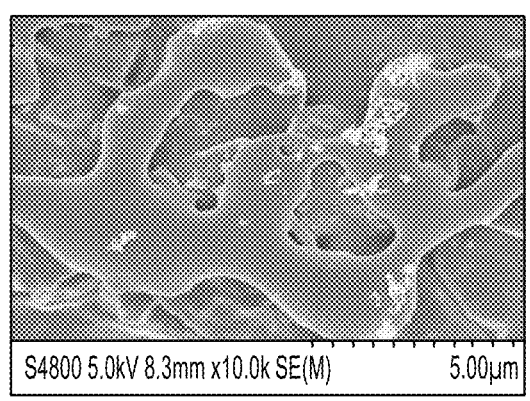
FIGS. 5A, 5B, 5C, and 5D are scanning electron microscope (SEM) images of crystalline phase coatings deposited on a honeycomb body according to embodiments disclosed and described herein.
Figure 5B:
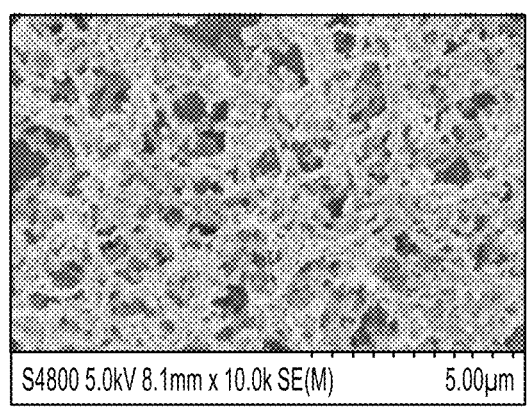
Figure 5C:
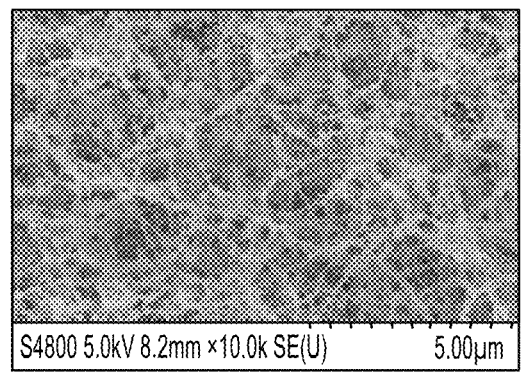
Figure 5D:
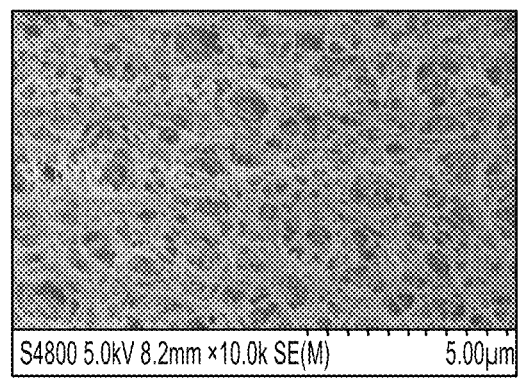

As noted above, the chemical durability and physical stability can be imparted to the layer on the walls of the honeycomb body according to some embodiments disclosed and described herein. To improve these properties, the vaporized layer precursor can be, in one or more embodiments, sintered or otherwise bonded to the honeycomb body after it has been deposited on the honeycomb body to form a layer as a crystalline phase that coats at least a portion of the honeycomb body. According to embodiments, sintering the vaporized layer precursor comprises heating the vaporized layer precursor after it has been deposited on the honeycomb body to temperatures from greater than or equal to 950° C. to less than or equal to 1150° C., such as from greater than or equal to 1000° C. to less than or equal to 1100° C., from greater than or equal to 1025° C. to less than or equal to 1075° C., or about 1050° C. The duration of the sintering is, in some embodiments, from greater than or equal to 20 minutes to less than or equal to 2.0 hours, such as from greater than or equal to 30 minutes to less than or equal to 1.5 hours, or from greater than or equal to 45 minutes to less than or equal to 1.0 hour. After sintering the vaporized layer precursor to form the honeycomb body, the layer is a crystalline phase. For instance, FIG. 5A is an SEM image of a sintered, crystalline phase $5SiO_2 \cdot 2Al_2O_3 \cdot 2MgO$ ceramic layer deposited on a honeycomb body; FIG. 5B is an SEM image of a sintered, crystalline phase $2SiO_2 \cdot 3Al_2O_3$ ceramic layer deposited on a honeycomb body; FIG. 5C is an SEM image of a sintered, crystalline phase $2SiO_2 \cdot 5Al_2O_3 \cdot 4MgO$ ceramic layer deposited on a honeycomb body; and FIG. 5D is an SEM image of a sintered, crystalline phase $Al_2O_3 \cdot MgO$ ceramic layer deposited on a honeycomb body. According to embodiments, the sintered, crystalline phase layers have a porosity, measured by SEM, of greater than 90%, such as greater than or equal to 91%, or greater than or equal to 92%. In other embodiments, the sintered, crystalline phase layer has a porosity of greater than or equal to 93%, such as greater than or equal to 94%, or greater than or equal to 95%. In still other embodiments, the sintered, crystalline phase layer has a porosity of greater than or equal to 96%, such as greater than or equal to 97%, or greater than or equal to 98%.

According to one or more embodiments of the disclosure, particulate filters are characterized by the filtration efficiency, representing their ability to remove a certain fraction of particulates from an incoming gas stream. The particulates can be characterized by their mass concentrations or their number concentrations. Both values typically correlate closely. Using a generic concentration $C_{Particulate}$ with the units particulate mass or number per unit volume, the filtration efficiency FE is typically obtained from the equation:

$$FE = \frac{[C_{Particulate}]_{Inlet} - [C_{Particulate}]_{outlet}}{[C_{Particulate}]_{Inlet}} \quad \text{Eqn. (1)}$$

Figure 20:
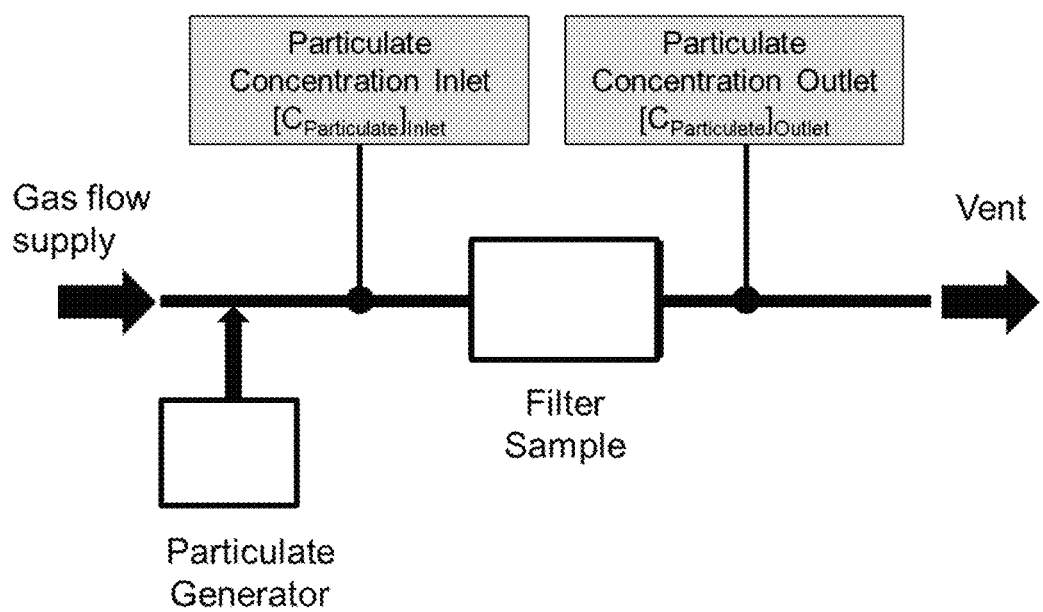
FIG. 20 is a schematic showing an experimental setup for testing particulate filters according to one or more embodiments.

There are different means for the experimental measurement of the filtration efficiency. A schematic for a generic laboratory setup is shown in FIG. 20. The generic laboratory setup comprises a gas supply, e.g. air, adjusted to a define flow rate, a particulate generator, for example one that generates soot particles at a certain rate and concentration, a filter sample to be tested, and two particulate analyzers at the inlet and the outlet of the filter samples.

Figure 21:
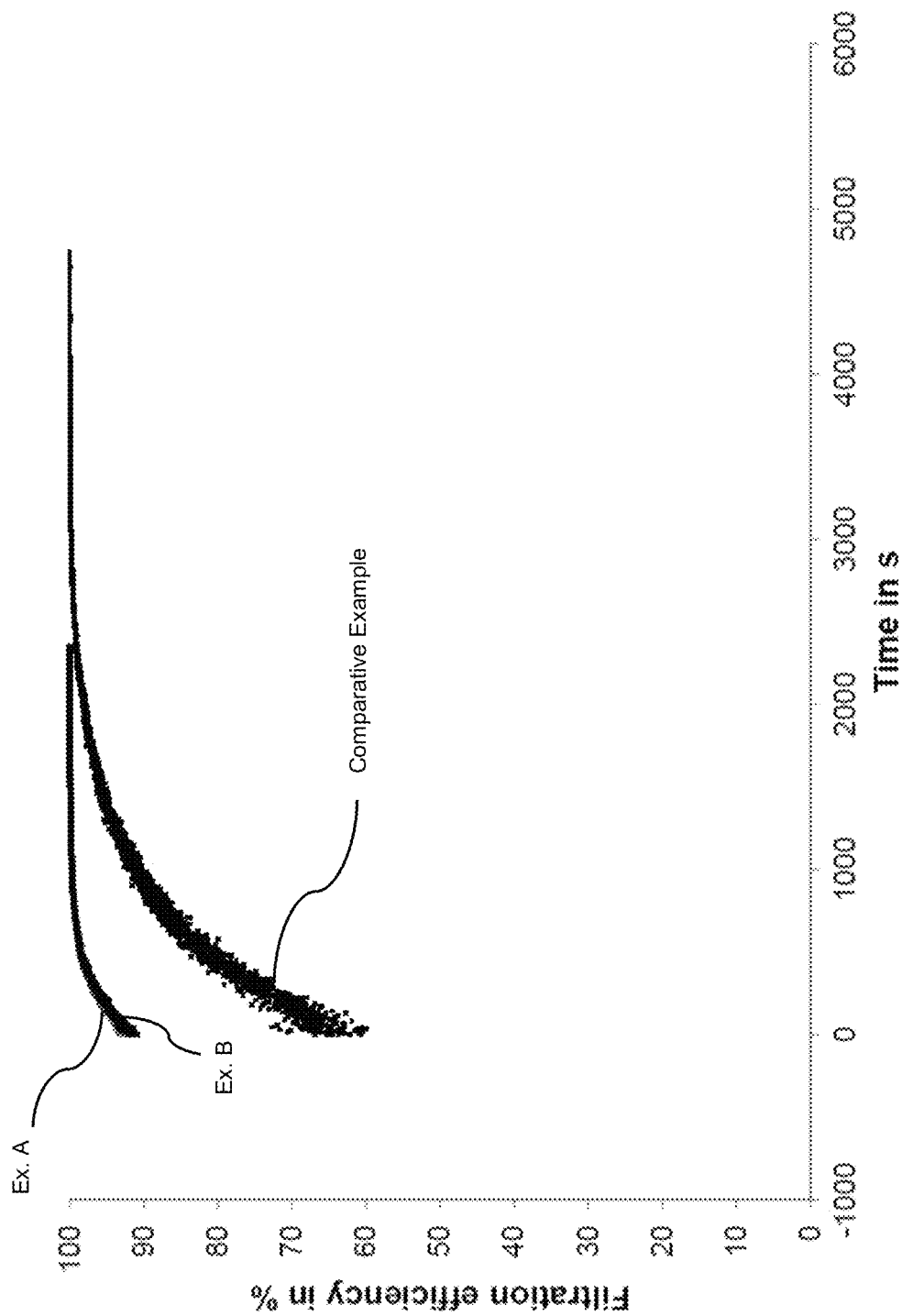
FIG. 21 is a graph of filtration efficiency vs. time (seconds) for two examples made in accordance with embodiments of the disclosure compared with a comparative example.

The experiment is performed at controlled temperature, for example, room temperature. As used herein, "room temperature" refers to a temperature of 20° C. During the experiment, the gas flow is adjusted to a constant flow rate. Then particulates are added to the gas. Across the filter sample, a certain portion of the particulates are removed by filtration, which is measured as difference between the inlet and the outlet particle concentration. An example of such an experiment is shown in FIG. 21, for two experimental samples A and B made in accordance with the embodiments described herein plotted against a conventional sample (Comparative). In the example shown, the particles were soot particles generated on a soot generator and the volumetric flow rate was 21 $m^3/h$. The testing was conducted at room temperature and atmospheric pressure. Plotted is the filtration efficiency calculated from the inlet and outlet concentration according to eqn. (1) vs. the time of the experiment. At time t=0 s the dosing of the particles starts and the filtration efficiency is recorded. For the different filter samples, different values in filtration efficiency are observed.

Figure 22:
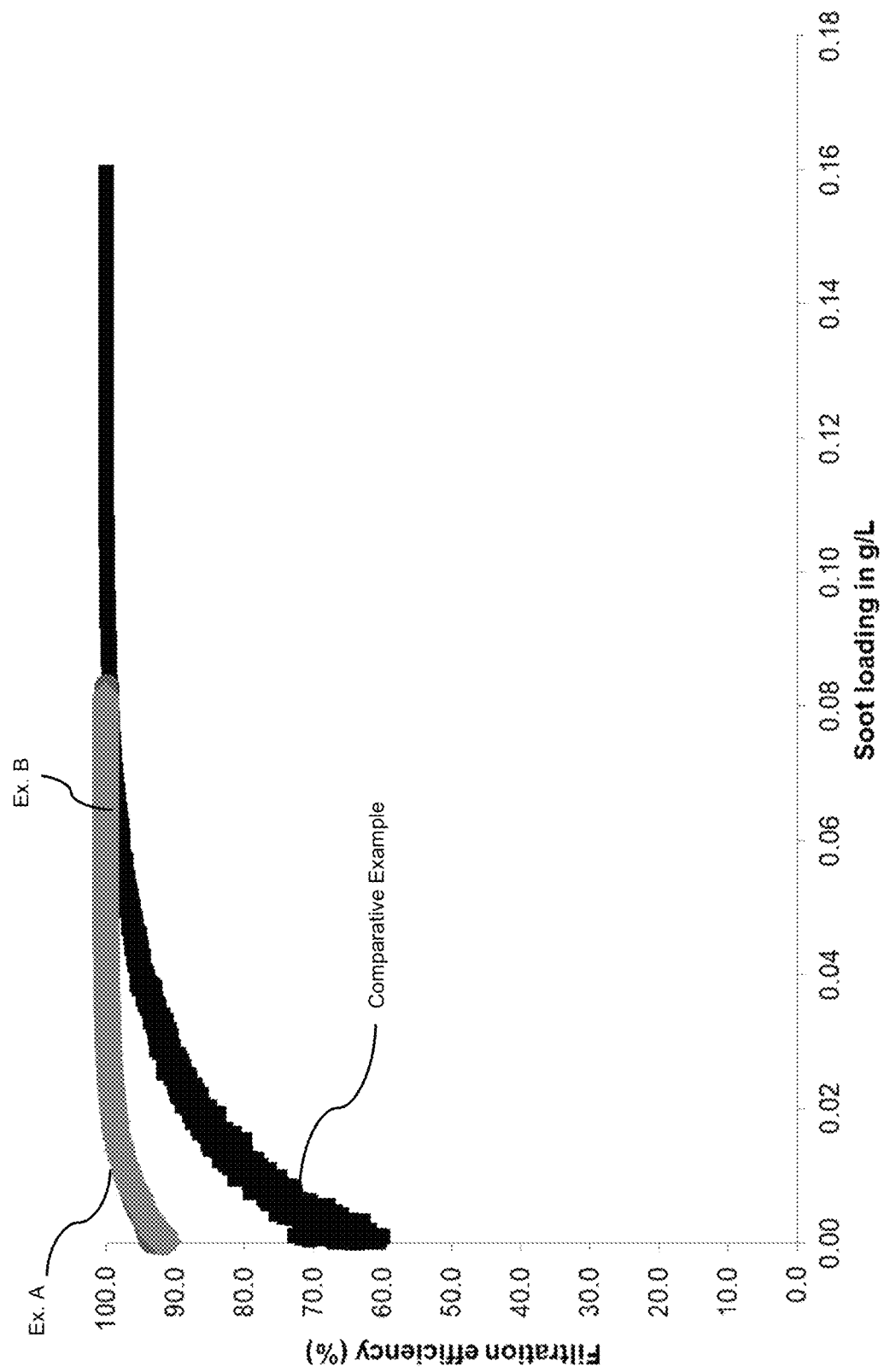
FIG. 22 is a graph of filtration efficiency vs. soot loading (g/L) for two examples made in accordance with embodiments of the disclosure compared with a comparative example.

As shown in FIG. 21, the filtration efficiency in all cases increases with time. The reason for this is that the accumulated particles themselves, soot in this case, act as a filtration medium, enhancing the overall efficiency. To illustrate this more effectively it is helpful to plot the filtration as function of the accumulated soot mass instead of the time. The soot mass is obtained as the difference between the soot entering the filter and the soot mass leaving the filter integrated over time. The data from FIG. 21 in this format are provided in FIG. 22.

The filtration efficiency at the beginning, time equal t=0 s or 0 g/L soot load is usually called "clean" or "fresh" filtration efficiency and is determined only by the characteristics of the filter sample. Based on filtration theory the filtration process occurs based on different mechanism, primarily depending on the size of the particles. A common model to describe filtration media is the concept of an assembly of unit collectors. For the soot generated by the soot generator of the experiments described above, the dominating filtration mechanism is that based on Brownian motion of the small soot particles. The collection efficiency of a unit collector based on the Brownian motion mechanism $\eta_{BM}$ can be described by:

$$\eta_{BM} = 4 \cdot \frac{A_s^{1/3}}{Pe_i^{2/3}} \cdot (1-\varepsilon)^{2/3} \quad \text{Eqn. (2)}$$

$A_s$ is a parameter, primarily dependent on the porosity $\varepsilon$ and $Pe_i$ being the Peclet number. The Peclet number is proportional to the fluid velocity inside the pore space $u_w/\varepsilon$ and the ratio between collector diameter $d_c$ and diffusion coefficient for Brownian motion $D_{BM}$.

$$Pe_i = \frac{u_w}{\varepsilon} \cdot \frac{d_c}{D_{BM,i}} \quad \text{Eqn. (3)}$$

The particle size $d_s$ and temperature T dependence of this collection mechanism are introduced via the Brownian diffusion coefficient, $D_{BM} \sim (T/ds^2)$. Combining all parameters that depend on the microstructure of the filtration medium into a single variable $K_{microstructure}$, eqn.(2) can be rewritten as Eqn. (4):

$$\eta_{BM} = K_{Microstructure} \cdot \left(\frac{D_{BM}}{u_w}\right)^{2/3} \qquad \text{Eqn. (4)}$$

The fluid velocity uw is determined from the volumetric flow rate divided by the cross-sectional area or filtration area. Thus, in addition to microstructural characteristics, the filtration performance at a given flow rate and particle size is proportional to the filtration area of a filter. Therefore, to compare materials with different microstructures, the filtration efficiency is normalized by the filtration area. For honeycomb wall flow filters with alternately plugged channels, the filtration surface area FSA in m² can be obtained from eqn. (5):

$$FSA = \frac{GSA}{2} \cdot V_{Filter} \qquad \text{Eqn. (5)}$$

In eqn. (5) GSA is the geometric surface area per volume of filter and $V_{Filter}$ is the volume of the filter sample. The factor ½ originates from the fact that only one half of the channels represent inlet channels through which the gas enters and then flows across the porous filter wall. Filtration area (or total filtration) would be total inlet cells area+total outlet cells area=total area. In other words, in eqn. (5), the total inlet cells area, which can be calculated by total area divided by 2 if the total inlet cells area=total outlet cells area. However, if the total inlet cells area is not equal to the total outlet cells area, the denominator in the equation would have to be modified to reflect this.

In addition to the filtration performance filters, are commonly characterized by their resistance to flow, usually referenced as pressure drop across the sample at a given volumetric gas flow rate. Often higher filtration performance coincides with an increased pressure drop or resistance to flow. From an application point of view, it is usually desirable to have an as low as possible pressure drop, as the pressure drop usually means pumping losses. In motor vehicle applications, this results in a reduction in power available to propel the vehicle or a reduction in fuel efficiency.

Figure 24:
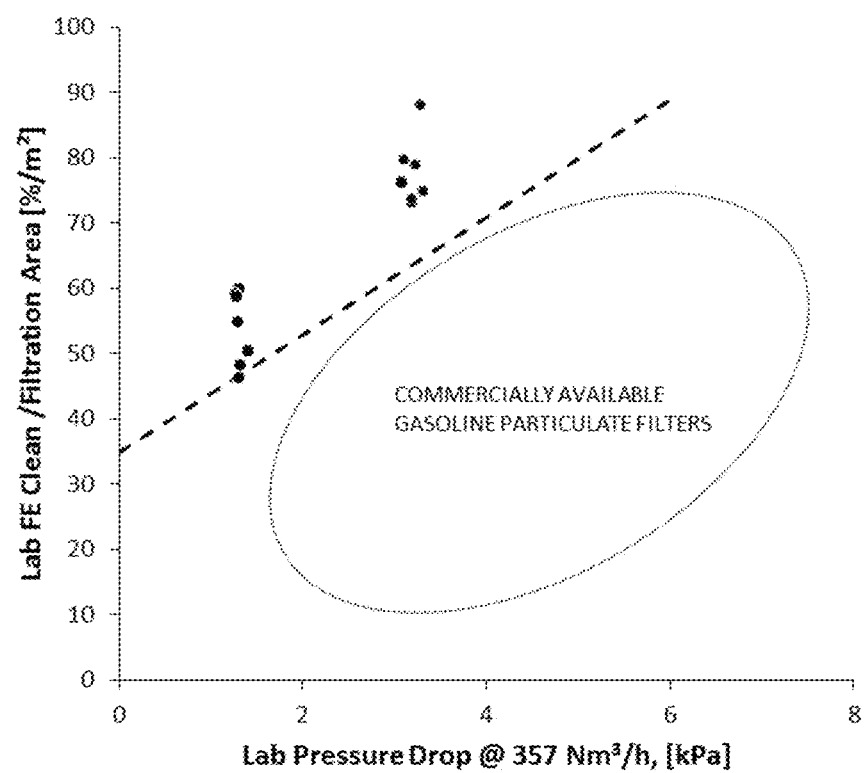
FIG. 24 is a graph of laboratory filtration efficiency/filtration area (%/m²) vs. laboratory pressure drop in kPA.

The pressure drop behavior of a filter sample is usually assessed by measuring the difference in pressure up and downstream of the filter sample at a given volumetric flow rate. In laboratory measurements this can be done at room temperature and at different flow rates. In FIG. 24, an example of pressure drop measurements is shown. Plotted is the pressure difference across the filter sample at different volumetric flow rates several experimental examples prepared according to the Examples described in this disclosure plotted against commercially available wall flow honeycomb particulate filters, both bare and containing catalytic coating. The testing was performed at room temperature. As a characteristic value, the pressure drop determined in these tests was used at the highest flow rate explored, 357 m³/h at normal conditions.

The filtration efficiency as well as the pressure drop performance as described above were tested over a wide range of filter samples available from prior art as well as for a number of inventive samples with a composite microstructure. For filtration the initial or clean filtration efficiency in % is considered (flow rate of 21 m³/h) and normalized by the filtration surface area of each sample. The pressure drop was assessed at the highest flow rate of 357 m³/h.

In FIG. 24, the data obtained from commercially available wall flow honeycomb particulate filters (Comparative) and samples made according to the Examples described herein are summarized. The commercially available wall flow honeycomb particulate filters (Comparative) comprised a number of uncoated filter samples with different microstructure and composition as well as filters that have been coated with different catalytic washcoats. As shown in FIG. 24, the Examples prepared according the instant disclosure are located in a different region of the filtration-pressure drop performance space of the graph, namely above the dotted line shown in FIG. 24. The dotted line, described by equation (6) can be defined as:

(Filtration Efficiency/Filtration area)≥$A$+$B$×(Clean Pressure Drop) Eqn. (6):

The filtration efficiency represents the clean or initial filtration efficiency in % at 21 m³/h and room temperature, the filtration area in m² and the clean pressure drop being measured at room temperature at 357 m³/h. The constants A and B are defined as follows:

A=35%/m²; B=9%/(m² kPa).

According to one or more embodiments, the particulate filters prepared according to the embodiments described herein exhibit advantageously high filtration efficiencies normalized to filtration area of the inlet channels. Thus, according to one or more embodiments, the particulate filters described herein provide high filtration efficiency in a fresh (new) state, immediately after installation in vehicles in the factories of car manufacturers. In some embodiments, this high filtration efficiency is provided with a low pressure drop.

While the claims of the present disclosure are not to be limited by a particular theory, it is believed that the pressure drop of a particulate filters is composed of five primary factors. These factors include contraction and expansion of the gas flow at the inlet and outlet of the filter, friction losses of the gas flow along the inlet and outlet channel, and pressure drop of the gas flow across the porous channel walls.

In general, pressure drop across a filter is affected by macroscopic geometric parameters such as part diameter, length, hydraulic diameter of the channels and open frontal area as well as by the permeability of the porous filter wall. The latter is the only material characteristic and is defined by the microstructure, for example, the porosity, the effective pore size and the pore connectivity. Since the gas flow through the pores is laminar, the frictional losses across the wall are determined by the entire path across the porous wall.

The inlet and outlet contributions of the pressure drop can be described by $$\Delta p_{(1,5)} = (\zeta_{in} + \zeta_{out}) \cdot \rho_g \cdot \left(\frac{Q \cdot L}{V_{Filter} \cdot OFA}\right)^2 \qquad \text{Eqn. (7)}$$

With Δp as pressure drop, $\rho_g$ as density of the gas, Q as volume flow rate, $V_{Filter}$ as filter volume, L as length of the filter, OFA as open frontal area of the filter and $\zeta_{in}$ and $\zeta_{out}$ as empirical contraction and expansion coefficients, respectively.

For the pressure drop inside the filter the equation provided as eqn. (26) in SAE Technical Paper 2003-01-0842 can be used, presented as Eqn. (8) herein.

$$\Delta p_{(2,3,4)} = \frac{Q_{eff}}{2} \cdot \frac{\mu}{V_{Filter}} \cdot (d_h + t_w)^2 \cdot \left( \frac{t_w}{d_h \cdot \kappa_{effective}} + \frac{8 \cdot F \cdot L^2}{3 \cdot d_h^4} \right) \quad \text{Eqn. (8)}$$

With the new variables $\mu$ as dynamic viscosity, $Q_{eff}$ as effective volume flow rate, $d_h$ as hydraulic channel diameter, $t_w$ as wall thickness, F as friction factor (F=28.45 for square channels) and $\kappa_{effective}$ as effective permeability of the wall. The effective volume flow rate differs from the total flow rate by a factor that considers the flow rate distribution along the inlet and outlet channel. It was found empirically that $Q_{eff}$=1.32*Q provides for a better description of experimental results.

The total pressure drop as measured in an experiment would be the sum of the contributions described by equation (7) and equation (8). In equation (7) and (8), all parameters are known and can be easily determined with the exception of the effective permeability of the wall material.

The effective permeability $\kappa_{effective}$ can be extracted from experimental data using equations (7) and (8). For this purpose, the pressure drop contribution due to inlet contraction and outlet expansion, eqn. (7), is subtracted from the experimental pressure drop value, providing for Eqn. (9)

$$\Delta p_{(2,3,4)} = \Delta p_{Experimental} - \Delta p_{(1,5)} \quad \text{Eqn. (9):}$$

Combining Eqn.(9) with Eqn.(8) and solving for the effective wall permeability $\kappa_{effective}$ yields:

$$\kappa_{effective} = \frac{t_w}{d_h} \cdot \left[ \frac{\Delta p_{Experimental} - \Delta p_{(1,5)}}{\frac{\mu \cdot Q_{eff}}{2 \cdot V_{Filter}} \cdot (d_h + t_w)^2} - \frac{8 \cdot F \cdot L^2}{3 \cdot d_h^4} \right]^{-1} \quad \text{Eqn. (10)}$$

The permeability of the porous wall of an extruded honeycomb body, $\kappa_0$, can usually be described reasonably well by the product of porosity $\varepsilon$ and the square of the effective median pore size $D_{50}$, both determined by mercury porosimetry, divided by 66.7:

$$\kappa_0 = \frac{\varepsilon \cdot D_{50}^2}{66.7} \quad \text{Eqn. (11)}$$

If coatings or other modifications are applied to the "as extruded" base wall portions of the porous wall with permeability $\kappa_0$ the permeability changes to a new effective permeability value, $\kappa_{effective}$, which can for example be determined using Eqn.(10) from experimental pressure drop values. This change in permeability relative to the permeability of the as extruded base wall portions of the honeycomb wall can also be described by a "Normalized Permeability Value (NPV)," describing the ratio of the effective permeability to the permeability of the non-modified original microstructure:

$$\text{NPV} = \kappa_{effective}/(\varepsilon D_{50}^2/66.7)_{bare} \quad \text{Eqn.(12)}$$

Figure 23:
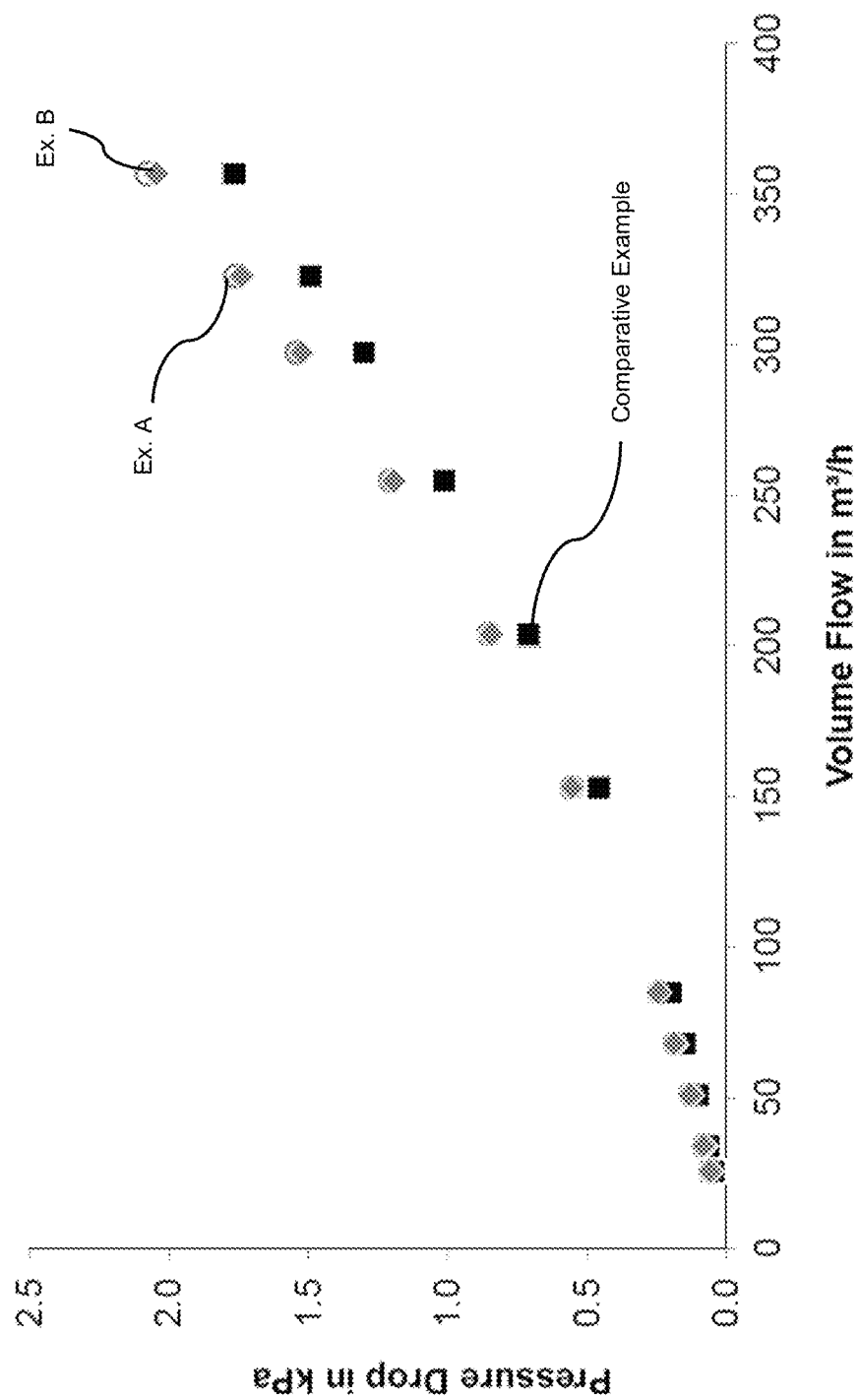
FIG. 23 is a graph of pressure drop vs. volume flow ($m^3/h$) for two examples made in accordance with embodiments of the disclosure compared with a comparative example.

The experimental pressure drop measurement to determine $\Delta p_{experimental}$ of a filter sample can be assessed by measuring the difference in pressure up and downstream of the filter sample at a given volumetric flow rate. In laboratory measurements this can be done at room temperature and at different flow rates. In FIG. 23, an example of pressure drop measurements is shown. Plotted is the pressure difference across the filter sample at different volumetric flow rates. The testing was performed at room temperature. As a characteristic value, the pressure drop determined in these tests at the highest flow rate explored, 357 m³/h at normal conditions was used.

As discussed above, particulate filters are characterized by the filtration efficiency, representing their ability to remove a certain fraction of particulates from an incoming gas stream. The particulates can be characterized by their mass concentrations or their number concentrations. Both values typically correlate closely. Using a generic concentration $C_{Particulate}$ with the units particulate mass or number per unit volume, the filtration efficiency FE is typically obtained from Eqn.(1) above.

Using the schematic for the generic laboratory setup is shown in FIG. 20, a particulate filter is tested at room temperature, a constant flow rate and then adding particulates are added to the gas. Across the filter sample, a certain portion of the particulates are removed by filtration, which is measured as difference between the inlet and the outlet particle concentration. An example of such an experiment is shown in FIG. 21, for two experimental samples A and B made in accordance with the embodiments described herein plotted against a conventional sample (Comparative). In the example shown, the particles were soot particles generated on a soot generator and the volumetric flow rate was 21 m³/h at normal conditions. The testing was done at room temperature. Plotted is the filtration efficiency calculated from the inlet and outlet concentration according to eqn. (1) vs. the time of the experiment. At time t=0 s the dosing of the particles starts and the filtration efficiency is recorded. For the different filter samples, different values in filtration efficiency are observed.

As shown in FIG. 21, the filtration efficiency in all cases increases with time. The reason for this is that the accumulated particles themselves, soot in this case, act as a filtration medium, enhancing the overall efficiency. To illustrate this more effectively it is helpful to plot the filtration as function of the accumulated soot mass instead of the time. The soot mass is obtained as the difference between the soot entering the filter and the soot mass leaving the filter integrated over time. The data from FIG. 21 in this format are provided in FIG. 22.

The filtration efficiency, as discussed above, at the beginning, time equal t=0 s or 0 g/L soot load is usually called "clean" or "fresh" filtration efficiency and is determined only by the characteristics of the filter sample. Based on filtration theory the filtration process occurs based on different mechanism, primarily depending on the size of the particles. A common model to describe filtration media is the concept of an assembly of unit collectors. For the soot generated by the soot generator of the experiments described above, the dominating filtration mechanism is that based on Brownian motion of the small soot particles. The collection efficiency of a unit collector based on the Brownian motion mechanism $\eta_{BM}$ can be described by Eqn. (2). As discussed above, the Peclet number is proportional to the fluid velocity inside the pore space $u_w/\varepsilon$ and the ratio between collector diameter $d_c$ and diffusion coefficient for Brownian motion $D_{BM}$ as shown by Eqn. (3) above.

SAE Technical Paper 2012-01-0363 explains that for an uncoated extruded filter with "random" porous microstructure, the clean filtration efficiency can be correlated to a filtration characteristic parameter $A_{Filt}$, which is proportional to microstructural as well as macroscopic filter properties, Eqn. (13):

$$A_{Filt} \sim \frac{\varepsilon^{0.43}}{D_{50}^{5/3}} \cdot \frac{t_w \cdot (CPSI)}{(Q/V_{Filter})^{2/3}} = EMF \cdot \frac{t_w \cdot (CPSI)}{(Q/V_{Filter})^{2/3}} \qquad \text{Eqn. (13)}$$

As new variables, Eqn. (13) has CPSI as cell density of the filter structure. A correlation between the clean filtration efficiency and this filtration characteristic parameter ($A_{FILT}$) can be plotted on a graph with clean filtration efficiency on the Y axis and the filtration characteristic parameter ($A_{FILT}$) on the X axis.

The contribution from the microstructural parameters, porosity and median pore size can be combined to an Effective Microstructure Factor, EMF. For materials for which the effective porosity and median pore size are not known, this new parameter can be used to characterize the effective properties of the microstructure. This variable also allows consideration of in real microstructures, that the filtration does not necessarily occur along the entire length of the pore across the filter wall, but rather to a larger extent locally at locations where favorable conditions exist for the collection and deposition of particles, e.g. passages with a narrow opening ("pore neck"). As soon as some particles are collected they further narrow this pore neck, accelerating the filtration process further. Thus, the new parameter allows for consideration of microstructures which are non-homogeneous and do not have a random pore design.

Analogous to what has been done for pressure drop, it is also useful to consider not only the new microstructure parameter EMF, but also normalize it for the properties of the base microstructure of the base wall portions of the as extruded filter body with random microstructure. For the latter the EMF is obtained as ratio of porosity $\varepsilon^{0.43}$ divided by the median pore size $D_{50}$ to the power of 5/3. Through this normalization we obtain the new Normalized Microstructure Filtration Value, NMFV, to describe the filtration characteristics of a microstructure as: Eqn.(14): NMFV=EMF/$(\varepsilon^{0.43}/D_{50}^{5/3})_{base\ wall\ properties}$ According to one or more embodiments, particulate filters are provided that yield a favorable (e.g. high) Normalized Permeability Value (NPV) while, at the same time, provide for an increase in the Normalized Microstructure Filtration Value (NMFV), e.g. materials that provide for low (change) in pressure drop combined with increased clean filtration.

The filtration efficiency as well as the pressure drop performance as described above were tested over a wide range of filter samples available from prior art as well as for a number of samples made in accordance with the present disclosure with a composite microstructure of porous wall surfaces defining the inlet channels, namely, inlet channels are comprised of the filtration material deposits as described according to one or more embodiments herein. For filtration, the initial or clean filtration efficiency in % is considered at a flow rate of 21 m³/h. The pressure drop was assessed at room temperature and the highest flow rate of 357 m³/h.

Figure 25:
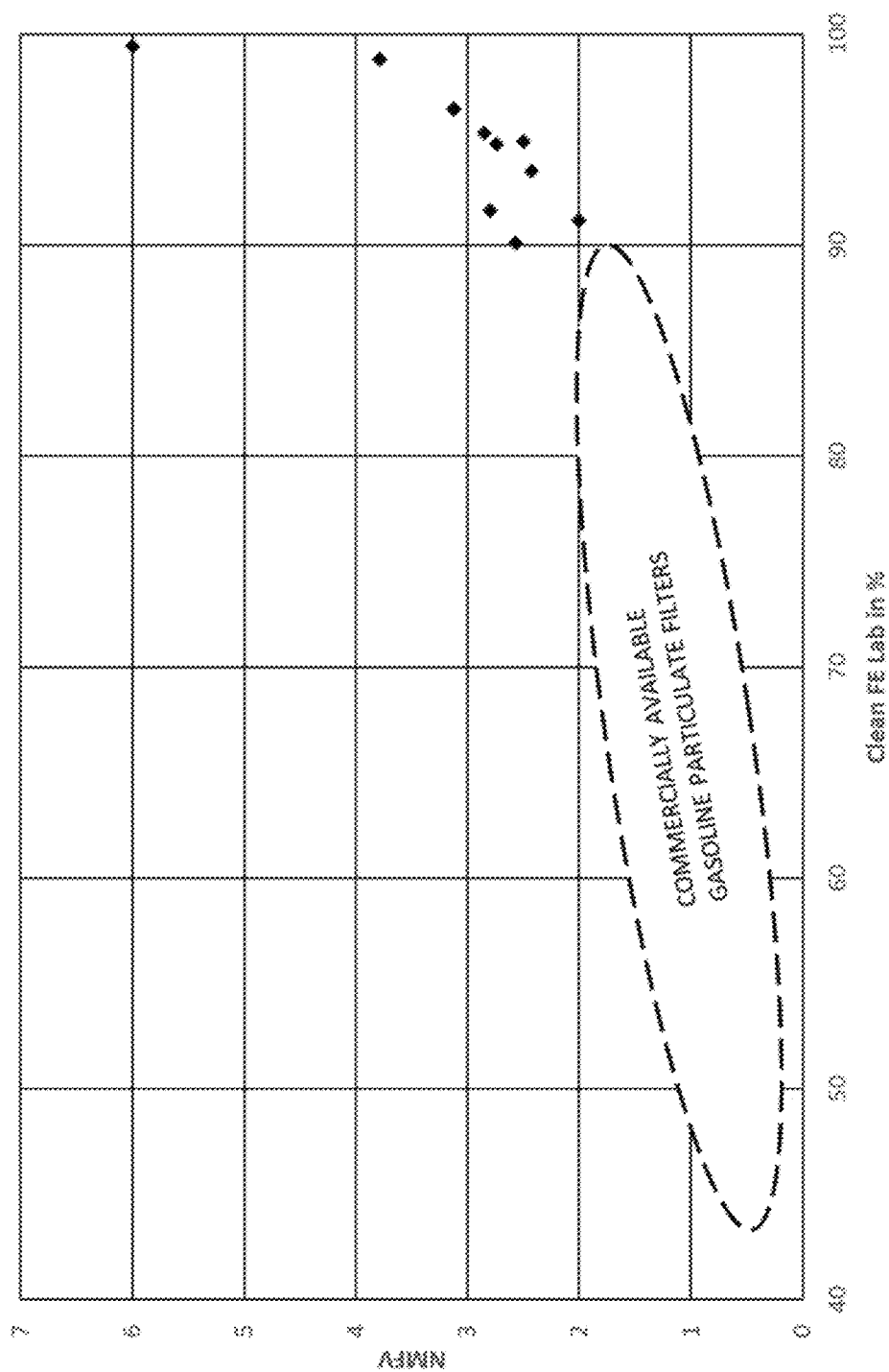
FIG. 25 is a graph showing parameter NPV versus parameter NMFV for samples prepared according to embodiments of the present disclosure.

The performance characteristics of the reference examples (e.g., commercially existing filters) and examples prepared in accordance with embodiments of the instant disclosure can be plotted. The Normalized Microstructure Filtration Value (NMFV) can be plotted on the Y axis versus clean filtration on the X axis to examine the data. A more useful plot of Normalized Permeability Value (NPV) on the Y axis versus the Normalized Microstructure Filtration Value (NMFV) on the X axis is shown in FIG. 25 for commercially available gasoline particulate filters and particulate filters prepared according to the Examples of the present disclosure (black diamonds). FIG. 25 shows that the particulate filter examples prepared according to the present disclosure exhibit both (1) an NPV value that is greater than 0.2 and (2) an NMFV value that is greater than 2. None of the commercially available gasoline particulate filters that were tested met both of these criteria. The domain of the Normalized Microstructure Filtration Value NMFV= EMF/$(\varepsilon^{0.43}/D^{5/3})_{base\ wall\ properties}$ of 2 or larger and a Normalized Permeability Value NPV=$\kappa_{effective}/(\varepsilon D_{50}^2/66.7)_{base\ wall\ properties}$ of 0.2 or larger is clearly novel and unique to the inventive particulate filters. Particulate filters that occupy this domain in which both (1) the NPV value is greater than 0.2 and (2) the NMFV value is greater than 2 exhibit advantageously high filtration efficiencies. Thus, according to one or more embodiments, the particulate filters described herein provide high filtration efficiency in a fresh (new) state, immediately after installation in vehicles in the factories of car manufacturers. In some embodiments, this high filtration efficiency is provided with a low pressure drop.

Honeycomb bodies and methods of making honeycomb bodies have been described herein. In embodiments, the honeycomb bodies comprise a layer onto at least one surface of a honeycomb body. The layer, in embodiments, has a crystalline structure, high porosity, such as greater than 90%, and the layer is applied as a thin layer, such as having a thickness of greater than or equal to 0.5 μm to less than or equal to 10 μm. It should be understood that in various of the embodiments described above a "honeycomb body" may be a ceramic "honeycomb body" and a "layer" may be a ceramic "layer."

Numbered embodiments as disclosed and described herein are now provided.

1. A honeycomb body comprising:
   a porous ceramic honeycomb structure comprising a first end, a second end, and a plurality of walls having wall surfaces defining a plurality of inner channels; and
   a porous inorganic layer disposed on one or more of the wall surfaces, wherein
   the porous inorganic layer has a porosity greater than 90%, and
   the porous inorganic layer has an average thickness of greater than or equal to 0.5 μm and less than or equal to 30 μm.

2. The honeycomb body of embodiment 1, wherein the porous inorganic layer has an average thickness of less than or equal to 20 μm.

3. The honeycomb body of embodiment 1 or 2, wherein the porous inorganic layer has an average thickness of less than or equal to 10 μm.

4. The honeycomb body of any of embodiments 1-3, wherein the porous inorganic layer comprises an oxide ceramic or an aluminum silicate.

5. The honeycomb body of any of embodiments 1-4, wherein the porous inorganic layer covers at least 70% of the wall surfaces.

6. The honeycomb body of any of embodiments 1-5, wherein the porous inorganic layer covers at least 90% of the wall surfaces.

7. The honeycomb body of embodiment 1, wherein the first end and the second end are spaced apart by an axial length, and the porous inorganic layer extends at least 60% along the axial length.

8. The honeycomb body of any of embodiments 1-7, wherein the porous inorganic layer extends at least 60% of a distance between the first end and the second end.

9. The honeycomb body of any of embodiments 1-8, wherein greater than 90% of the porous inorganic layer is disposed on the wall surfaces as a continuous coating.

10. The honeycomb body of any of embodiments 1-9, wherein the porous ceramic honeycomb structure has a porosity greater than or equal to 50%.

11. The honeycomb body of any of embodiments 1-10, wherein the porous ceramic honeycomb structure has a porosity greater than or equal to 55%.

12. The honeycomb body of any of embodiments 1-11, wherein the porous ceramic honeycomb structure has a porosity from greater than or equal to 50% to less than or equal to 70%.

13. The honeycomb body of any of embodiments 1-12, wherein the porous ceramic honeycomb structure has a bulk median pore size greater than or equal to 10 μm.

14. The honeycomb body of any of embodiments 1-13, wherein the porous ceramic honeycomb structure has a bulk median pore size greater than or equal to 15 μm.

15. The honeycomb body of any of embodiments 1-14, wherein the porous ceramic honeycomb structure has a bulk median pore size from greater than or equal to 8 μm to less than or equal to 25 μm.

16. The honeycomb body of any of embodiments 1-15, wherein the porous ceramic honeycomb structure has a porosity greater than or equal to 35%.

17. The honeycomb body of any of embodiments 1-16, wherein the porous ceramic honeycomb structure has a porosity greater than or equal to 40%.

18. The honeycomb body of any of embodiments 1-15, wherein the porous ceramic honeycomb structure has a porosity from greater than or equal to 35% to less than or equal to 60%.

19. The honeycomb body of any of embodiments 1-18, wherein the porous ceramic honeycomb structure has a surface median pore size greater than or equal to 8 μm.

20. The honeycomb body of any of embodiments 1-19, wherein the porous ceramic honeycomb structure has a surface median pore size greater than or equal to 10 μm.

21. The honeycomb body of any of embodiments 1-19, wherein the porous ceramic honeycomb structure has a surface median pore size from greater than or equal to 8 μm to less than or equal to 20 μm.

22. The honeycomb body of any of embodiments 1-21, wherein the porosity of the porous inorganic layer is greater than 95%.

23. The honeycomb body of any of embodiments 1-22, wherein the porosity of the porous inorganic layer is less than or equal to 98%.

24. The honeycomb body of any of embodiments 1-23, wherein the average thickness of the porous inorganic layer is greater than or equal to 1 μm to less than or equal to 20 μm.

25. The honeycomb body of any of embodiments 1-24, wherein the average thickness of the porous inorganic layer is greater than or equal to 1 μm to less than or equal to 10 μm.

26. The honeycomb body of any of embodiments 1-25, wherein the porous inorganic layer has a median pore size from greater than or equal to 0.1 μm to less than or equal to 5 μm.

27. The honeycomb body of any of embodiments 1-26, wherein the porous inorganic layer has a median pore size from greater than or equal to 0.1 μm to less than or equal to 4 μm.

28. The honeycomb body of any of embodiments 1-27, wherein the porous inorganic layer is comprised of particles having a mean particle size from greater than or equal to 5 nm to less than or equal to 3 μm.

29. The honeycomb body of any of embodiments 1-27, wherein the porous inorganic layer is comprised of particles having a mean particle size from greater than or equal to 100 nm to less than or equal to 3 μm.

30. The honeycomb body of any of embodiments 1-27, wherein the porous inorganic layer is comprised of particles having a mean particle size from greater than or equal to 200 nm to less than or equal to 1 μm.

31. The honeycomb body of any of embodiments 1-29, wherein the porous inorganic layer is comprised of at least one of alumina, mullite, or $(Al_2O_3)_x(SiO_2)_y$, where x equals 2 or 3 and y equals 1 or 2 having a mean particle size from greater than or equal to 5 nm to less than or equal to 3 μm.

32. The honeycomb body of embodiment 31, wherein the porous inorganic layer has a mean particle size from greater than or equal to 100 nm to less than or equal to 3 μm.

33. The honeycomb body of embodiment 31, wherein the porous inorganic layer has a mean particle size from greater than or equal to 200 nm to less than or equal to 1 μm.

34. The honeycomb body of any of embodiments 1-27, wherein the porous inorganic layer is comprised of alumina having a mean particle size from greater than or equal to 5 nm to less than or equal to 3 μm.

35. The honeycomb body of embodiment 34, wherein the porous inorganic layer is comprised of alumina having a mean particle size from greater than or equal to 100 nm to less than or equal to 3 μm.

36. The honeycomb body of embodiment 34, wherein the porous inorganic layer is comprised of alumina having a mean particle size from greater than or equal to 200 nm to less than or equal to 3 μm.

37. The honeycomb body of any of embodiments 1-30, wherein the porous inorganic layer comprises a member selected from the group consisting of $SiO_2$, $Al_2O_3$, MgO, $ZrO_2$, CaO, $TiO_2$, $CeO_2$, $Na_2O$, Pt, Pd, Ag, Cu, Fe, Ni, and mixtures thereof.

38. The honeycomb body of embodiment 37, wherein the porous inorganic layer has an amorphous structure.

39. The honeycomb body of embodiment 37, wherein the porous inorganic layer has a crystalline structure.

40. The honeycomb body of any of embodiments 1-39, wherein the porous inorganic layer has a permeability is greater than or equal to $10^{-15}$ m$^2$.

41. The honeycomb body of any of embodiments 1-39, wherein the porous inorganic layer has a permeability is greater than or equal to $10^{-14}$ m$^2$.

42. The honeycomb body of any of embodiments 1-39, wherein the porous inorganic layer has a permeability is greater than or equal to $10^{-13}$ m$^2$.

43. The honeycomb body of any of embodiments 1-39, wherein the porous inorganic layer has a permeability is greater than or equal to $10^{-12}$ m$^2$.

44. The honeycomb body of any of embodiments 1-43, wherein the porous inorganic layer is free from cracks having a width greater 5 μm and length greater than 1 mm.

45. The honeycomb body of any of embodiments 1-44, wherein at least a portion of the inner channels are plugged at the first end of the porous ceramic honeycomb body.

46. The honeycomb body of any of embodiments 1-45, wherein at least a portion of the inner channels are plugged at the second end of the porous ceramic honeycomb body.

47. The honeycomb body of embodiments 1-46, wherein the honeycomb body has an initial filtration efficiency of greater than or equal to 75% measured with 120 nm particulate at 21 Nm$^3$/h.

48. The honeycomb body of embodiments 1-47, wherein the honeycomb body has an initial filtration efficiency of greater than or equal to 90%.

49. The honeycomb body of embodiments 1-45, wherein a filtration efficiency of the honeycomb body is greater than or equal to 70% measured with 120 nm particulate at a velocity of 1.7 meters/second and a soot load equal to 0.01 g/L.

50. The honeycomb body of embodiment 49, wherein the filtration efficiency of the honeycomb body is greater than or equal to 80%.

51. The honeycomb body of embodiment 50, wherein the filtration efficiency of the honeycomb body is greater than or equal to 90%.

52. The honeycomb body of embodiment 51, wherein the filtration efficiency of the honeycomb body is greater than or equal to 95% measured.

53. The honeycomb body of embodiment 45, wherein a maximum pressure drop across the honeycomb body is less than or equal to 20%.

54. The honeycomb body of embodiment 45, wherein a maximum pressure drop across the honeycomb body is less than or equal to 10%.

55. The honeycomb body of any of embodiments 1-54, wherein the porous inorganic layer comprises synthetic mullite.

56. The honeycomb body of any of embodiments 1-55, wherein the porous inorganic layer is sintered to one or more of the wall surfaces.

57. A ceramic filter article comprising:
a porous ceramic body comprising a honeycomb structure comprised of a plurality of walls, each of the walls comprising a porous ceramic base wall portion, wherein there is a first group of the walls, and wherein each of the first group of walls further comprises a surrogate retentate layer forming an outermost wall layer, the outermost wall layers defining a first group of channels, wherein the surrogate retentate layer has a porosity greater than 90% and an average thickness of greater than or equal to 0.5 µm and less than or equal to 30 µm.

58. The ceramic filter article of embodiment 57, wherein the surrogate retentate layer is comprised of a first porous inorganic layer.

59. The ceramic filter article of embodiment 57, wherein the surrogate retentate layer is comprised of a first porous organic layer.

60. The ceramic filter article of embodiment 57, wherein the porous ceramic base wall portion is comprised of a predominant base ceramic phase and the first porous inorganic layer is comprised of a predominant first ceramic phase which is different from the base ceramic phase.

61. The ceramic filter article of embodiment 60, wherein the base ceramic phase comprises cordierite.

62. The ceramic filter article of embodiment 60, wherein the first ceramic phase is comprised of alumina or silica, or a combination thereof.

63. The ceramic filter article of embodiment 60, wherein the first ceramic phase is selected from the group consisting of CaO, Ca(OH)$_2$, CaCO$_3$, MgO, Mg(OH)$_2$, MgCO$_3$, SiO$_2$, Al$_2$O$_3$, Al(OH)$_3$, calcium aluminates, magnesium aluminates, and mixtures thereof.

64. The ceramic filter of any of embodiments 58-63, wherein the first porous inorganic layer comprises synthetic mullite.

65. The ceramic filter of any of embodiments 58-63, wherein the first porous inorganic layer is sintered to the porous ceramic base wall portion.

66. A ceramic filter article comprising:
a porous ceramic body comprising a honeycomb structure comprised of a plurality of walls defining a plurality of channels, each wall being comprised of a porous ceramic base wall portion, wherein at least some of the walls comprise a first porous inorganic outer layer disposed on the porous ceramic base wall portion, the first porous inorganic outer layer providing a first outermost wall surface, wherein the plurality of walls intersect to define first channels surrounded by the first outermost wall surfaces,
wherein the first porous inorganic layer has a porosity greater than 90%, and an average thickness of greater than or equal to 0.5 µm and less than or equal to 30 µm.

67. The ceramic filter article of embodiment 66, wherein the walls further comprise a second outermost wall surface provided by the porous ceramic base wall portion, and the second outermost wall surfaces define a plurality of second channels surrounded by the second outermost wall surfaces.

68. The ceramic filter article of embodiment 66, wherein at least a majority of the first channels are open at a first end of the porous ceramic body and sealed at a second end of the porous ceramic body, and wherein at least a majority of the second channels are open at a second end of the porous ceramic body and sealed at a first end of the porous ceramic body.

69. The ceramic filter article of embodiment 66, wherein at least some of the walls comprise a second porous inorganic outer layer disposed on the porous ceramic base wall portion, the second porous inorganic outer layer providing a second outermost wall surface, wherein the plurality of walls intersect to define second channels surrounded by the second outermost wall surfaces.

70. The ceramic filter article of embodiment 66, wherein at least a majority of the first channels are open at a first end of the porous ceramic body and sealed at a second end of the porous ceramic body, and wherein at least a majority of the second channels are open at a second end of the porous ceramic body and sealed at a first end of the porous ceramic body.

71. The ceramic filter article of embodiment 66, wherein the porous ceramic base wall portion has a porosity in the range between 30% and 70%.

72. The ceramic filter article of embodiment 66, wherein the porous ceramic base wall portion has a porosity in the range between 30% and 70%.

73. The ceramic filter article of embodiment 66, wherein the first porous inorganic outer layer is comprised of flame deposition particles.

74. The ceramic filter article of embodiment 62, wherein the first porous inorganic outer layer is comprised of CVD particles.

75. The ceramic filter of any of embodiments 66-74, wherein the first porous inorganic layer comprises synthetic mullite.

76. The ceramic filter of any of embodiments 66-75, wherein the first porous inorganic layer is sintered to the porous ceramic base wall portion.

77. A ceramic filter article comprising:
a porous ceramic body comprising a honeycomb structure comprised of a plurality of walls, wherein at least some of the walls comprise opposing first and second surfaces and a base wall portion disposed between the first and second surfaces, and the plurality of walls intersect to define first channels by the first surfaces and second channels with the second surfaces, wherein at least the first surfaces or the second surfaces are at least partially provided by a porous inorganic layer disposed on the base wall portion, wherein the porous inorganic layer has a porosity greater than 90%, and the porous inorganic layer has an average thickness of greater than or equal to 0.5 µm and less than or equal to 30 µm.

78. The ceramic filter article of embodiment 77, wherein both the first and second surfaces are at least partially provided by a porous inorganic layer disposed on the base wall portion.

79. The ceramic filter article of embodiment 77, wherein the porous inorganic layer is disposed on the inlet surfaces of at least some of the walls.

80. The ceramic filter article of embodiment 77, wherein the porous inorganic layer is disposed only on the inlet surfaces of at least some of the walls.

81. The ceramic filter article of embodiment 77, wherein the outlet surfaces are free of any porous inorganic layer.

82. The ceramic filter of any of embodiments 77-81, wherein the porous inorganic layer comprises synthetic mullite.

83. The ceramic filter of any of embodiments 77-82, wherein the porous inorganic layer is sintered to the base wall portion.

84. A particulate filter comprising:
a honeycomb body comprising a plugged porous ceramic honeycomb structure comprising a plurality of intersecting porous walls arranged in a matrix of cells, the porous walls comprising porous wall surfaces that define a plurality of channels extending from an inlet end to an outlet end of the structure, the plurality of channels comprising inlet channels sealed at or near the outlet end and having a surface area, and outlet channels sealed at or near the inlet end and having a surface area;
wherein one or more of the porous wall surfaces defining the inlet channels comprise a base wall portion and filtration material deposits disposed on the base wall portion such that at least a portion of the porous wall surfaces defining the inlet channels are comprised of the filtration material deposits forming a porous inorganic layer having a porosity greater than 90%;
wherein the honeycomb body comprises a total inlet surface area (SATOT) which is a sum of the surface areas of all the porous walls defining the inlet channels;
wherein the particulate filter induces a pressure drop (DP) for a flow of air through the particulate filter (AIRSCFM) at an air temperature (AIRTEMP), the flow of air containing particulates having an average size of 100 nm;
wherein, when the particulate filter contains less than 0.01 grams of the particulates per volume of the honeycomb structure in liters (g/L), the particulate filter traps the particulates being carried by the flow of air into the particulate filter with a filtration efficiency (FE) measured at AIRTEMP=room temperature and at a flow rate of 21 m$^3$/h such that FE/SATOT is greater than (9*DP+35) in units of %/m$^2$, with DP in units of kPa measured at a flow rate of 357 m$^3$/h and measured at AIRTEMP=room temperature; and
wherein the base wall portion is comprised of a first ceramic composition, and the filtration material deposits are comprised of second ceramic composition, and the first and second ceramic compositions differ.

85. The particulate filter of embodiment 84, wherein the porous inorganic layer has average thickness of greater than or equal to 0.5 µm and less than or equal to 30 µm.

86. The particulate filter of embodiments 84 or 85, wherein the second ceramic composition is comprised of alumina or silica, or a combination thereof.

87. The particulate filter of embodiments 84 or 85, wherein the second ceramic composition is selected from the group consisting of CaO, Ca(OH)$_2$, CaCO$_3$, MgO, Mg(OH)$_2$, MgCO$_3$, SiO$_2$. Al$_2$O$_3$, Al(OH)$_3$, calcium aluminates, magnesium aluminates, and mixtures thereof.

88. The particulate filter of embodiments 84 of 85, wherein the second ceramic composition is cordierite and the second ceramic composition is alumina.

89. The particulate filter of embodiments 76 or 77, wherein the porous inorganic layer comprises an oxide ceramic or an aluminum silicate.

90. The particulate filter of any of embodiments 84-89, wherein the porous inorganic layer covers at least 70% of the porous wall surfaces.

91. The particulate filter of any of embodiments 76-81, wherein the porous inorganic layer covers at least 90% of the porous wall surfaces.

92. The particulate filter of any of embodiments 84-89, wherein the inlet end and the outlet end are spaced apart by an axial length, and the porous inorganic layer extends at least 60% along the axial length.

93. The particulate filter of any of embodiments 84-89, wherein the porous inorganic layer extends at least 60% of a distance between the inlet end and the outlet end.

94. The particulate filter of any of embodiments 84-89, wherein greater than 90% of the porous inorganic layer is disposed on the porous wall surfaces as a continuous coating.

95. The particulate filter of any of embodiments 84-94, wherein the porous ceramic honeycomb structure has a porosity from greater than or equal to 50% to less than or equal to 70%.

96. The particulate filter of any of embodiments 84-95, wherein the porous ceramic honeycomb structure has a bulk median pore size greater than or equal to 10 µm.

97. The particulate filter of any of embodiments 84-95, wherein the porous ceramic honeycomb structure has a bulk median pore size greater than or equal to 15 µm.

98. The particulate filter of any of embodiments 84-95, wherein the porous ceramic honeycomb structure has a bulk median pore size from greater than or equal to 8 µm to less than or equal to 25 µm.

99. The particulate filter of embodiment 84, wherein the filtration material deposits comprise synthetic mullite.

100. The ceramic filter of embodiment 84, wherein the filtration material deposits are sintered to the porous ceramic base wall portion.

101. A particulate filter comprising:
a honeycomb body comprising a plugged porous ceramic honeycomb structure comprising a plurality of intersecting porous walls comprising porous wall surfaces that define a plurality of channels extending from an inlet end to an outlet end of the structure, the plurality of channels comprising inlet channels sealed at or near the outlet end and having a surface area, and outlet channels sealed at or near the inlet end and having a surface area, the inlet channels and the outlet channels defining filtration area;
wherein one or more of the porous wall surfaces defining the inlet channels comprise a base wall portion and filtration material deposits disposed on the base wall portion such that at least a portion of the porous wall surfaces defining the inlet channels are comprised of the filtration material deposits forming a porous inorganic layer having a porosity greater than 90%; and wherein the particulate filter exhibits a clean filtration efficiency in % per filtration area in m² that is equal to or greater than a value of (A+B*Clean Pressure Drop), A and B are defined as A=35%/m² and B=9%/(m² kPa), the clean filtration efficiency measured at room temperature and at a flow rate of 21 m³/h on a particulate filter having a soot load of less than 0.01 g/L, and the clean pressure drop measured at a flow rate of 357 m³/h on a soot free filter.

102. The particulate filter of embodiment 101, wherein one or more of the porous wall surfaces defining the inlet channels comprise a base wall portion comprised of a first ceramic composition and filtration material deposits disposed on the base wall portion are comprised of a second ceramic composition, and the first and second ceramic compositions differ.

103. The particulate filter of embodiment 101, wherein the porous inorganic layer has average thickness of greater than or equal to 0.5 µm and less than or equal to 30 µm.

104. The particulate filter of embodiment 101, wherein the second ceramic composition is comprised of alumina or silica, or a combination thereof.

105. The particulate filter of embodiment 101, wherein the second ceramic composition is selected from the group consisting of CaO, Ca(OH)$_2$, CaCO$_3$, MgO, Mg(OH)$_2$, MgCO$_3$, SiO$_2$. Al$_2$O$_3$, Al(OH)$_3$, calcium aluminates, magnesium aluminates, and mixtures thereof.

106. The particulate filter of embodiment 101, wherein the first ceramic composition is cordierite and the second ceramic composition is alumina.

107. The particulate filter of embodiment 101, wherein the porous inorganic layer comprises an oxide ceramic or an aluminum silicate.

108. The particulate filter of embodiment 101, wherein the porous inorganic layer covers at least 70% of the porous wall surfaces.

109. The particulate filter of embodiment 101, wherein the porous inorganic layer covers at least 90% of the porous wall surfaces.

110. The particulate filter of embodiment 101, wherein the inlet end and the outlet end are spaced apart by an axial length, and the porous inorganic layer extends at least 60% along the axial length.

111. The particulate filter of embodiment 106, wherein the porous inorganic layer extends at least 60% of a distance between the inlet end and the outlet end.

112. The particulate filter of embodiment 101, wherein greater than 90% of the porous inorganic layer is disposed on the porous wall surfaces as a continuous coating.

113. The particulate filter of embodiment 101, wherein the porous ceramic honeycomb structure has a porosity from greater than or equal to 50% to less than or equal to 70%.

114. The particulate filter of embodiment 106, wherein the porous ceramic honeycomb structure has a bulk median pore size greater than or equal to 10 µm.

115. The particulate filter of embodiment 101, wherein the porous ceramic honeycomb structure has a bulk median pore size greater than or equal to 15 µm.

116. The particulate filter of embodiment 101, wherein the porous ceramic honeycomb structure has a bulk median pore size from greater than or equal to 8 µm to less than or equal to 25 µm.

117. The particulate filter of embodiment 101, wherein the filtration material deposits comprise synthetic mullite.

118. The ceramic filter of embodiment 84, wherein the filtration material deposits are sintered to the porous ceramic base wall portion.

119. A particulate filter comprising:
a honeycomb body comprising a plugged porous ceramic honeycomb structure comprising a plurality of intersecting porous walls comprising porous wall surfaces that define a plurality of channels extending from an inlet end to an outlet end of the porous ceramic honeycomb structure, the plurality of channels comprising inlet channels sealed at or near the outlet end and having a surface area, and outlet channels sealed at or near the inlet end and having a surface area, the inlet channels and the outlet channels defining filtration area;

wherein one or more of the porous wall surfaces defining the inlet channels comprise a base wall portion and filtration material deposits disposed on the base wall portion to provide a composite microstructure such that at least a portion of the porous wall surfaces defining the inlet channels are comprised of the filtration material deposits forming a porous inorganic layer having a porosity greater than 90% and the composite microstructure having a porosity ($\varepsilon$) as measured by mercury porosimetry, a median pore diameter ($D_{50}$) as measured by mercury porosimetry, a permeability factor ($\kappa$) and an Effective Microstructural Factor (EMF) measured wherein, the composite microstructure is characterized by a Normalized Microstructure Filtration Value NMFV= EMF/($\varepsilon^{0.43}/D_{50}^{5/3}$)$_{base\ wall\ properties}$ of 2 or larger and a Normalized Permeability Value NPV=$\kappa_{effective}$/($\varepsilon D_{50}^2$/66.7)$_{base\ wall\ properties}$ of 0.2 or larger.

120. The particulate filter of embodiment 119, wherein one or more of the porous wall surfaces defining the inlet channels comprise a base wall portion comprised of a first ceramic composition and filtration material deposits disposed on the base wall portion are comprised of a second ceramic composition, and the first and second ceramic compositions differ.

121. The particulate filter of embodiment 119, wherein the porous inorganic layer has average thickness of greater than or equal to 0.5 µm and less than or equal to 30 µm.

122. The particulate filter of embodiment 119, wherein the second ceramic composition is comprised of alumina or silica, or a combination thereof.

123. The particulate filter of embodiment 119 wherein the second ceramic composition is selected from the group consisting of CaO, Ca(OH)$_2$, CaCO$_3$, MgO, Mg(OH)$_2$, MgCO$_3$, SiO$_2$. Al$_2$O$_3$, Al(OH)$_3$, calcium aluminates, magnesium aluminates, and mixtures thereof.

124. The particulate filter of embodiment 119, wherein the first ceramic composition is cordierite and the second ceramic composition is alumina.

125. The particulate filter of embodiment 119, wherein the porous inorganic layer comprises an oxide ceramic or an aluminum silicate.

126. The particulate filter of embodiment 119, wherein the porous inorganic layer covers at least 70% of the porous wall surfaces.

127. The particulate filter of embodiment 119, wherein the porous inorganic layer covers at least 90% of the porous wall surfaces.

128. The particulate filter of embodiment 119, wherein the inlet end and the outlet end are spaced apart by an axial length, and the porous inorganic layer extends at least 60% along the axial length.

129. The particulate filter of embodiment 119, wherein the porous inorganic layer extends at least 60% of a distance between the inlet end and the outlet end.

130. The particulate filter of embodiment 122, wherein greater than 90% of the porous inorganic layer is disposed on the porous wall surfaces as a continuous coating.

131. The particulate filter of embodiment 119, wherein the porous ceramic honeycomb structure has a porosity from greater than or equal to 50% to less than or equal to 70%.

132. The particulate filter of embodiment 119, wherein the porous ceramic honeycomb structure has a bulk median pore size greater than or equal to 10 μm.

133. The particulate filter of embodiment 119, wherein the porous ceramic honeycomb structure has a bulk median pore size greater than or equal to 15 μm.

134. The particulate filter of embodiment 119, wherein the porous ceramic honeycomb structure has a bulk median pore size from greater than or equal to 8 μm to less than or equal to 25 μm.

135. The particulate filter of embodiment 119, wherein the particulate filter exhibits a change in filtration efficiency of less than 5% after being exposed to to a high flow condition of 850 $Nm^3$/h of air for one minute at room temperature, and wherein the change in filtration efficiency is determined by measuring a difference between a number of soot particles that are introduced into the particulate filter and a number of soot particles that exit the particulate filter before and after exposure to the high flow condition, wherein the soot particles have a median particle size of 300 nm, a soot particle concentration of 500,000 particles/$cm^3$ in a stream of air flowed through the particulate filter at room temperature and at a velocity of 1.7 m/s as measured by a particle counter.

136. The particulate filter of embodiment 119, wherein the filtration material deposits comprise synthetic mullite.

137. The ceramic filter of embodiment 119, wherein the filtration material deposits are sintered to the porous ceramic base wall portion.

138. A particulate filter comprising:
a honeycomb body comprising a plugged porous ceramic honeycomb structure comprising a plurality of intersecting porous walls comprising porous wall surfaces that define a plurality of channels extending from an inlet end to an outlet end of the structure, the plurality of channels comprising inlet channels sealed at or near the outlet end and having a surface area, and outlet channels sealed at or near the inlet end and having a surface area, the inlet channels and the outlet channels defining filtration area;
wherein one or more of the porous wall surfaces defining the inlet channels comprise a base wall portion and filtration material deposits disposed on the base wall portion,
wherein the filtration material deposits are disposed on the base wall portions to provide a porous inorganic layer having a porosity greater than 90%,
and wherein the particulate filter exhibits a change in filtration efficiency of less than 5% after being exposed to to a high flow condition of 850 $Nm^3$/h of air for one minute at room temperature, and wherein the change in filtration efficiency is determined by measuring a difference between a number of soot particles that are introduced into the particulate filter and a number of soot particles that exit the particulate filter before and after exposure to the high flow condition, wherein the soot particles have a median particle size of 300 nm a soot particle concentration of 500,000 particles/$cm^3$ in a stream of air flowed through the particulate filter at room temperature and at a velocity of 1.7 m/s as measured by a particle counter.

139. The particulate filter of embodiment 138, wherein one or more of the porous wall surfaces defining the inlet channels comprise a base wall portion comprised of a first ceramic composition and filtration material deposits disposed on the base wall portion are comprised of a second ceramic composition, and the first and second ceramic compositions differ.

140. The particulate filter of embodiment 138, wherein the porous inorganic layer has average thickness of greater than or equal to 0.5 μm and less than or equal to 30 μm.

141. The particulate filter of embodiment 138, wherein the second ceramic composition is comprised of alumina or silica, or a combination thereof.

142. The particulate filter of embodiment 138, wherein the second ceramic composition is selected from the group consisting of CaO, Ca(OH)$_2$, CaCO$_3$, MgO, Mg(OH)$_2$, MgCO$_3$, SiO$_2$, Al$_2$O$_3$, Al(OH)$_3$, calcium aluminates, magnesium aluminates, and mixtures thereof.

143. The particulate filter of embodiment 138, wherein the first ceramic composition is cordierite and the second ceramic composition is alumina.

144. The particulate filter of embodiment 138, wherein the porous inorganic layer comprises an oxide ceramic or an aluminum silicate.

145. The particulate filter of embodiment 138, wherein the porous inorganic layer covers at least 70% of the porous wall surfaces.

146. The particulate filter of embodiment 138, wherein the porous inorganic layer covers at least 90% of the porous wall surfaces.

147. The particulate filter of embodiment 119, wherein the inlet end and the outlet end are spaced apart by an axial length, and the porous inorganic layer extends at least 60% along the axial length.

148. The particulate filter of embodiment 138, wherein the porous inorganic layer extends at least 60% of a distance between the inlet end and the outlet end.

149. The particulate filter of embodiment 122, wherein greater than 90% of the porous inorganic layer is disposed on the porous wall surfaces as a continuous coating.

150. The particulate filter of embodiment 138, wherein the porous ceramic honeycomb structure has a porosity from greater than or equal to 50% to less than or equal to 70%.

151. The particulate filter of embodiment 138, wherein the porous ceramic honeycomb structure has a bulk median pore size greater than or equal to 10 μm.

152. The particulate filter of embodiment 138, wherein the porous ceramic honeycomb structure has a bulk median pore size greater than or equal to 15 μm.

153. The particulate filter of embodiment 138, wherein the porous ceramic honeycomb structure has a bulk median pore size from greater than or equal to 8 μm to less than or equal to 25 μm.

154. The particulate filter of embodiment 138, wherein the particulate filter exhibits a change in filtration efficiency of less than 5% after being exposed to to a high flow condition of 850 $Nm^3$/h of air for one minute at room temperature, and wherein the change in filtration efficiency is determined by measuring a difference between a number of soot particles that are introduced into the particulate filter and a number of soot particles that exit the particulate filter before and after exposure to the high flow condition, wherein the soot particles have a median particle size of 300 nm a soot particle concentration of 500,000 particles/$cm^3$ in a stream of air flowed through the particulate filter at room temperature and at a velocity of 1.7 m/s as measured by a particle counter.

155. The particulate filter of embodiment 138, wherein the filtration material deposits comprise synthetic mullite.

156. The ceramic filter of embodiment 119, wherein the filtration material deposits are sintered to the porous wall surface.

157. A method of making a honeycomb body, the method comprising:

contacting an inorganic layer precursor with a gaseous carrier fluid;

depositing the inorganic layer precursor on a porous ceramic honeycomb structure by flowing the gaseous carrier fluid to the porous ceramic honeycomb structure, the porous ceramic honeycomb structure comprising a plurality of intersecting porous walls arranged in a matrix of cells, the porous walls comprising porous wall surfaces that define a plurality of channels extending from an inlet end to an outlet end of the structure, the plurality of channels comprising inlet channels sealed at or near the outlet end and having a surface area, and outlet channels sealed at or near the inlet end and having a surface area; and binding the inorganic layer precursor to the porous ceramic honeycomb structure to form a porous inorganic layer, wherein the porous inorganic layer has a porosity of greater than 90%, and the porous inorganic layer has an average thickness of greater than or equal to 0.5 µm to less than or equal to 30 µm.

158. The method of making the honeycomb body of embodiment 157, wherein the average thickness of the porous inorganic layer is greater than or equal to 1 µm to less than or equal to 20 µm.

159. The method of making the honeycomb body of embodiment 157, wherein the average thickness of the porous inorganic layer is greater than or equal to 1 µm to less than or equal to 10 µm.

160. The method of making the honeycomb body of any of embodiments 157-159, wherein the inorganic layer precursor comprises a ceramic precursor material.

161. The method of making the honeycomb body of embodiment 160, wherein the inorganic layer precursor comprises a solvent.

162. The method of making the honeycomb body of embodiment 161, wherein the solvent is selected from the group consisting of methoxyethanol, ethanol, water, xylene. methanol, ethylacetate, benzene, and mixtures thereof.

163. The method of making the honeycomb body of embodiment 160, further comprising decomposing the inorganic layer precursor by contacting the inorganic layer precursor with a flame.

164. The method of making the honeycomb body of any of embodiments 157-163, wherein the binding of the inorganic layer precursor to the ceramic honeycomb body comprises sintering the inorganic layer precursor.

165. The method of making the honeycomb body of embodiment 164, wherein the sintering of the inorganic layer precursor is conducted at a temperature from greater than or equal to 450° C. to less than or equal to 1150° C. for a duration of greater than or equal to 20 minutes to less than or equal to 12 hours.

166. The method of making the honeycomb body of embodiment 165, wherein the inorganic layer precursor is deposited on the ceramic honeycomb body as an amorphous phase having a porosity of greater than or equal to 98%, and
after sintering the inorganic layer precursor, an inorganic layer having a crystalline phase and a porosity of greater than or equal to 95% is present on the ceramic honeycomb body.

167. The method of making the honeycomb body of any of embodiments 157-163, wherein the binding the inorganic layer precursor to the ceramic honeycomb body comprises applying moisture to the ceramic layer precursor.

168. The method of making the honeycomb body of any of embodiments 157-163, wherein the ceramic layer precursor comprises a member selected from the group consisting of tetraethyl orthosilicate, magnesium ethoxide and aluminum(III) tri-sec-butoxide, trimethylaluminum, $AlCl_3$, $SiCl_4$, $Al(NO_3)_3$, aluminum isopropoxide, octamethyl cyclotetrasiloxane, and mixtures thereof.

169. A method of making a honeycomb body, the method comprising:

contacting an inorganic layer precursor with a gaseous carrier fluid;

vaporizing the inorganic layer precursor to form a gaseous inorganic layer precursor;

exposing the gaseous inorganic layer precursor to a flame to generate layer precursor particles;

depositing the layer precursor particles on a ceramic honeycomb structure by flowing the gaseous carrier fluid to the ceramic honeycomb structure; and sintering the inorganic layer precursor particles to the ceramic honeycomb body to form a porous inorganic layer, wherein the porous inorganic layer has a porosity of greater than 90%, and the porous inorganic layer has an average thickness of greater than or equal to 0.5 µm to less than or equal to 30 µm.

170. The method of making the honeycomb body of embodiment 169, wherein the porous inorganic layer comprises an oxide ceramic or an aluminum silicate.

171. The method of making the honeycomb body of embodiment 170, wherein the oxide ceramic comprises synthetic mullite.

EXAMPLES

Embodiments will be further clarified by the following examples.

Example 1

Flame pyrolysis with liquid precursor. This example tests the chemical durability and physical stability of a ceramic layer deposited on a cordierite honeycomb body. A layer precursor was formed from 2 parts tetraethyl orthosilicate and three parts aluminum (III) tri-sec-butoxide in a methoxyethanol/ethanol (1:1 volume ratio) solvent. The layer precursor was fed at a flow rate of 1 mL/min and contacted with an oxygen vaporizing gas that was fed at a flow rate of 5 L/min, which vaporized the layer precursor. The vaporized layer precursor was decomposed in a flame and thereafter deposited as an amorphous phase layer. The properties of the cordierite honeycomb body are listed in Table 1 below:

TABLE 1

| | Dimension (Dia. × Length) | CPSI/Wall thickness | Pore Size (µm) | Porosity |
|---|---|---|---|---|
| Honeycomb Body 1 | 5.66" × 4.5" | 200/8.5 | 14 | 55% |

Subsequently, the decomposed layer precursor was sintered by heating to 1150° C. for 30 min to form a crystalline phase ceramic layer on the cordierite honeycomb body (i.e., a honeycomb body). For testing purposes, a soot generating device (CAST2) was used to generate particles having an average particle diameter of 120 nm in the presence of an air flow rate of 350 L/minute (21 $Nm^3/h$). The filtration efficiency of Comparative Example 1, which is a honeycomb body without an inorganic coating, and Example 1, which is a honeycomb body with an inorganic coating, are provided in Table 2 below.

TABLE 2

Filtration Efficiency (FE) Comparison

| Ref | Lab $FE_{mass}$ at 0 g/l soot (%) | Lab $FE_{mass}$ at 0.01 g/l soot (%) | Lab $FE_{mass}$ at 0.1 g/l soot (%) | Maximum lab $FE_{mass}$ (%) | Soot loading @ $FE_{max}$ (g/L) |
|---|---|---|---|---|---|
| Comp. Ex. 1 | 73.4 | 88.3 | 100.0 | 100.0 | 8.7E−02 |
| Example 1 | 94.7 | 98.5 | 100.0 | 100.0 | 4.4E−02 |

Figure 6:
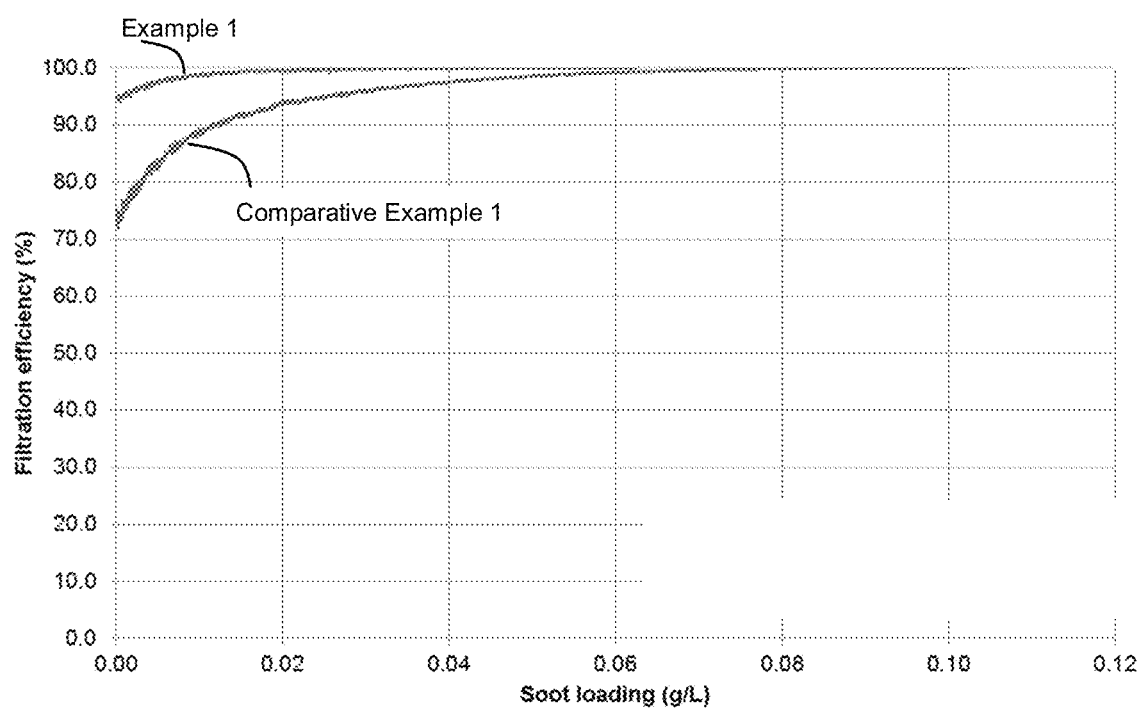
FIG. 6 is a graphical depiction of filtration efficiency of a honeycomb body according to embodiments disclosed and described herein.

As shown in Table 2, the filtration efficiency of Example 1 is much higher at low soot loads than the filtration efficiency of Comparative Example 1. Thus, a DPF or GPF with an inorganic coating according to embodiments disclosed and described herein will not be required to undergo the time-extensive process of building up a soot layer before the filter is able to achieve a high filtration efficiency, such as, for example, a filtration efficiency of greater than 90%. FIG. 6 is a graphical representation of the filtration efficiency versus soot loading, and shows the increased filtration efficiency provided by adding an inorganic layer to a honeycomb body according to embodiments disclosed and described herein.

Figure 7A:
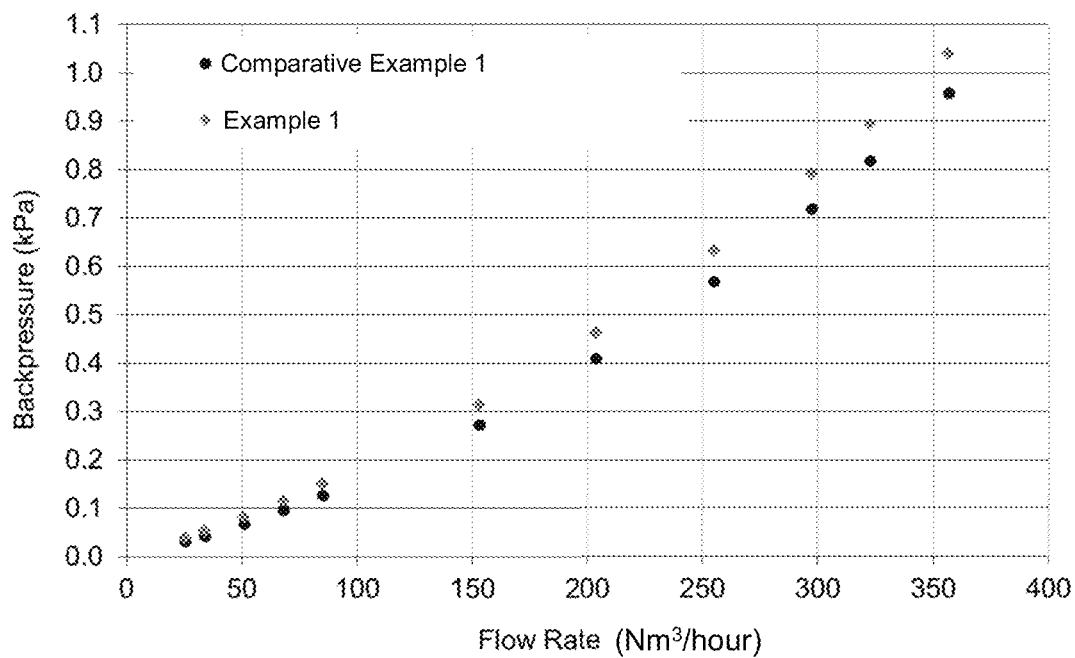
FIG. 7A is a graphical depiction of backpressure versus flow rate of a honeycomb body according to embodiments disclosed and described herein.
Figure 7B:
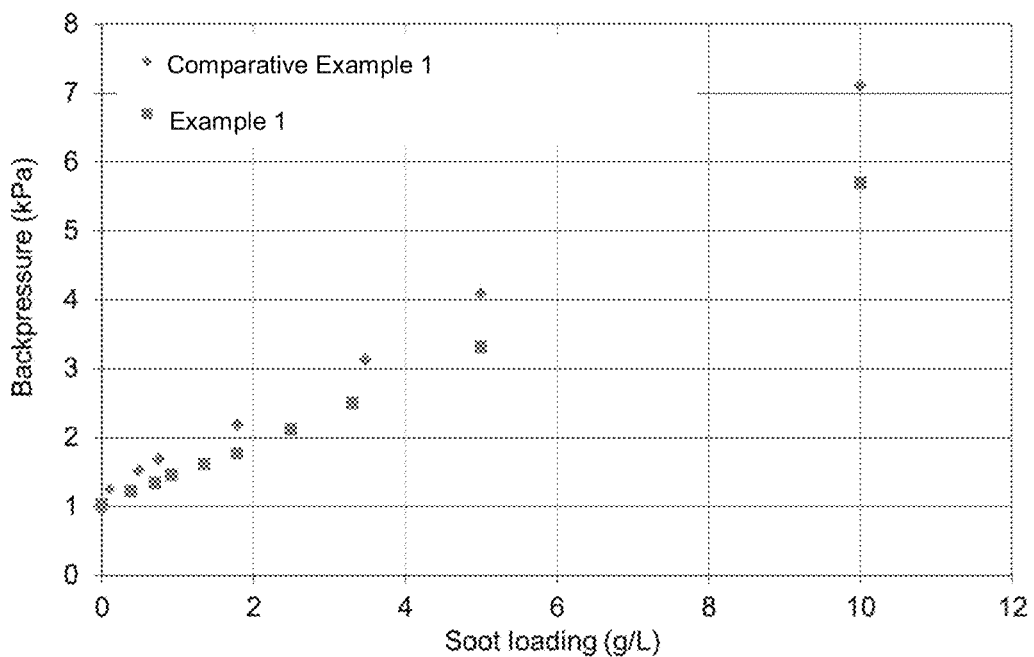
FIG. 7B is a graphical depiction of backpressure versus soot load of a honeycomb body according to embodiments disclosed and described herein.

FIGS. 7A and 7B graphically depict the backpressure of Example 1 and Comparative Example 1. FIG. 7A is a graphical depiction of the backpressure (kPa) versus flow rate ($Nm^3/h$) for Example 1 and Comparative Example 1. As is shown in FIG. 7A, the backpressure versus flow rate is very similar for both Example 1 and Comparative Example 1. Thus, as shown in FIG. 7A, there is not a significant backpressure penalty versus flow rate when an inorganic layer according to embodiments disclosed and described herein is applied to a honeycomb body. FIG. 7B is a graphical depiction of the backpressure (kPa) versus soot load level (g/L) for Example 1 and Comparative Example 1. As shown in FIG. 7B, the backpressure at every measured soot load shows less of a backpressure for Example 1 than for Comparative Example 1. Thus, there is not backpressure penalty for using an inorganic layer according to embodiments disclosed and described herein at various soot loads.

Figure 8A:
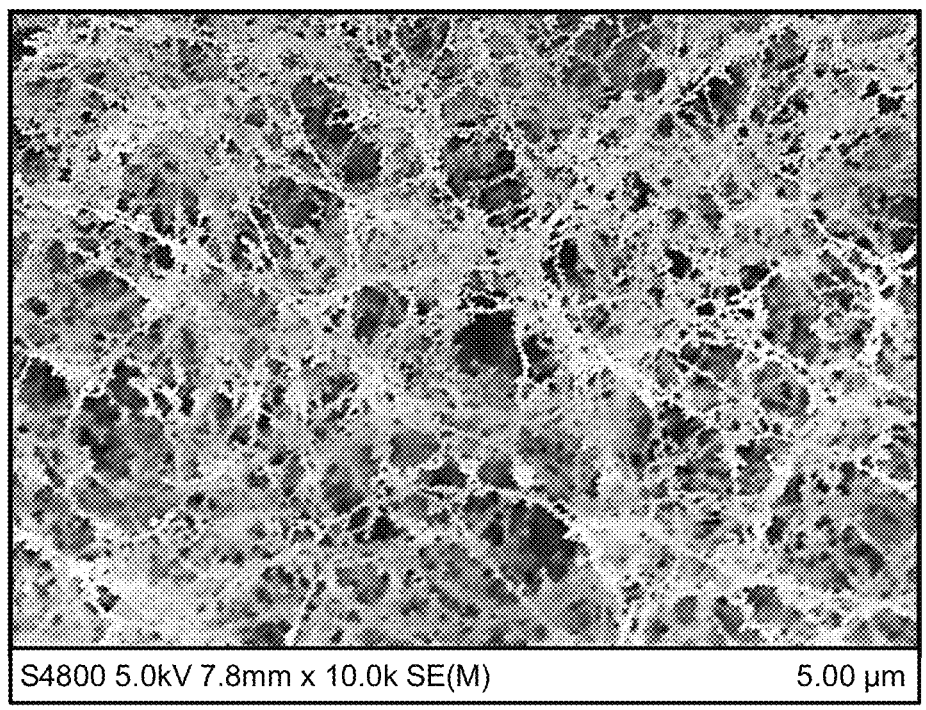
FIGS. 8A and 8B are SEM photographs of a honeycomb body according to embodiments disclosed and described herein.
Figure 8B:
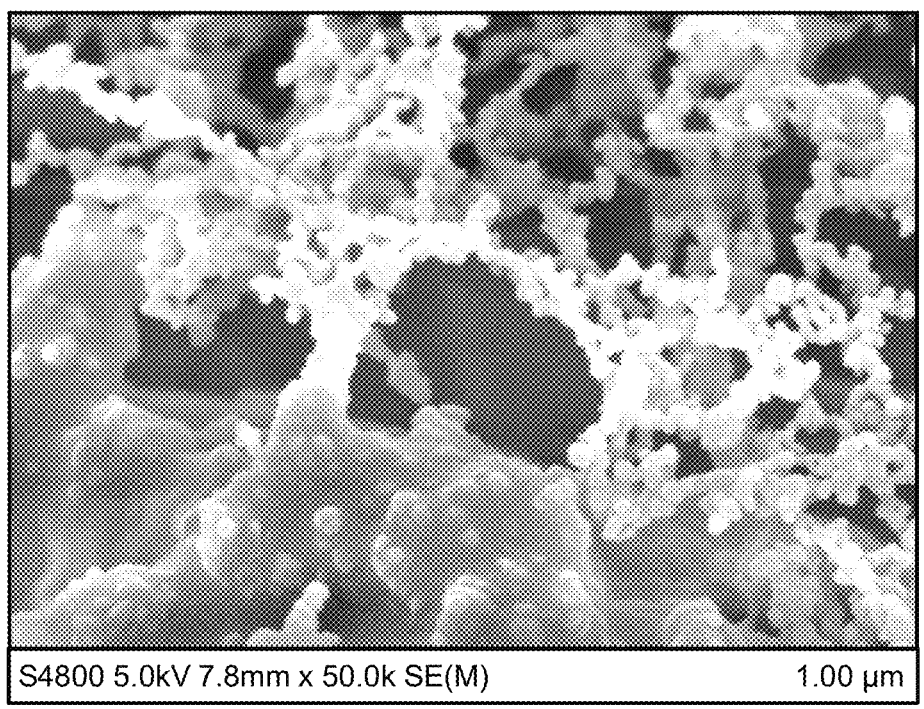

Table 3 below shows various properties of the inorganic layer of Example 1, and FIGS. 8A and 8B are SEM photographs of the inorganic layer of Example 1 taken at 5 μm and 1 μm magnification, respectively.

TABLE 3

| Property | Characterization Method | |
|---|---|---|
| Composition | Energy Dispersive X-ray Spectroscopy (EDX) | $3Al_2O_3 \cdot 2SiO_2$ |
| Loading | Weight measurement | 0.34 g/L |
| Inorganic layer surface area as-deposited | Brunauer, Emmett and Teller (BET) | 105.7 $m^2/g$ |
| Inorganic layer surface area after sinter | BET | 41.3 $m^2/g$ |
| Permeability | Modeled from pressure drop data | 3.00E−14 $m^2$ |
| Porosity as deposited | Based on density calculation of the inorganic layer | 97.8% |
| Porosity after sinter | Based on density calculation of the inorganic layer | 96.5% |

Example 2

Flame pyrolysis with vapor precursor. Aluminium isopropoxide and octamethyl cyclotetrasiloxane were used as the precursors for $xAl_2O_3 \cdot ySiO_2$. The precursor was heated up and the produced vapor was carried by $N_2$. The composition of the as-deposited layer was controlled in the window of $1.5 \leq x/y \leq 2$. The vaporized layer precursor was decomposed in a flame and thereafter deposited as an amorphous phase decomposed layer precursor on a cordierite honeycomb body having the properties listed in Table 4.

TABLE 4

| | Dimension (Dia. × Length) | CPSI/Wall thickness | Pore Size (μm) | Porosity |
|---|---|---|---|---|
| Honeycomb Body 2 | 4.055" × 5.47" | 200/8.5 | 14 | 55% |

In Table 4, CPSI is cells per square inch, porosity is measured by mercury intrusion porosimetry.

Subsequently, the decomposed layer precursor was sintered by heating to 1150° C. for 30 min to form a crystalline phase ceramic layer on the cordierite honeycomb body (i.e., a honeycomb body). Soot generation was conducted in accordance with Example 1. The filtration efficiency (FE) of Comparative Example 2, which is a honeycomb body without an inorganic coating, and Example 2, which is a honeycomb body with an inorganic coating are provided in Table 5 below.

TABLE 5

| | Lab $FE_{mass}$ at 0 g/l soot (%) | Lab $FE_{mass}$ at 0.01 g/l soot (%) | Lab $FE_{mass}$ at 0.1 g/l soot (%) | Maximum lab $FE_{mass}$ (%) | Soot loading @ $FE_{max}$ (g/L) |
|---|---|---|---|---|---|
| Comp. Ex. 2 | 58.9 | 73.5 | 99.3 | 100.0 | 1.4E−01 |
| Example 2 | 91.2 | 97.9 | 100.0 | 100.0 | 3.8E−02 |

Figure 9:
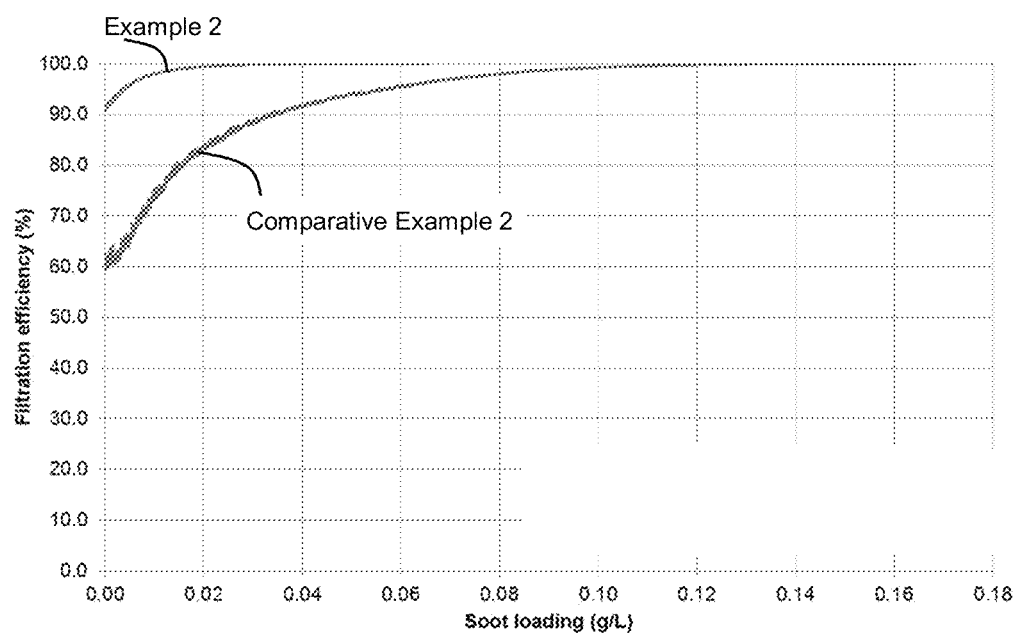
FIG. 9 is a graphical depiction of filtration efficiency of a honeycomb body according to embodiments disclosed and described herein.

As shown in Table 5, the filtration efficiency of Example 2 is much higher at low soot loads than the filtration efficiency of Comparative Example 2. Thus, a DPF or GPF with an inorganic coating according to embodiments disclosed and described herein will not be required to undergo the time-extensive process of building up a soot layer before the filter is able to achieve a high filtration efficiency, such as, for example, a filtration efficiency of greater than 90%. FIG. 9 is a graphical representation of the filtration efficiency versus soot loading, and shows the increased filtration efficiency provided by adding an inorganic layer to a honeycomb body according to embodiments disclosed and described herein.

Figure 10A:
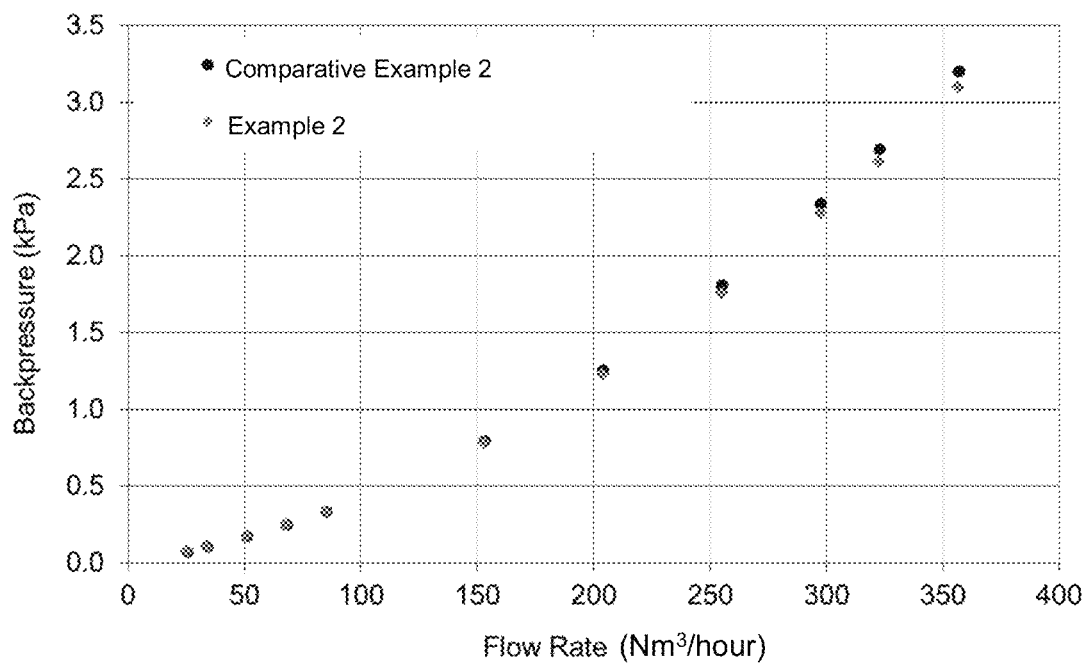
FIG. 10A is a graphical depiction of backpressure versus flow rate of a honeycomb body according to embodiments disclosed and described herein.
Figure 10B:
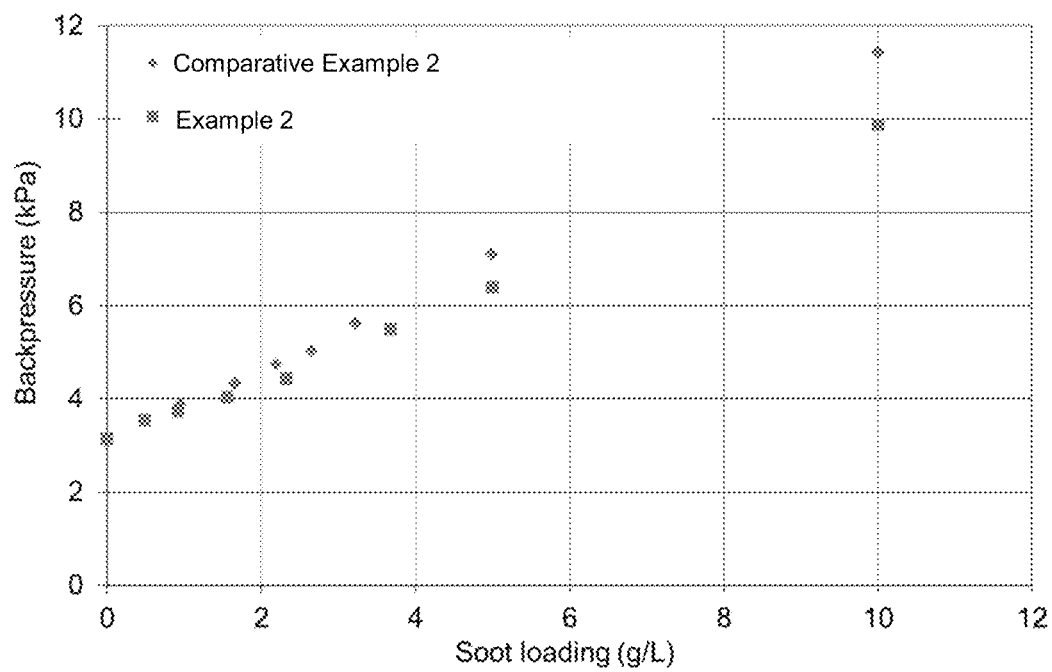
FIG. 10B is a graphical depiction of backpressure versus soot load of a honeycomb body according to embodiments disclosed and described herein.

FIGS. 10A and 10B graphically depict the backpressure of Example 2 and Comparative Example 2. FIG. 10A is a graphical depiction of the backpressure (kPa) versus flow rate (Nm$^3$/h) for Example 2 and Comparative Example 2. As is shown in FIG. 10A, the backpressure versus flow rate is very similar for both Example 2 and Comparative Example 2. Thus, as shown in FIG. 10A, there is not a significant backpressure penalty versus flow rate when an inorganic layer according to embodiments disclosed and described herein is applied to a honeycomb body. FIG. 10B is a graphical depiction of the backpressure (kPa) versus soot load level (g/L) for Example 2 and Comparative Example 2. As shown in FIG. 10B, the backpressure at every measured soot load shows less of a backpressure for Example 2 than for Comparative Example 2. Thus, there is not backpressure penalty for using an inorganic layer according to embodiments disclosed and described herein at various soot loads.

Figure 11A:
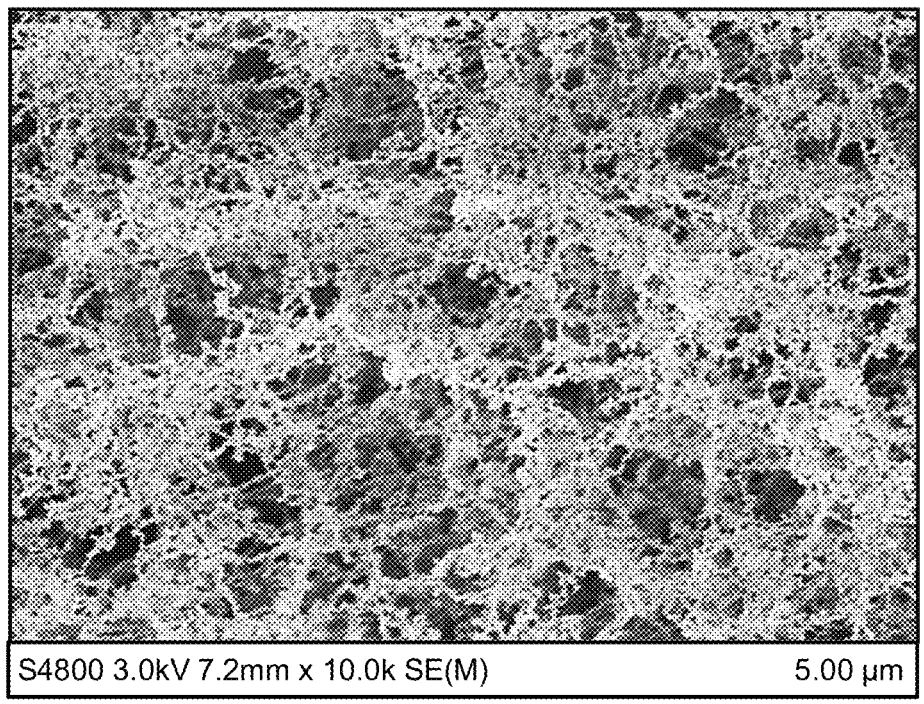
FIGS. 11A and 11B are SEM photographs of a honeycomb body according to embodiments disclosed and described herein.
Figure 11B:
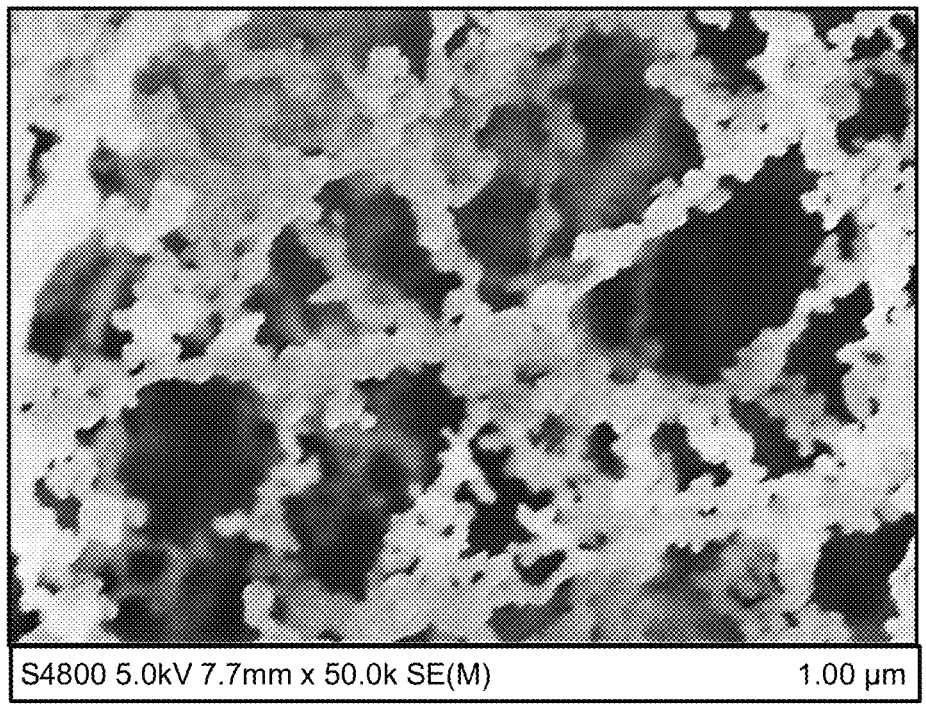

Table 6 below shows various properties of the inorganic layer of Example 2, and FIGS. 11A and 11B are SEM photographs of the inorganic layer of Example 2 taken at 5 µm and 1 µm magnification, respectively.

TABLE 6

| Property | Characterization method | |
|---|---|---|
| Composition | EDX | 3Al$_2$O$_3$ · 2SiO$_2$ ~ 2Al$_2$O$_3$ · SiO$_2$ |
| Loading | Weight measurement | 0.34 g/L |
| Inorganic layer surface area as-deposited | BET | 56.3 m$^2$/g |
| Inorganic layer surface area after sinter | BET | 47.6 m$^2$/g |
| Porosity as deposited | Based on density calculation of the inorganic layer | 98.0% |
| Porosity after sinter | Based on density calculation of the inorganic layer | 97.4% |

Figure 12:
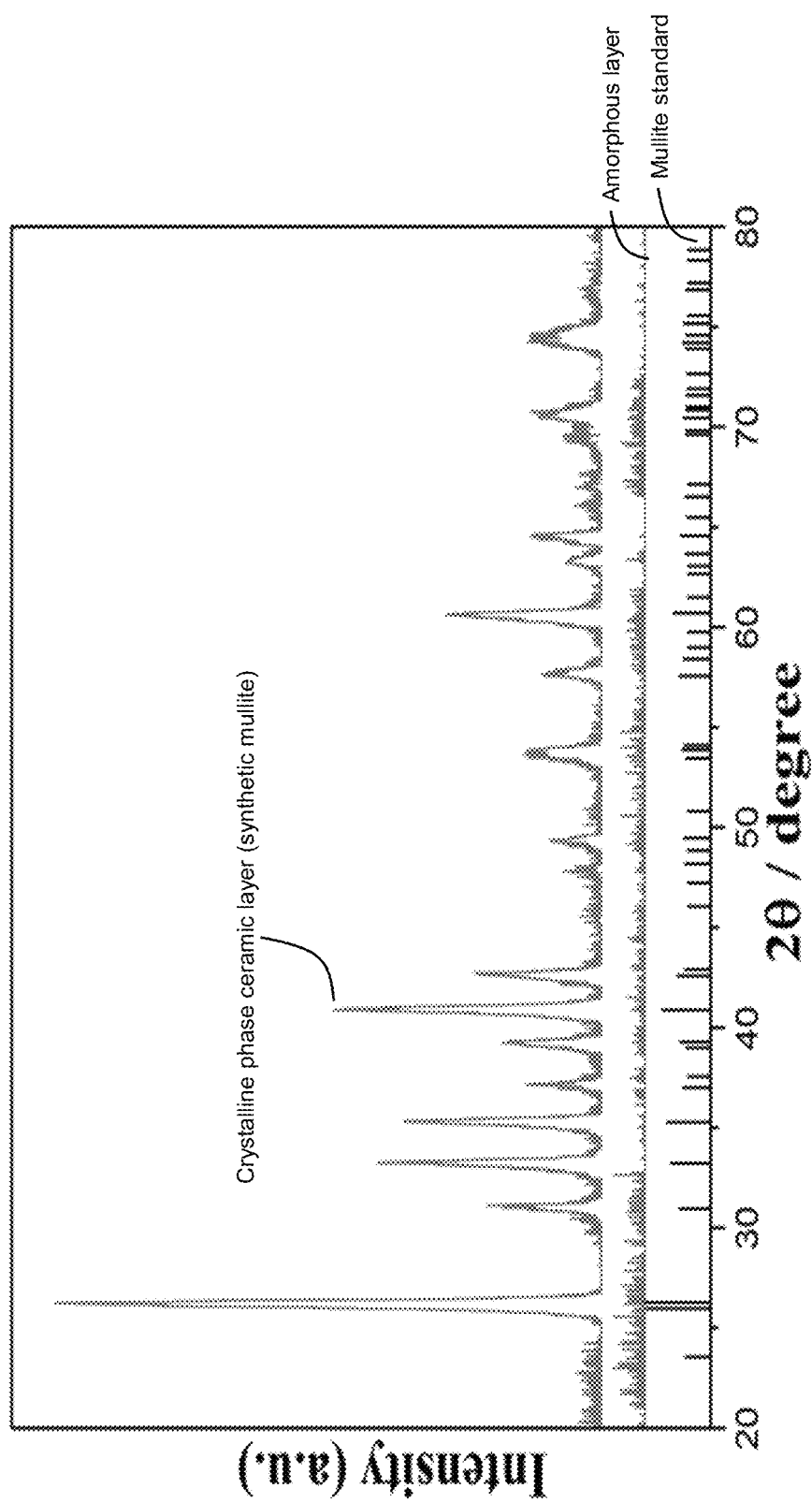
FIG. 12 is an XRD analysis of an amorphous phase decomposed layer precursor (as-deposited prior to sintering) and of a crystalline phase ceramic layer (after sintering)

FIG. 12 shows an XRD scan of the as-deposited inorganic layer (decomposed layer precursor), which depicts an amorphous phase; and of the inorganic layer after sintering, which depicts a crystalline phase ceramic layer having peaks that are consistent with the mullite standard pattern.

Example 3

Figure 19:
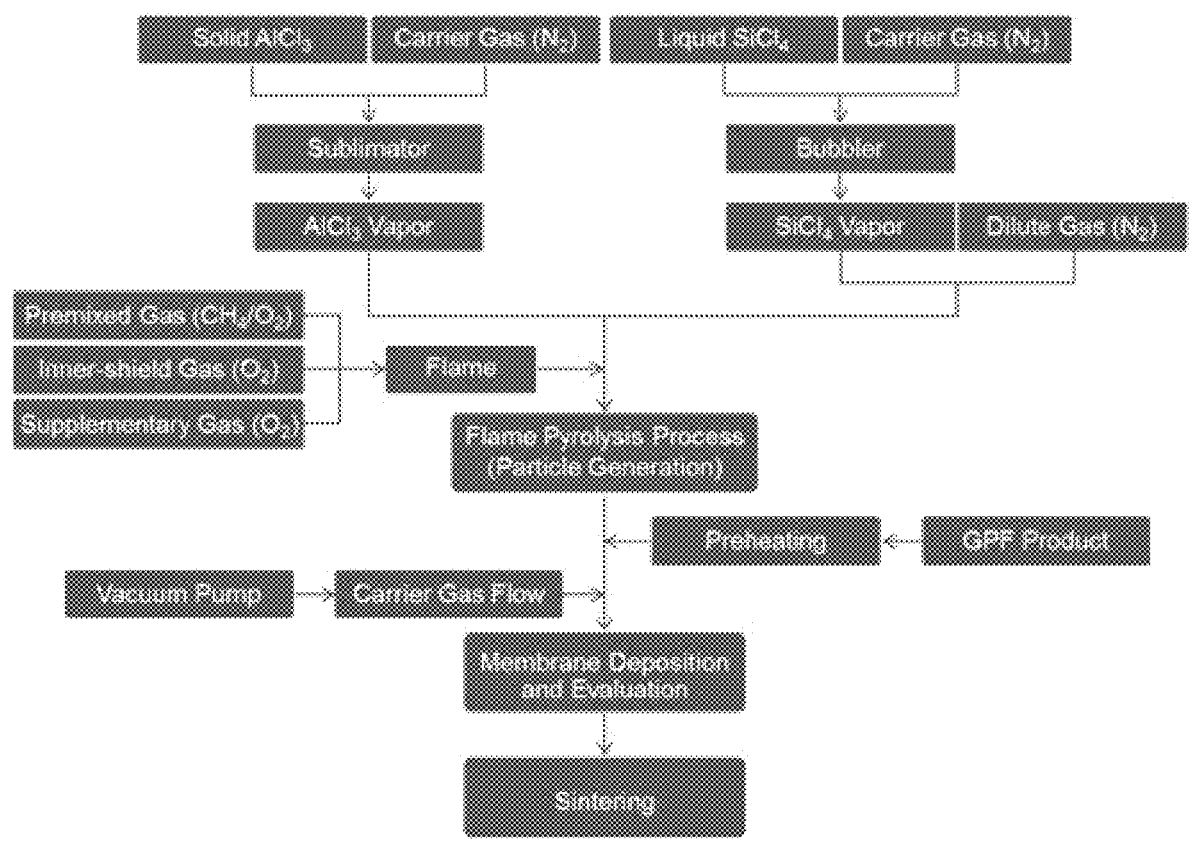
FIG. 19 is a flow chart of a flame pyrolysis process according to an embodiment.

Flame pyrolysis with vapor precursors. This example tests the chemical durability and physical stability of a ceramic layer deposited on a cordierite honeycomb body. FIG. 19 is a flow chart of the flame pyrolysis process used in this example. Ceramic precursors of synthetic mullite were: aluminium chloride (AlCl$_3$) in solid form, and silicon tetrachloride (SiCl$_4$) in liquid form. Nitrogen (N$_2$) was used as a carrier gas for AlCl$_3$ at 2.0 L/minute and for SiCl$_4$ at 0.3 L/minute. The solid AlCl$_3$ and its carrier gas passed through a heated sublimator (165° C.) to form gaseous AlCl$_3$. The liquid SiCl$_4$ and its carrier gas passed through a heated bubbler (35° C.) to form gaseous SiCl$_4$. The targeted Al/Si mass ratio was in the range of 2.9 to 3.8. All of the heated vessels and pipes were monitored by T-type thermocouples and insulated. T-type thermocouples are accurate with high sensitivity within temperature range −270 to 400° C. All the gas flow was managed by the calibrated mass flow controllers (MFCs) for flow precision. Process control of Al/Si mass ratio in the range of 2.9 to 3.8 A was achieved along with a stable yield of mullite composition during a long term operation (14-21.5 hours).

A layer precursor comprising the gaseous AlCl$_3$ and SiCl$_4$, which were entrained in heated nitrogen, was transported into a burner. The burner had four functional gas lines inside. A methane/oxygen premixed flame with an optimal ratio of 1.25 provided a reaction zone for combustion of the layer precursor. An inner-shield O$_2$ gas (190° C. and 2.0 L/minute) was used to lift the combustion area and force as-formed particles away from the flame to keep the reaction zone clean. Supplementary O$_2$ gas (1.5 L/minute) provided excess oxygen to complete combustion reactions and assisted to stabilize the flame. As needed, additional O$_2$ gas (up to 8 L/minute) may be supplied. A central tube allowed the layer precursor to pass through and get into the flame to generate particles. Four different channels could cooperate with each other to control the flame with great flexibility. Typically, all components of the ceramic precursor vaporization equipment (e.g., vessels and pipes) and of the burner were insulated and preheated to above 120° C.-190° C. to avoid vapor condensation and channel block. Through control of heating temperature and carrier gas flow rate, the composition of the final product was controlled. The burner may operate in a range of about 175° C. to 190° C. to assist with avoiding condensation in the central tube and/or seal damage due to overheating.

In the burner, the layer precursor was exposed to a flame formed by a mixture of methane (CH$_4$) (5.0 L/minute) and oxygen (O$_2$) (4.0 L/minute), which provided a high temperature reaction zone and moisture ambience owing to the CH$_4$ combustion. Once the layer precursor contacted with H$_2$O in the flame, the chlorides hydrolyzed and oxides particles formed to result in a decomposed layer precursor. The intense collision between the primary particles resulted in coagulation and coalescence under the high temperature. A portion of them grew into big particles, a large number of them were partially sintered together to form aggregates, and the rest particles became agglomerates relying on physical bonds. All the particle and particle groups escaped from the flame within several milliseconds because of the steep temperature gradient and high gas flow velocity of the flame. It is noted that the product morphology, especially the particle size, could be adjusted by the presence of another heated N$_2$ gas to further dilute the ceramic precursor vapors before entering the flame.

As-formed particles of the decomposed layer precursor were deposited on a stainless steel mesh (316 L, 2000 DPSI) and a ceramic coupon (cut off from a GPF honeycomb) placed on a cylinder mounted above the flame. For filtration efficiency and pressure drop analysis, as-formed particles were deposited on full-size ceramic honeycombs ((GC 4.055"-200/8) in a wind tunnel, which was employed to enhance the deposition uniformity and collection efficiency. All the deposition processes were aided by use of a vacuum pump.

Once the particles of the decomposed layer precursor were deposited onto a structure (e.g., stainless steel mesh, ceramic coupon, or full-size ceramic honeycomb) was completed, the structure was sintered in an oven set at 1150° C. for 30 minutes. Upon sintering, a crystalline phase ceramic layer was formed.

Figure 13A:
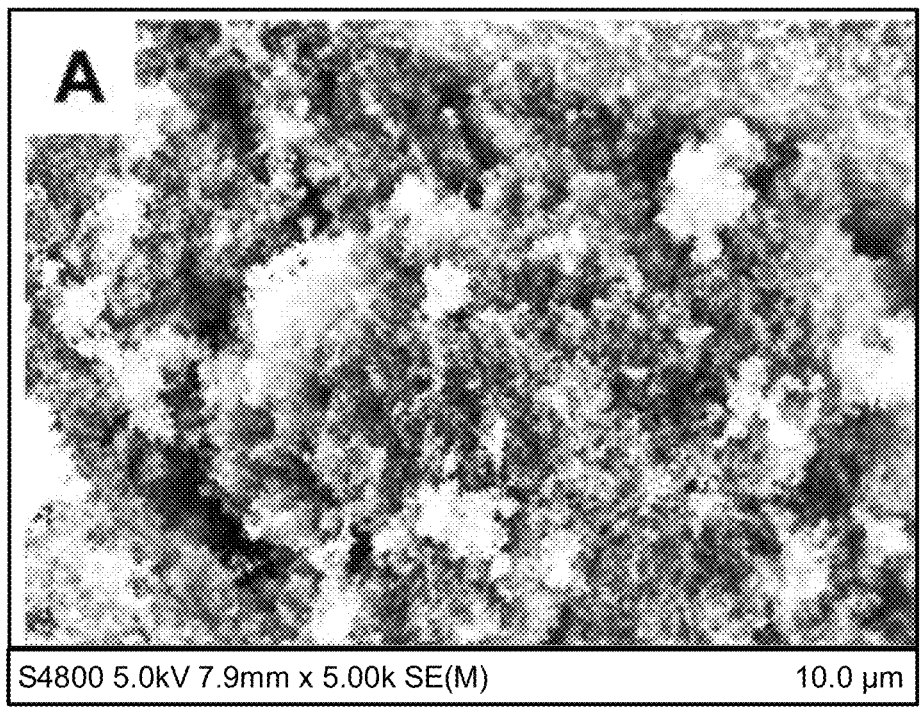
FIGS. 13A and 13B are scanning electron microscope images at differing magnifications of an amorphous phase decomposed layer precursor deposited on a honeycomb body according to embodiments disclosed and described herein.
Figure 13B:
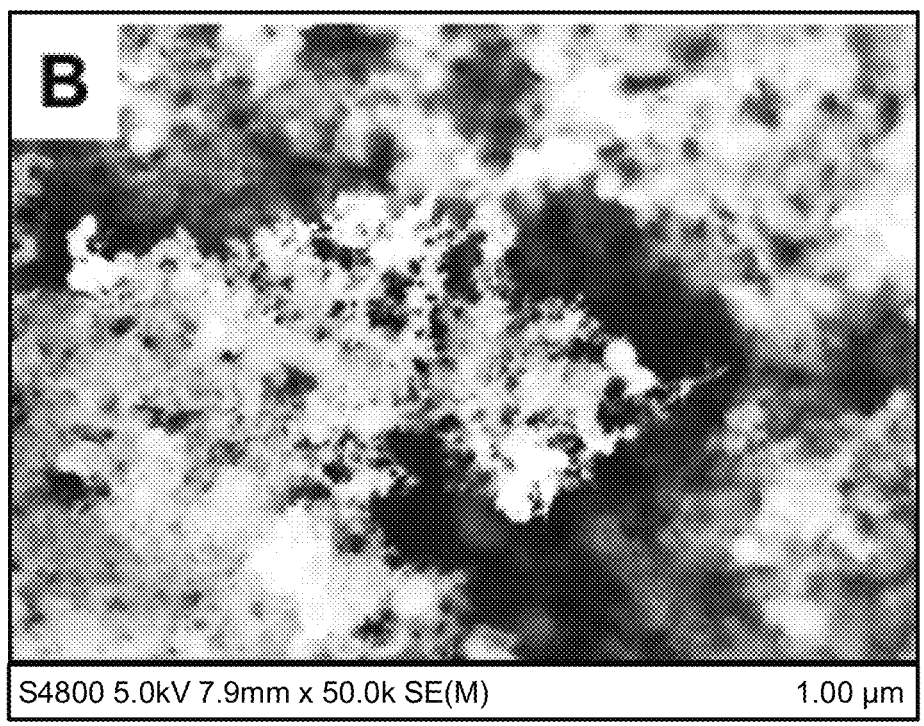
Figure 13C:
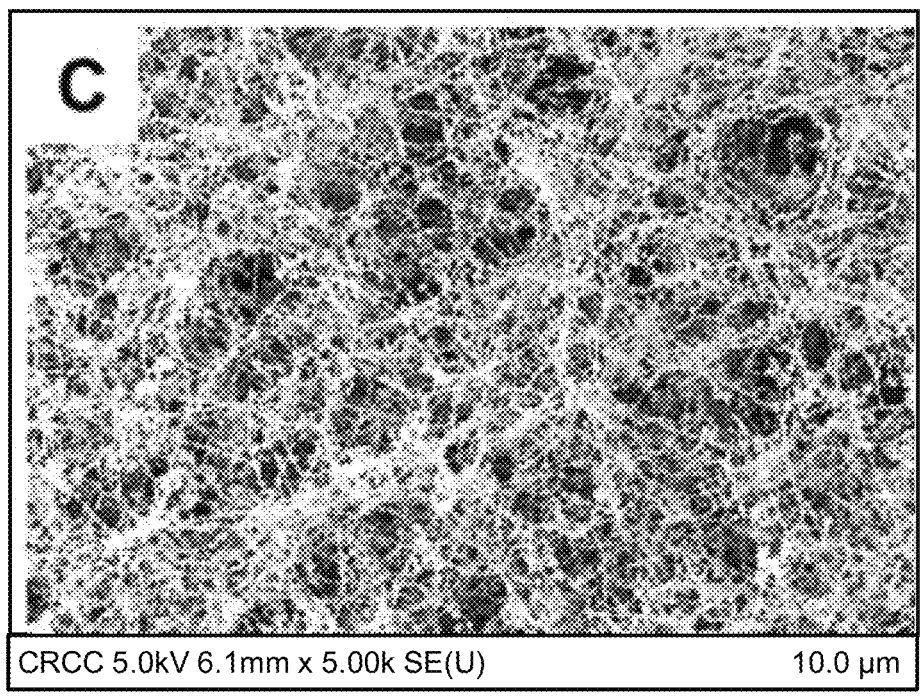
FIGS. 13C and 13D are scanning electron microscope images at differing magnifications of a crystalline phase ceramic layer deposited on a honeycomb body according to embodiments disclosed and described herein.
Figure 13D:
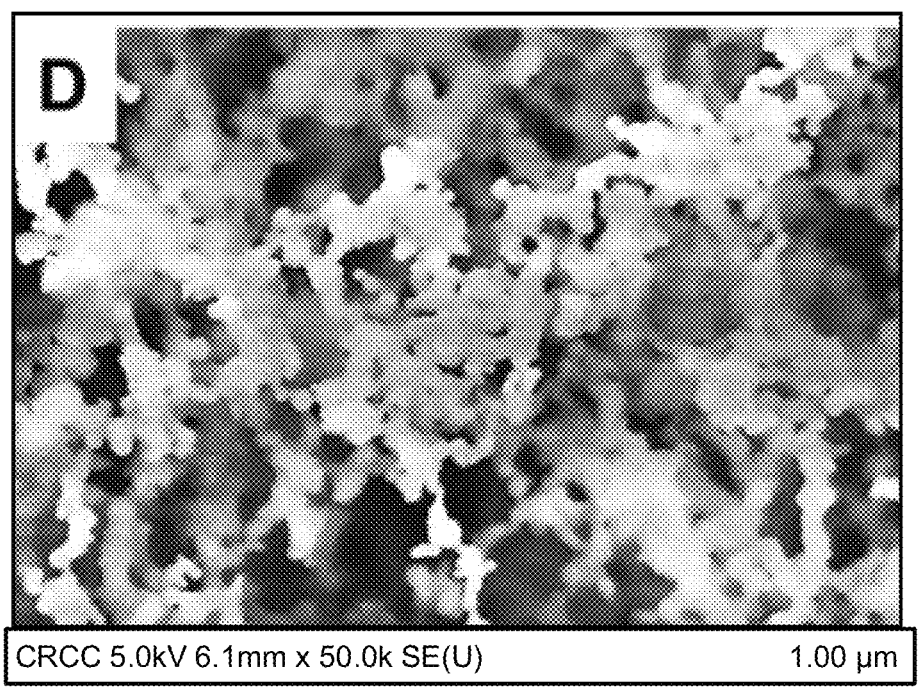

FIGS. 13A and 13B are scanning electron microscope images at differing magnifications of an amorphous phase decomposed layer precursor deposited on a honeycomb body. The as-deposited decomposed layer precursor was porous and all of the particles packed loosely to form a continuous structure. FIGS. 13C and 13D are scanning electron microscope images at differing magnifications of a crystalline phase ceramic layer formed after sintering of the amorphous phase decomposed layer precursor. Thermal treatment changed the layer morphology which evolved into a well-connected structure while the particle grew from about 20-40 nm (FIGS. 13A-B) to about 60-80 nm (FIGS. 13C-D).

Figure 14:
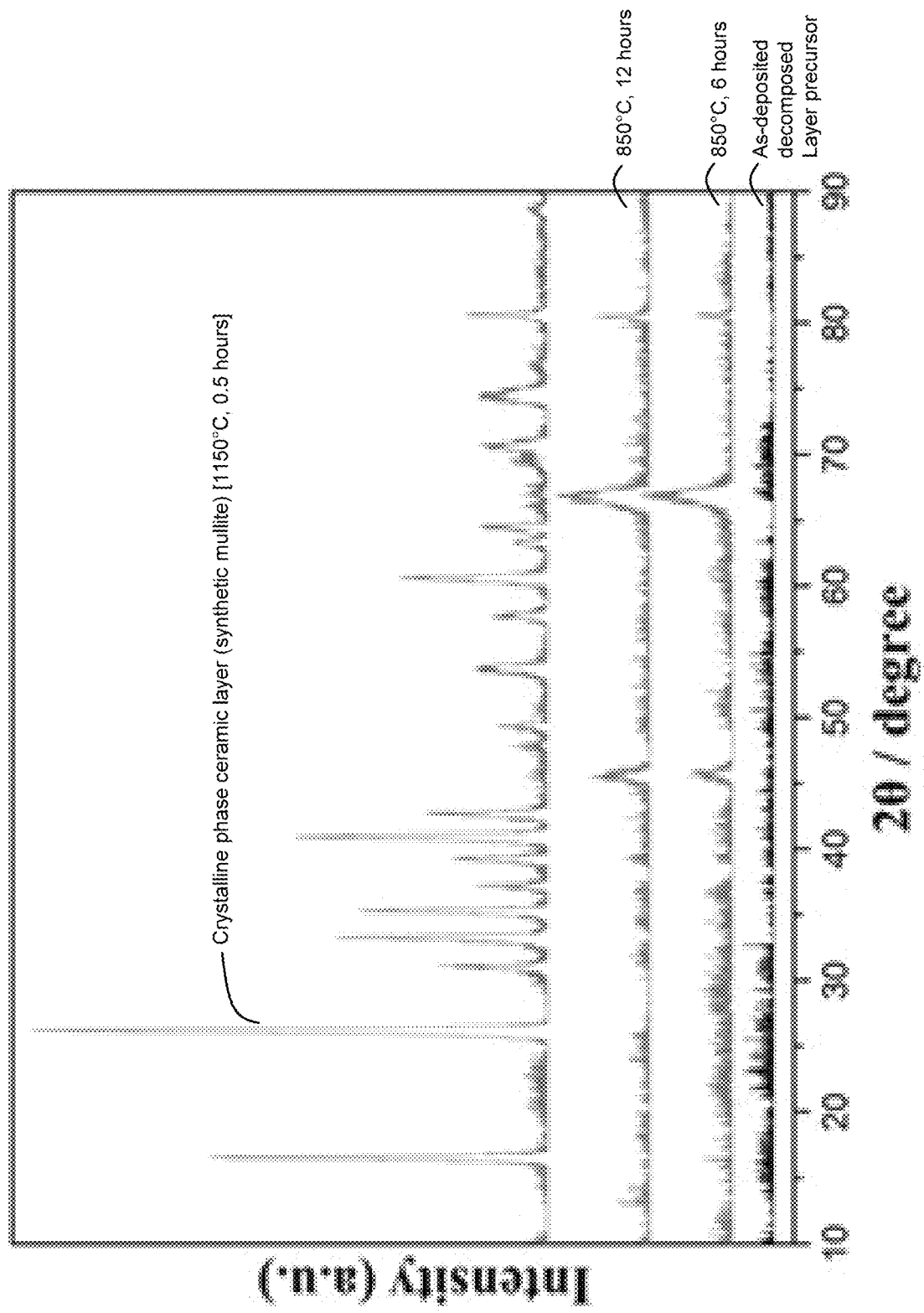
FIG. 14 shows an XRD scan of the decomposed layer precursor: as-deposited, after exposure to 850° C. for 6 hours, after exposure to 850° C. for 12 hours, and after sintering at 1150° C. for 0.5 hours.

FIG. 14 shows an XRD scan of the decomposed layer precursor: as-deposited, after exposure to 850° C. for 6 hours, after exposure to 850° C. for 12 hours, and after sintering at 1150° C. for 0.5 hours. The as-deposited layer was amorphous while the main peaks of the 1150° C. sintered layer corresponded to a mullite standard pattern. As-deposited particles could not crystallize at low temperature, such as 850° C., even for up to 12 hours. The vapor precursor based particles behaved similarly with that using liquid precursor in crystallization even there was distinct difference in their initial particle size.

BET techniques were conducted to investigate particle size. The results are shown in Table 7.

TABLE 7

|  | As-deposited | 850° C., 3 h | 850° C., 6 h | 850° C., 12 h | 1150° C., 0.5 h |
|---|---|---|---|---|---|
| BET surface area (m²/g) | 61.1 | 62.8 | 60.3 | 62.2 | 47.6 |
| Equivalent Diameter (nm) | 35.1 | 34.1 | 35.5 | 34.5 | 45.0 |

In Table 7, surface area of the as-deposited particles was 61.1 m²/g, which decreased to 47.6 m²/g after sintering at 1150° C. Particle size changed slightly when sintered at 850° C. The results were consistent with the XRD scans. The sintering process was effective in introducing a crystallized phase, improving structure integrity without significantly sacrifice on the porosity of the mullite layer. The results above indicate that vapor precursor process could achieve the same results as liquid precursor in mullite preparation including composition, sintered particle size and even the sintered inorganic layer morphology.

Filtration efficiency of a gasoline particulate filter (GPF) was analyzed by depositing the synthetic mullite of this example on a full size GPF (GC 4.055"-200/8). Simulated engine particulate filtration test (for 120 nm particle size, flow rate of 21 Nm³/h) was used to evaluate the filtration efficiency while the clean backpressure test was used to determine pressure drop penalty.

Figure 15:
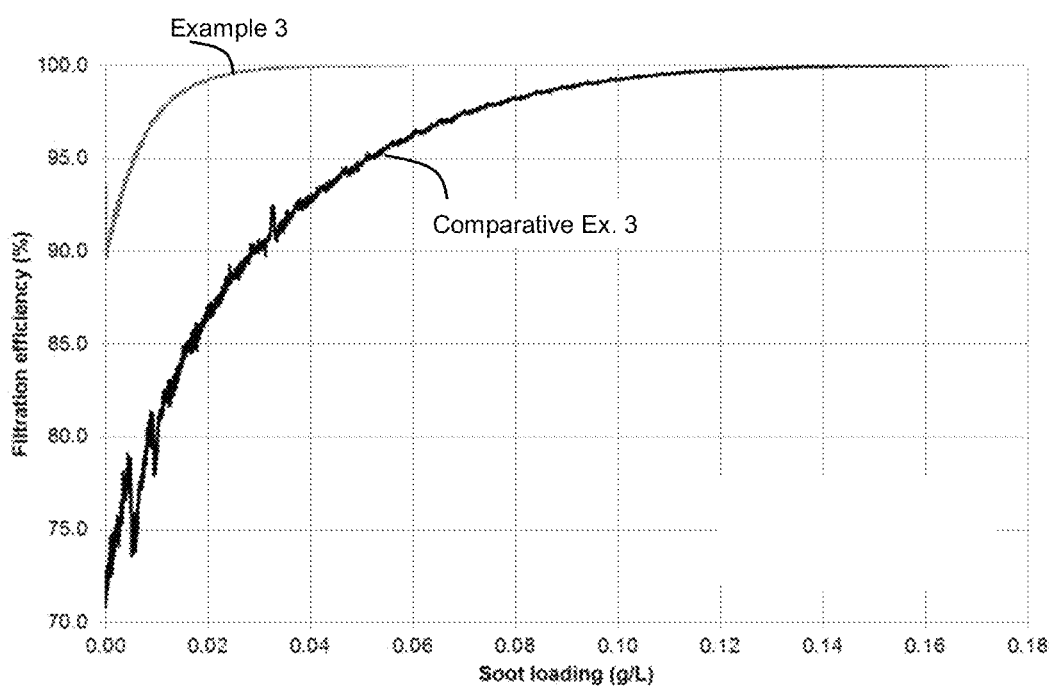
FIG. 15 is a graphical depiction of filtration efficiency of a honeycomb body according to embodiments disclosed and described herein.

FIG. 15 is a graphical representation of the filtration efficiency (FE) versus soot loading, and shows the increased filtration efficiency provided by adding an inorganic layer to a honeycomb body according to embodiments disclosed and described herein. In FIG. 15, Comparative Example 3 is a honeycomb body without an inorganic layer and Example 3 has the mullite layer of this example. Initial FE increased for Example 3. Comparative Example 3 for a soot loading of 0.01g/L reached an FE of 97.4%. In contrast, Example 3, as much less soot accumulation could reach 100% FE.

Table 8 is a sample evaluation of Example 3.

TABLE 8

|  | Example 3 |
|---|---|
| Filtration efficiency (FE) | 97.4% |
| Particulate Number (PN) | 5.9 × 10$^{10}$ #/Km |
| Clean dP | +5.7% |
| Soot Loaded dP | −5.4% @ 2 g/L |
| Thermal robustness | Pass<br>Thermal shock: >850° C.<br>Pass<br>Operating window:<br>1150° C.<br>Pass<br>Hydrothermal:<br>1150° C., 10 wt % moisture |
| Mechanical integrity | Pass<br>Vibration<br>(76 g, 200 Hz, 2 h)<br>Pass<br>High flow<br>(850 Nm³/h cold flow) |

In accordance with Table 8, an inorganic layer of mullite provides a high filtration efficiency (greater than 97%) with a low pressure drop penalty (only about 5.7%). The particle number passed through the layer was 5*10$^{10}$ #/Km and the soot loaded dP@2 g/L was −5.4%. Besides performance, strength and durability of the inorganic layer is relevant to application in a gasoline particulate filter (GPF). Layer thermal robustness was demonstrated by thermal shock, operating window and hydrothermal test while mechanical integrity test included vibration and high flow in Table 8. Therefore, existing properties of the starting honeycomb body remained unchanged (or the change was negligible) with addition of the layer. Following thermal and mechanical reliability testing, there was little to no degradation in filtration efficiency (FE) for the composite honeycomb and inorganic layer.

Figure 16A:
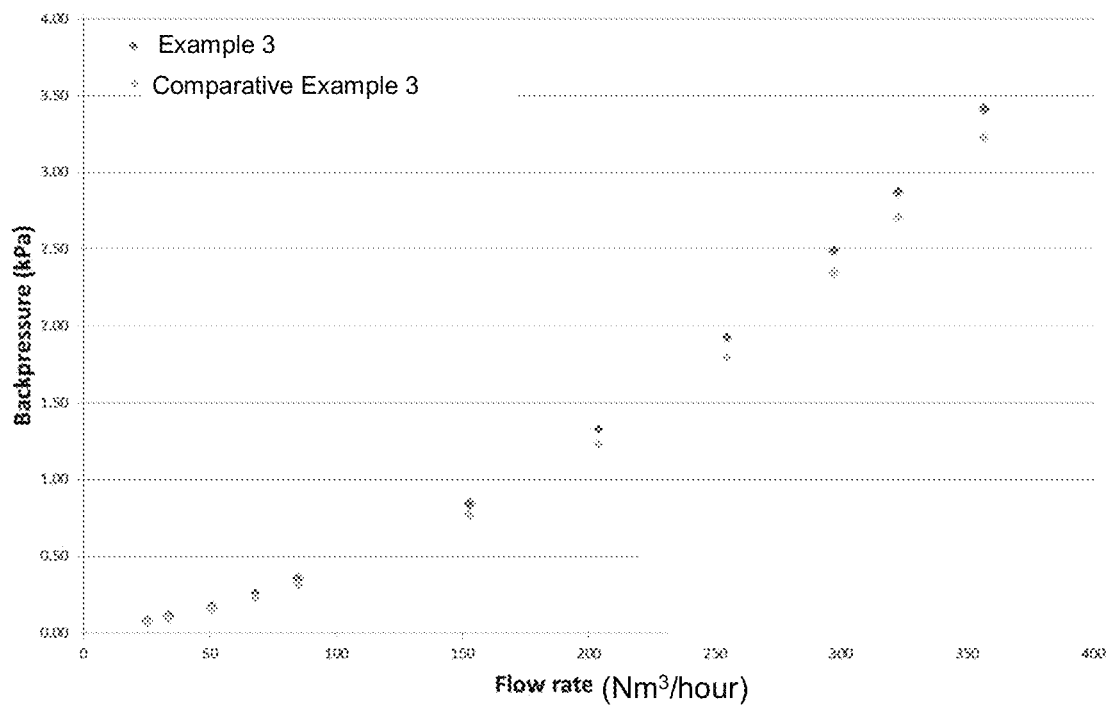
FIG. 16A is a graphical depiction of backpressure versus flow rate of a honeycomb body according to embodiments disclosed and described herein.
Figure 16B:
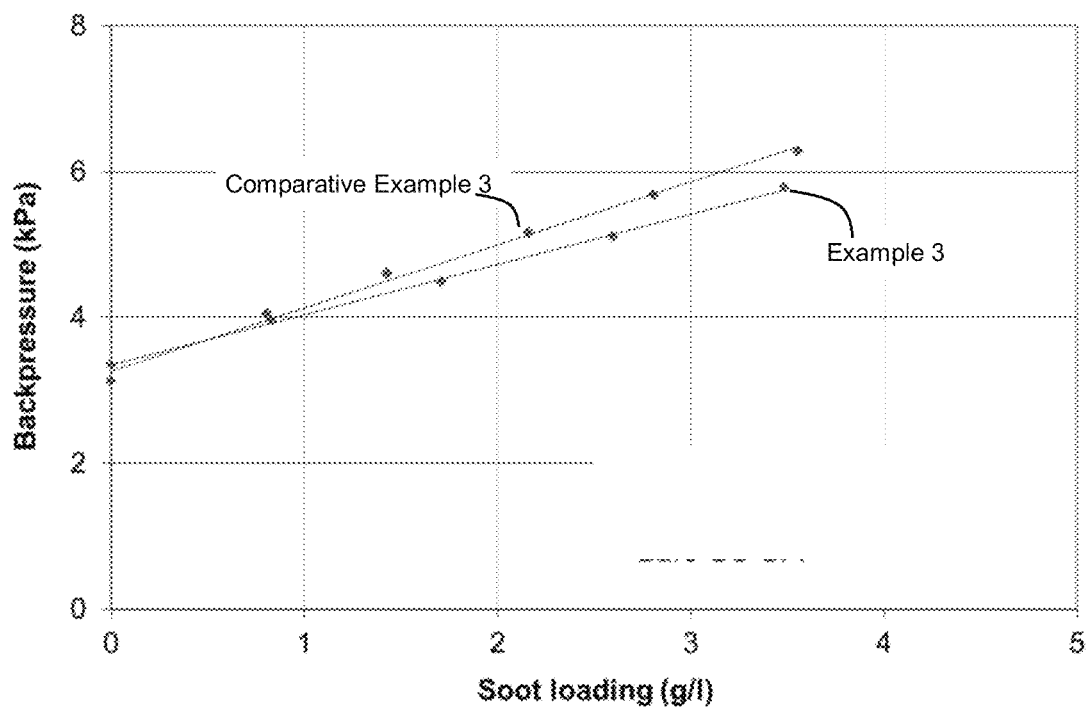
FIG. 16B is a graphical depiction of backpressure versus soot load of a honeycomb body according to embodiments disclosed and described herein.

FIGS. 16A and 16B graphically depict the backpressure of Example 3 and Comparative Example 3. FIG. 16A is a graphical depiction of the backpressure (kPa) versus flow rate (Nm³/h) for Example 3 and Comparative Example 3. For Example 3, the initial FE of membrane sample was up to 90.1% (FIG. 15), and the DP penalty was only 5.7% in accordance with FIG. 16A, which was much lower than a traditional dip-coating filter. In FIG. 16B, backpressure rose up with the soot loading amount increasing. Example 3 exhibited a lower pressure drop penalty than Comparative Example 3 when the soot loading was higher than 0.5 g/L. This could be explained that the layer provided the filter with an "on-wall" coating mode instead of "in-wall", which occurs in common parts.

The particulate filter made according to Example 3 was tested for a change in filtration efficiency as follows. The particulate filter of Example 3 exposed to a high flow condition of 850 Nm³/h of air for one minute at room temperature. A change in filtration efficiency was determined by measuring the difference between a number of soot particles that are introduced into the particulate filter and a number of soot particles that exit the particulate filter before and after exposure to the high flow condition. The soot particles were particles from cigarette smoke having a median particle size of 300 nm in a stream of air with a soot particle concentration of 500,000 particles/cm³ that was flowed through the particulate filter of Example 3 at a flow rate of 51 Nm³/h, room temperature, and a velocity of 1.7 m/s for one minute. Filtration efficiency was determined by measuring particle count using an 0.1 CFM Lighthouse Handheld 3016 particle counter available from Lighthouse Worldwide Solutions. The measurement was performed on the particulate filter of Example 3 as manufactured, and then after exposure to the high flow condition of 850 Nm³/h of air for one minute at room temperature. The particulate filter of Example 3 exhibited a change in filtration efficiency of less than 1% after exposure to the high flow condition of 850 Nm³/h of air for one minute at room temperature. This result indicates that the filtration material deposits exhibited excellent durability in that the filtration material deposits remained in place and continued to be effective in providing enhanced filtration efficiency for the particulate filter.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A particulate filter comprising:
a honeycomb body comprising a plugged porous ceramic honeycomb structure comprising a plurality of intersecting porous walls comprising porous wall surfaces that define a plurality of channels extending from an inlet end to an outlet end of the porous ceramic honeycomb structure, the plurality of channels comprising inlet channels sealed at or near the outlet end and having a surface area, and outlet channels sealed at or near the inlet end and having a surface area, the inlet channels and the outlet channels defining filtration area;
wherein one or more of the porous wall surfaces defining the inlet channels comprise a base wall portion and filtration material deposits disposed on and bound to the base wall portion by thermal sintering or fusing to provide a composite microstructure and the composite microstructure having a porosity ($\varepsilon$) as measured by mercury porosimetry, a median pore diameter ($D_{50}$) as measured by mercury porosimetry, a permeability factor ($\kappa$) and an Effective Microstructural Factor (EMF) measured,
wherein the composite microstructure is characterized by a Normalized Microstructure Filtration Value $NMFV = EMF/(\varepsilon^{0.43}/D_{50}^{5/3})_{base\ wall\ properties}$ of 2 or larger and a Normalized Permeability Value $NPV = \kappa_{effective}/(\varepsilon D_{50}^{2}/66.7)_{base\ wall\ properties}$ of 0.2 or larger,
wherein the particulate filter exhibits a change in filtration efficiency of less than 5% after being exposed to a high flow condition of 850 Nm³/h of air for one minute at room temperature, and
wherein the change in filtration efficiency is determined by measuring a difference between a number of soot particles that are introduced into the particulate filter and a number of soot particles that exit the particulate filter before and after exposure to the high flow condition, wherein the soot particles have a median particle size of 300 nm a soot particle concentration of 500,000 particles/cm³ in a stream of air flowed through the particulate filter at room temperature and at a velocity of 1.7 m/s as measured by a particle counter.

2. The particulate filter of claim 1, wherein one or more of the porous wall surfaces defining the inlet channels comprise a base wall portion comprised of a first ceramic composition and filtration material deposits disposed on the base wall portion are comprised of a second ceramic composition, and the first and second ceramic compositions differ.

3. The particulate filter of claim 1, wherein the filtration material deposits have an average thickness of greater than or equal to 0.5 µm and less than or equal to 30 µm.

4. The particulate filter of claim 1, wherein the second ceramic composition is comprised of alumina or silica, or a combination thereof.

5. The particulate filter of claim 1 wherein the second ceramic composition is selected from the group consisting of CaO, Ca(OH)$_2$, CaCO$_3$, MgO, Mg(OH)$_2$, MgCO$_3$, SiO$_2$, Al$_2$O$_3$, Al(OH)$_3$, calcium aluminates, magnesium aluminates, and mixtures thereof.

6. The particulate filter of claim 1, wherein the first ceramic composition is cordierite and the second ceramic composition is alumina.

7. The particulate filter of claim 1, wherein the filtration material deposits comprise an oxide ceramic or an aluminum silicate.

8. The particulate filter of claim 1, wherein the filtration material deposits cover at least 70% of the porous wall surfaces.

9. The particulate filter of claim 1, wherein the filtration material deposits cover at least 90% of the porous wall surfaces.

10. The particulate filter of claim 1, wherein the inlet end and the outlet end are spaced apart by an axial length, and the filtration material deposits extend at least 60% along the axial length.

11. The particulate filter of claim 1, wherein the filtration material deposits extend at least 60% of a distance between the inlet end and the outlet end.

12. The particulate filter of claim 1, wherein greater than 90% of the filtration material deposits are disposed on the porous wall surfaces as a continuous coating.

13. The particulate filter of claim 1, wherein the porous ceramic honeycomb structure has a porosity from greater than or equal to 50% to less than or equal to 70%.

14. The particulate filter of claim 1, wherein the porous ceramic honeycomb structure has a bulk median pore size greater than or equal to 10 µm.

15. The particulate filter of claim 1, wherein the porous ceramic honeycomb structure has a bulk median pore size greater than or equal to 15 µm.

16. The particulate filter of claim 1, wherein the porous ceramic honeycomb structure has a bulk median pore size from greater than or equal to 8 µm to less than or equal to 25 µm.

17. The particulate filter of claim 1, wherein the particulate filter exhibits a change in filtration efficiency of less than 5% after being exposed to to a high flow condition of 850 Nm³/h of air for one minute at room temperature, and wherein the change in filtration efficiency is determined by measuring a difference between a number of soot particles that are introduced into the particulate filter and a number of soot particles that exit the particulate filter before and after exposure to the high flow condition, wherein the soot particles have a median particle size of 300 nm, a soot particle concentration of 500,000 particles/cm³ in a stream of air flowed through the particulate filter at room temperature and at a velocity of 1.7 m/s as measured by a particle counter.

18. The particulate filter of claim 1, wherein the filtration material deposits comprise synthetic mullite.

19. The particulate filter of claim 1, wherein the filtration material deposits have a porosity greater than 90%.

* * * * *

UNITED STATES PATENT AND TRADEMARK OFFICE
CERTIFICATE OF CORRECTION

PATENT NO. : 11,458,464 B2
APPLICATION NO. : 17/468088
DATED : October 4, 2022
INVENTOR(S) : Douglas Munroe Beall et al.

It is certified that error appears in the above-identified patent and that said Letters Patent is hereby corrected as shown below:

On the Title Page

On the page 2, in Column 2, under "Other Publications", Line 10, delete "fillralion" and insert -- filtration --.

In the Specification

In Column 1, Line 5, delete "Oct. 31, 2018" and insert -- Apr. 29, 2020 --.

In the Claims

In Column 44, Line 59, in Claim 17, delete "to to" and insert -- to --.

Signed and Sealed this
First Day of August, 2023

Katherine Kelly Vidal
*Director of the United States Patent and Trademark Office*